(12) United States Patent
Allen et al.

(10) Patent No.: US 10,634,538 B2
(45) Date of Patent: Apr. 28, 2020

(54) FLOW SENSOR

(71) Applicant: Rain Bird Corporation, Azusa, CA (US)

(72) Inventors: Kirk Andrew Allen, Valencia, CA (US); James Richard Parks, Santa Clarita, CA (US); Amit Kumar Saha, Dallas, TX (US); Fei Liu, Diamond Bar, CA (US); Mark W. Emory, Fullerton, CA (US); Samuel R. Rulli, Burbank, CA (US)

(73) Assignee: Rain Bird Corporation, Azusa, CA (US)

( * ) Notice: Subject to any disclaimer, the term of this patent is extended or adjusted under 35 U.S.C. 154(b) by 106 days.

(21) Appl. No.: 15/649,332

(22) Filed: Jul. 13, 2017

(65) Prior Publication Data

US 2018/0017423 A1    Jan. 18, 2018

Related U.S. Application Data

(60) Provisional application No. 62/427,675, filed on Nov. 29, 2016, provisional application No. 62/361,873, filed on Jul. 13, 2016.

(51) Int. Cl.
| | |
|---|---|
| *G01F 15/06* | (2006.01) |
| *G01F 1/26* | (2006.01) |
| *G01F 1/28* | (2006.01) |
| *G01F 3/16* | (2006.01) |
| *G01M 3/28* | (2006.01) |
| *G01F 1/24* | (2006.01) |
| *G01F 1/22* | (2006.01) |

(52) U.S. Cl.
CPC .............. *G01F 15/061* (2013.01); *G01F 1/26* (2013.01); *G01F 1/28* (2013.01); *G01F 3/16* (2013.01); *G01M 3/2876* (2013.01); *G01F 1/22* (2013.01); *G01F 1/24* (2013.01); *G01F 15/06* (2013.01)

(58) Field of Classification Search
CPC ..... G01F 1/28; G01F 1/22; G01F 1/26; G01F 3/16; G01F 3/14
See application file for complete search history.

(56) References Cited

U.S. PATENT DOCUMENTS

| | | |
|---|---|---|
| 483,552 A | 10/1892 | Goodell |
| 1,035,225 A | 8/1912 | Nuebling |
| 2,981,240 A | 4/1961 | Nelson |

(Continued)

FOREIGN PATENT DOCUMENTS

| | | |
|---|---|---|
| EP | 0188131 | 7/1986 |
| JP | 2016017756 | 2/2016 |

OTHER PUBLICATIONS

Catron, M. Bezel Overview, Rain Bird®, Nov. 16, 2017, 5 pages.

(Continued)

*Primary Examiner* — Paul M. West
(74) *Attorney, Agent, or Firm* — Fitch, Even, Tabin & Flannery, LLP

(57) ABSTRACT

Flow sensors are provided that can provide both leak detection and flow monitoring. The flow monitoring enables a determination whether there are blockages or leaks in a fluid system during normal operation of the system. The leak detection enables detection of leaks when the system is shut off. The flow sensors can use a frusto-conical flow guide to provide a more compact flow sensor.

25 Claims, 29 Drawing Sheets

(56) References Cited

U.S. PATENT DOCUMENTS

| | | |
|---|---|---|
| 3,076,335 A | 2/1963 | Rosaen |
| 3,076,336 A | 2/1963 | Rosaen |
| 3,085,423 A | 4/1963 | Champion |
| 3,204,659 A | 9/1965 | Richards |
| 3,260,110 A | 7/1966 | Lutz |
| 3,354,718 A | 11/1967 | Boutillon |
| 3,357,255 A | 12/1967 | Reynolds |
| 3,472,072 A | 10/1969 | Kunstadt |
| 3,530,705 A | 9/1970 | Lathrop |
| 3,641,817 A | 2/1972 | Dory |
| 3,667,495 A | 6/1972 | Schuler |
| 3,709,037 A | 1/1973 | Abbotts |
| 3,711,689 A | 1/1973 | Park |
| 3,721,116 A | 3/1973 | Brachet |
| 3,721,505 A | 3/1973 | Garnett |
| 3,723,987 A | 3/1973 | Barone, Jr. |
| 3,757,577 A | 9/1973 | Bozek |
| 3,759,099 A | 9/1973 | McGregor |
| 3,789,664 A | 2/1974 | Bozek |
| 3,801,239 A | 4/1974 | Larson |
| 3,807,220 A | 4/1974 | Ottenstein |
| 3,812,715 A | 5/1974 | Whalen |
| 3,822,591 A | 7/1974 | Li |
| 3,842,671 A | 10/1974 | Frizelle |
| 3,853,144 A | 12/1974 | Whelan |
| 3,857,277 A | 12/1974 | Moore |
| 3,874,235 A | 4/1975 | Sanden |
| 3,882,723 A | 5/1975 | Wickham |
| 3,948,083 A | 4/1976 | Wickham |
| 3,955,415 A | 5/1976 | Sharon |
| 3,975,943 A | 8/1976 | Brachet |
| 3,987,662 A | 10/1976 | Hara |
| 3,990,299 A | 11/1976 | Coffman |
| 4,195,518 A * | 4/1980 | Fees ................... G01F 1/22 |
| | | 116/204 |
| 4,250,553 A | 2/1981 | Sebens |
| 4,254,664 A | 3/1981 | Graham |
| 4,282,761 A | 8/1981 | Rosaen |
| 4,292,853 A | 10/1981 | Williams |
| 4,305,281 A | 12/1981 | Lee |
| 4,308,746 A | 1/1982 | Covington |
| 4,311,170 A | 1/1982 | Dolan |
| 4,337,786 A | 7/1982 | Myers |
| 4,361,030 A | 11/1982 | Heide |
| 4,368,646 A | 1/1983 | Rogg |
| 4,388,835 A | 6/1983 | Rosaen |
| 4,440,028 A | 4/1984 | Ramlow |
| 4,501,158 A | 2/1985 | Pelikan |
| 4,501,972 A | 2/1985 | Foerster, Jr. |
| 4,518,955 A | 5/1985 | Meyer |
| 4,530,463 A | 7/1985 | Hiniker |
| 4,548,076 A | 10/1985 | Haake |
| 4,581,946 A | 4/1986 | Kanayama |
| 4,590,805 A | 5/1986 | Baird |
| 4,619,139 A * | 10/1986 | Rosaen ................ G01F 1/22 |
| | | 73/198 |
| 4,630,486 A | 12/1986 | Miles |
| 4,630,488 A | 12/1986 | Marlier |
| 4,635,485 A | 1/1987 | Lew |
| 4,637,547 A | 1/1987 | Hiniker |
| 4,643,213 A | 2/1987 | Mirel |
| 4,651,286 A | 3/1987 | Fukai |
| 4,724,706 A | 2/1988 | Stiever |
| 4,729,106 A | 3/1988 | Rush |
| 4,730,637 A | 3/1988 | White |
| 4,797,666 A | 1/1989 | Baxter |
| 4,805,862 A | 2/1989 | Wissman |
| 4,838,310 A | 6/1989 | Scott |
| 4,840,072 A | 6/1989 | Cuthbert |
| 4,859,157 A | 8/1989 | Adler |
| 4,867,198 A | 9/1989 | Faust |
| 4,870,859 A | 10/1989 | Twerdochlib |
| 4,888,706 A | 12/1989 | Rush |
| 4,936,151 A | 6/1990 | Tokio |
| 4,945,771 A | 8/1990 | Ogden |
| 4,962,666 A | 10/1990 | Adney |
| 4,986,133 A | 1/1991 | Lake |
| 4,987,914 A | 1/1991 | Adney |
| 4,991,436 A | 2/1991 | Roling |
| 5,000,031 A | 3/1991 | Potvin |
| 5,004,014 A | 4/1991 | Bender |
| 5,007,453 A | 4/1991 | Berkowitz |
| 5,014,543 A | 5/1991 | Franklin |
| 5,038,268 A | 8/1991 | Krause |
| 5,040,409 A | 8/1991 | Kiewit |
| 5,046,353 A | 9/1991 | Thompson |
| 5,048,755 A | 9/1991 | Dodds |
| 5,052,212 A | 10/1991 | Cohrs |
| 5,056,554 A | 10/1991 | White |
| 5,062,442 A | 11/1991 | Stenstrom |
| 5,072,621 A | 12/1991 | Hasselmann |
| 5,085,076 A | 2/1992 | Engelmann |
| 5,086,806 A | 2/1992 | Engler |
| 5,097,861 A | 3/1992 | Hopkins |
| 5,099,698 A | 3/1992 | Kath |
| 5,138,888 A | 8/1992 | Walmer |
| 5,158,207 A | 10/1992 | Van Daele |
| 5,228,469 A | 7/1993 | Otten |
| 5,251,653 A | 10/1993 | Tucker |
| 5,261,268 A | 11/1993 | Namba |
| 5,272,646 A | 12/1993 | Farmer |
| 5,287,884 A | 2/1994 | Cohen |
| 5,303,738 A | 4/1994 | Chang |
| 5,315,862 A | 5/1994 | Hasselmann |
| 5,377,529 A | 1/1995 | Boyd |
| 5,383,338 A * | 1/1995 | Bowsky ................ F25B 41/006 |
| | | 116/206 |
| 5,415,041 A | 5/1995 | Foran, Jr. |
| 5,419,203 A | 5/1995 | Carmichael |
| 5,438,862 A | 8/1995 | Keating |
| 5,483,838 A | 1/1996 | Holden |
| 5,494,070 A | 2/1996 | Hilton |
| 5,515,734 A | 5/1996 | Malminen |
| 5,540,107 A | 7/1996 | Silverman |
| 5,544,533 A | 8/1996 | Sugi |
| 5,546,801 A | 8/1996 | Swinson |
| 5,554,805 A | 9/1996 | Bahrton |
| 5,568,825 A | 10/1996 | Faulk |
| 5,586,050 A | 12/1996 | Makel |
| 5,590,686 A | 1/1997 | Prendergast |
| 5,612,890 A | 3/1997 | Strasser |
| 5,616,830 A | 4/1997 | Wodeslavsky |
| 5,636,653 A | 6/1997 | Titus |
| 5,637,789 A | 6/1997 | Lawson |
| 5,650,564 A | 7/1997 | Wodeslavsky |
| 5,655,561 A | 8/1997 | Wendel |
| 5,655,568 A | 8/1997 | Bhargava |
| 5,677,501 A | 10/1997 | Kawaguchi |
| 5,698,793 A | 12/1997 | Carmichael |
| 5,708,195 A | 1/1998 | Kurisu |
| 5,713,729 A | 2/1998 | Hong |
| 5,717,137 A | 2/1998 | Singleterry |
| 5,739,420 A | 4/1998 | Peterson |
| 5,746,413 A | 5/1998 | Goloff |
| 5,769,108 A | 6/1998 | Proudman |
| 5,771,920 A | 6/1998 | Jewett |
| 5,806,558 A | 9/1998 | Greverath |
| 5,814,735 A | 9/1998 | Kurisaki |
| 5,816,246 A | 10/1998 | Mirza |
| 5,820,715 A | 10/1998 | Singleterry |
| 5,838,258 A | 11/1998 | Saar |
| 5,877,417 A | 3/1999 | Arvidson |
| 5,880,378 A | 3/1999 | Behring, II |
| 5,884,649 A | 3/1999 | Proudman |
| 5,890,515 A * | 4/1999 | Spiess ................ G01F 1/28 |
| | | 137/552 |
| 5,902,927 A | 5/1999 | Titus |
| 5,911,238 A | 6/1999 | Bump |
| 5,913,236 A | 6/1999 | Wodeslavsky |
| 5,918,268 A | 6/1999 | Lukas |
| 5,918,271 A | 6/1999 | McGuigan |
| 5,944,048 A | 8/1999 | Bump |
| 5,950,667 A | 9/1999 | Nicewonger |
| 5,970,801 A | 10/1999 | Ciobanu |

(56) References Cited

U.S. PATENT DOCUMENTS

| | | |
|---|---|---|
| 5,971,011 A | 10/1999 | Price |
| 5,975,126 A | 11/1999 | Bump |
| 5,986,573 A | 11/1999 | Franklin |
| 5,992,218 A | 11/1999 | Tryba |
| 6,003,549 A | 12/1999 | Delcroix |
| 6,019,003 A | 2/2000 | Wieder |
| 6,026,838 A | 2/2000 | Nicewonger |
| 6,032,540 A | 3/2000 | Hawkins |
| 6,032,541 A | 3/2000 | Haak |
| 6,041,801 A | 3/2000 | Gray |
| 6,041,807 A | 3/2000 | Honaga |
| 6,065,941 A | 5/2000 | Gray |
| 6,076,542 A | 6/2000 | Titus |
| 6,079,263 A | 6/2000 | Beddies |
| 6,079,279 A | 6/2000 | Bussow |
| 6,106,705 A | 8/2000 | Giordano |
| 6,112,579 A | 9/2000 | Tryba |
| 6,119,528 A | 9/2000 | Genack |
| 6,128,946 A | 10/2000 | Leon |
| 6,134,949 A | 10/2000 | Leon |
| 6,161,100 A | 12/2000 | Saar |
| 6,170,508 B1 | 1/2001 | Faust |
| 6,202,679 B1 | 3/2001 | Titus |
| 6,209,576 B1 | 4/2001 | Davis |
| 6,213,986 B1 | 4/2001 | Darling |
| 6,216,727 B1 | 4/2001 | Genova |
| 6,237,618 B1 | 5/2001 | Kushner |
| 6,240,336 B1 | 5/2001 | Brundisini |
| 6,240,950 B1 | 6/2001 | Harris |
| 6,244,844 B1 | 6/2001 | Diaz |
| 6,250,151 B1 | 6/2001 | Tingleff |
| 6,284,129 B1 | 9/2001 | Giordano |
| 6,314,795 B1 | 11/2001 | Ingham |
| 6,317,051 B1 | 11/2001 | Cohen |
| 6,323,774 B1 | 11/2001 | Mitchell |
| 6,328,053 B1 | 12/2001 | Slaydon |
| 6,336,361 B1 | 1/2002 | Uramachi |
| 6,343,614 B1 | 2/2002 | Gray |
| 6,345,541 B1 | 2/2002 | Hendey |
| 6,377,190 B1 | 4/2002 | Saar |
| 6,402,048 B1 | 6/2002 | Collins |
| 6,460,565 B1 | 10/2002 | Titus |
| 6,485,263 B1 | 11/2002 | Bryant |
| 6,489,895 B1 | 12/2002 | Apelman |
| 6,491,062 B1 | 12/2002 | Croft |
| 6,502,451 B1 | 1/2003 | Fourie |
| 6,502,602 B1 | 1/2003 | Stroup |
| 6,513,375 B2 | 2/2003 | Uramachi |
| 6,513,542 B1 | 2/2003 | Hsieh |
| 6,517,707 B2 | 2/2003 | Giordano |
| 6,520,003 B1 | 2/2003 | Fox |
| 6,520,747 B2 | 2/2003 | Gray |
| 6,530,262 B1 | 3/2003 | Esser |
| 6,535,827 B1 | 3/2003 | Lestina |
| 6,539,814 B1 | 4/2003 | Popp |
| 6,552,647 B1 | 4/2003 | Thiessen |
| 6,568,416 B2 | 5/2003 | Tucker |
| 6,591,694 B2 | 7/2003 | Tsai |
| 6,626,042 B2 | 9/2003 | Havlena |
| 6,648,240 B2 | 11/2003 | Simmons |
| 6,654,697 B1 | 11/2003 | Eryurek |
| 6,666,384 B2 | 12/2003 | Prandi |
| 6,688,535 B2 | 2/2004 | Collins |
| 6,691,924 B1 | 2/2004 | Vestergaard |
| 6,694,824 B2 | 2/2004 | Norio Shinmura |
| 6,705,489 B2 | 3/2004 | Henry |
| 6,729,182 B2 | 5/2004 | Uramachi |
| 6,758,104 B2 | 7/2004 | Leys |
| 6,766,835 B1 | 7/2004 | Fima |
| 6,782,311 B2 | 8/2004 | Barlow |
| 6,792,799 B2 | 9/2004 | Ford |
| 6,796,173 B1 | 9/2004 | Lajoie |
| 6,807,855 B2 | 10/2004 | Stroup |
| 6,812,848 B2 | 11/2004 | Candela |
| 6,819,292 B2 | 11/2004 | Winter |
| 6,830,064 B2 | 12/2004 | Ji |
| 6,832,625 B2 | 12/2004 | Ford |
| 6,842,706 B1 | 1/2005 | Baraty |
| 6,845,886 B2 | 1/2005 | Henry |
| 6,857,308 B2 | 2/2005 | Johnson |
| 6,892,113 B1 | 5/2005 | Addink |
| 6,895,995 B2 | 5/2005 | Kirkman |
| 6,907,383 B2 | 6/2005 | Eryurek |
| 6,920,778 B2 | 7/2005 | Koike |
| 6,926,821 B2 | 8/2005 | Giordano |
| 6,931,305 B2 | 8/2005 | Sherwood |
| 6,939,470 B2 | 9/2005 | Baarman |
| 6,954,178 B2 | 10/2005 | Winter |
| 6,957,157 B2 | 10/2005 | Lander |
| 6,959,611 B2 | 11/2005 | Schehl |
| 6,963,808 B1 | 11/2005 | Addink |
| 6,968,856 B1 | 11/2005 | Goza |
| 6,970,808 B2 | 11/2005 | Abhulimen |
| 6,971,625 B2 | 12/2005 | Szymaszek |
| 6,973,373 B2 | 12/2005 | Gray |
| 6,973,705 A | 12/2005 | Leys |
| 6,973,827 B2 | 12/2005 | Koike |
| 6,988,419 B2 | 1/2006 | Muller |
| 7,028,533 B2 | 4/2006 | Koike |
| 7,030,767 B2 | 4/2006 | Candela |
| 7,032,435 B2 | 4/2006 | Hassenflug |
| 7,032,610 B2 | 4/2006 | Matsuo |
| 7,050,887 B2 | 5/2006 | Alvarez |
| 7,069,944 B2 | 7/2006 | Morikawa |
| 7,097,113 B2 | 8/2006 | Ivans |
| 7,107,128 B2 | 9/2006 | Laverdiere |
| 7,114,516 B2 | 10/2006 | Ito |
| 7,121,477 B1 | 10/2006 | Noelke |
| 7,126,551 B2 | 10/2006 | Winter |
| 7,130,750 B1 | 10/2006 | Stevens |
| 7,150,201 B2 | 12/2006 | Tison |
| 7,174,771 B2 | 2/2007 | Cooper |
| 7,174,772 B2 | 2/2007 | Sacca |
| 7,191,955 B2 | 3/2007 | Ivans |
| 7,193,233 B2 | 3/2007 | Smith |
| 7,201,180 B2 | 4/2007 | Ephrat |
| 7,218,237 B2 | 5/2007 | Kates |
| 7,228,726 B2 | 6/2007 | Kates |
| 7,233,252 B2 | 6/2007 | Hardin |
| 7,254,518 B2 | 8/2007 | Eryurek |
| 7,287,434 B2 | 10/2007 | Tison |
| 7,290,680 B2 | 11/2007 | Henry |
| 7,306,008 B2 | 12/2007 | Tornay |
| 7,308,824 B2 | 12/2007 | Trescott |
| 7,311,005 B2 | 12/2007 | Wiesinger |
| 7,317,971 B2 | 1/2008 | Laverdiere |
| 7,322,231 B2 | 1/2008 | Trygg |
| 7,330,796 B2 | 2/2008 | Addink |
| 7,334,455 B2 | 2/2008 | Yanagi |
| 7,343,795 B2 | 3/2008 | Winter |
| 7,346,434 B2 | 3/2008 | Goza |
| 7,349,763 B2 | 3/2008 | Ivans |
| 7,349,813 B2 | 3/2008 | Gutierrez |
| 7,360,413 B2 | 4/2008 | Jeffries |
| 7,366,625 B1 | 4/2008 | Augenstein |
| 7,377,184 B1 | 5/2008 | Schlachter |
| 7,383,721 B2 | 6/2008 | Parsons |
| 7,392,817 B2 | 7/2008 | Burlage |
| 7,395,708 B2 | 7/2008 | Kirchner |
| 7,412,876 B2 | 8/2008 | Kates |
| 7,444,886 B2 | 11/2008 | Furkert |
| 7,451,777 B2 | 11/2008 | Burlage |
| 7,458,521 B2 | 12/2008 | Ivans |
| 7,475,863 B2 | 1/2009 | Donovan |
| 7,480,544 B2 | 1/2009 | Wang |
| 7,491,320 B2 | 2/2009 | Gross |
| 7,494,070 B2 | 2/2009 | Collins |
| 7,536,900 B2 | 5/2009 | Nakamura |
| 7,546,181 B2 | 6/2009 | Vidovich |
| 7,546,778 B2 | 6/2009 | Amante |
| 7,549,348 B2 | 6/2009 | Brown |
| 7,549,439 B2 | 6/2009 | Kimura |
| 7,561,057 B2 | 7/2009 | Kates |
| 7,574,896 B1 | 8/2009 | Cooper |

(56) References Cited

U.S. PATENT DOCUMENTS

| | | |
|---|---|---|
| 7,583,198 B2 | 9/2009 | Kates |
| 7,596,429 B2 | 9/2009 | Cardinal |
| 7,596,458 B2 | 9/2009 | Lander |
| 7,617,992 B2 | 11/2009 | Ivans |
| 7,637,152 B2 | 12/2009 | Ushigusa |
| 7,658,105 B2 | 2/2010 | Holz |
| 7,668,670 B2 | 2/2010 | Lander |
| 7,669,461 B2 | 3/2010 | Kates |
| 7,669,594 B2 | 3/2010 | Downie |
| 7,685,866 B2 | 3/2010 | Bierbaum |
| 7,693,606 B2 | 4/2010 | Ahmad |
| 7,708,206 B2 | 5/2010 | Ivans |
| 7,711,454 B2 | 5/2010 | Addink |
| 7,711,651 B2 | 5/2010 | Baraty |
| 7,723,860 B2 | 5/2010 | Nagler |
| 7,729,993 B2 | 6/2010 | Baraty |
| 7,742,862 B2 | 6/2010 | Anderson |
| 7,774,282 B2 | 8/2010 | Baraty |
| 7,779,852 B2 | 8/2010 | Burlage |
| 7,819,020 B2 | 10/2010 | Jacobi |
| 7,822,511 B2 | 10/2010 | Ivans |
| 7,841,229 B2 | 11/2010 | Ridgway |
| 7,852,487 B2 | 12/2010 | Rembe |
| 7,856,864 B2 | 12/2010 | McEwan |
| 7,861,740 B2 | 1/2011 | Phallen |
| 7,891,246 B2 | 2/2011 | Lander |
| 7,899,580 B2 | 3/2011 | Cardinal |
| 7,900,647 B2 | 3/2011 | Tornay |
| 7,920,983 B1 | 4/2011 | Peleg |
| 7,930,069 B2 | 4/2011 | Savelle |
| 7,930,085 B2 | 4/2011 | Anderson |
| 7,940,189 B2 | 5/2011 | Brown |
| 7,944,363 B2 | 5/2011 | Kim |
| 7,949,495 B2 | 5/2011 | Wiklund |
| 7,966,099 B2 | 6/2011 | Fima |
| 7,969,318 B2 | 6/2011 | White |
| 7,970,494 B2 | 6/2011 | Fima |
| 7,994,927 B2 | 8/2011 | Atassi |
| 8,020,585 B2 | 9/2011 | Shock |
| 8,072,340 B2 | 12/2011 | Yukawa |
| 8,082,066 B2 | 12/2011 | Laverdiere |
| 8,104,340 B2 | 1/2012 | Speldrich |
| 8,109,131 B2 | 2/2012 | Winter |
| 8,130,107 B2 | 3/2012 | Meyer |
| 8,145,359 B2 | 3/2012 | Addink |
| RE43,334 E | 5/2012 | Simmons |
| 8,172,200 B2 | 5/2012 | Kroemmer |
| 8,174,398 B2 | 5/2012 | Wien |
| 8,175,752 B2 | 5/2012 | Deivasigamani |
| 8,193,942 B2 | 6/2012 | White |
| 8,205,508 B2 | 6/2012 | Healey |
| 8,205,632 B2 | 6/2012 | Fishwick |
| 8,256,304 B2 | 9/2012 | Therrian |
| 8,256,744 B2 | 9/2012 | Tanikawa |
| 8,265,887 B2 | 9/2012 | Itou |
| 8,271,143 B2 | 9/2012 | Deivasigamani |
| 8,301,309 B1 | 10/2012 | Woytoxitz |
| 8,308,857 B2 | 11/2012 | Couillard |
| 8,316,695 B2 | 11/2012 | Jarvie |
| 8,332,130 B2 | 12/2012 | Stretch |
| 8,336,544 B2 | 12/2012 | Downie |
| 8,353,221 B2 | 1/2013 | Schmid |
| 8,365,753 B2 | 2/2013 | Dana |
| 8,380,448 B2 | 2/2013 | Franklin |
| 8,434,634 B2 | 5/2013 | Bork |
| 8,439,068 B2 | 5/2013 | Croibier |
| 8,441,361 B2 | 5/2013 | McAlister |
| 8,443,822 B2 | 5/2013 | Ivans |
| 8,443,823 B1 | 5/2013 | Prager |
| 8,457,908 B2 | 6/2013 | Patel |
| 8,464,582 B2 | 6/2013 | Roux |
| 8,498,523 B2 | 7/2013 | Deivasigamani |
| 8,499,616 B2 | 8/2013 | Stoner |
| 8,504,318 B2 | 8/2013 | Mendelson |
| 8,517,051 B2 | 8/2013 | Fazekas |
| 8,531,303 B2 | 9/2013 | Pham |
| 8,548,632 B1 | 10/2013 | Porter |
| 8,561,636 B2 | 10/2013 | Eithun |
| 8,590,395 B2 | 11/2013 | Ge |
| 8,600,569 B2 | 12/2013 | Woytowitz |
| 8,606,413 B2 | 12/2013 | Picton |
| 8,607,645 B2 | 12/2013 | Laubach |
| 8,616,234 B2 | 12/2013 | Ringer |
| 8,618,941 B2 | 12/2013 | Javey |
| 8,649,907 B2 | 2/2014 | Ersavas |
| 8,662,005 B2 | 3/2014 | Chen |
| 8,666,683 B2 | 3/2014 | Rogers |
| 8,667,978 B2 | 3/2014 | Ford |
| 8,668,830 B2 | 3/2014 | Soecknick |
| 8,717,183 B2 | 5/2014 | Pal |
| 8,719,187 B2 | 5/2014 | Milanes Garcia-Moreno |
| 8,720,481 B2 | 5/2014 | Guy |
| 8,727,604 B2 | 5/2014 | Compton |
| 8,749,393 B1 | 6/2014 | Tollefson |
| 8,756,022 B2 | 6/2014 | Franklin |
| 8,793,024 B1 | 7/2014 | Woytowitz |
| 8,800,384 B2 | 8/2014 | Wootten |
| 8,800,473 B1 | 8/2014 | DeVerse |
| 8,816,866 B2 | 8/2014 | Day |
| 8,831,024 B2 | 9/2014 | Robinson |
| 8,833,384 B2 | 9/2014 | Burt |
| 8,833,405 B2 | 9/2014 | Phallen |
| 8,834,134 B2 | 9/2014 | Baker |
| 8,844,835 B2 | 9/2014 | Ford |
| 8,849,461 B2 | 9/2014 | Ersavas |
| 8,850,871 B2 | 10/2014 | Schaefer |
| 8,850,872 B2 | 10/2014 | Jarvie |
| 8,857,466 B1 | 10/2014 | Wilson |
| 8,866,634 B2 | 10/2014 | Williamson |
| 8,905,062 B2 | 12/2014 | Menet |
| 8,910,887 B2 | 12/2014 | Helmsderfer |
| 8,918,293 B2 | 12/2014 | Carmichael |
| 8,931,330 B2 | 1/2015 | Lucente |
| 8,948,979 B2 | 2/2015 | Malsam |
| 8,950,249 B2 | 2/2015 | Stoner |
| 8,965,584 B2 | 2/2015 | Deivasigamani |
| 9,010,360 B1 | 4/2015 | Older |
| 9,019,120 B2 | 4/2015 | Broniak |
| 9,032,998 B2 | 5/2015 | O'Brien |
| 9,037,422 B2 | 5/2015 | McHugh |
| 9,062,895 B2 | 6/2015 | Deivasigamani |
| 9,081,389 B2 | 7/2015 | Foster |
| 9,120,116 B2 | 9/2015 | Gorman |
| 9,140,255 B2 | 9/2015 | Wetherill |
| 9,140,377 B2 | 9/2015 | Becker |
| 9,146,172 B2 | 9/2015 | Trescott |
| 9,151,022 B2 | 10/2015 | Patel |
| 9,157,540 B2 | 10/2015 | Larsen |
| 9,207,143 B2 | 12/2015 | Franklin |
| 9,222,490 B2 | 12/2015 | Fishwick |
| 9,222,848 B2 | 12/2015 | Cho |
| 9,234,679 B2 | 1/2016 | Deivasigamani |
| 9,239,059 B2 | 1/2016 | Locke |
| 9,241,451 B2 | 1/2016 | Ersavas |
| 9,244,449 B2 | 1/2016 | Tennyson |
| 9,250,105 B2 | 2/2016 | Patel |
| 9,258,952 B2 | 2/2016 | Walker |
| 9,261,218 B2 | 2/2016 | Cheatham |
| 9,265,204 B2 | 2/2016 | Younis |
| 9,275,536 B2 | 3/2016 | Wetherill |
| 9,291,520 B2 | 3/2016 | Fleury |
| 9,297,150 B2 | 3/2016 | Klicpera |
| 9,297,467 B1 | 3/2016 | Goseco |
| 9,298,191 B2 | 3/2016 | Meyer |
| 9,322,682 B2 | 4/2016 | White |
| 9,393,586 B2 | 7/2016 | Donner |
| 9,410,636 B2 | 8/2016 | Older |
| 9,470,562 B2 | 10/2016 | Frisch |
| 9,476,517 B2 | 10/2016 | Gomes, II |
| 9,494,480 B2 | 11/2016 | Klicpera |
| 9,506,785 B2 | 11/2016 | Turk |
| 9,597,699 B2 | 3/2017 | Helmsderfer |
| 9,724,708 B2 | 8/2017 | Helmsderfer |
| 9,749,792 B2 | 8/2017 | Klicpera |

(56) References Cited

U.S. PATENT DOCUMENTS

| | | |
|---|---|---|
| 1,579,227 A1 | 10/2017 | Allen |
| 9,832,939 B2 | 12/2017 | Russell |
| 9,847,265 B2 | 12/2017 | Donner |
| 9,857,805 B2 | 1/2018 | Halimi |
| 1,003,924 A1 | 8/2018 | Darnold |
| 1,011,953 A1 | 11/2018 | Wetherill |
| 2001/0049563 A1 | 12/2001 | Addink |
| 2002/0002425 A1 | 1/2002 | Dossey |
| 2002/0010516 A1 | 1/2002 | Addink |
| 2002/0059836 A1 | 5/2002 | Dodsworth |
| 2003/0047008 A1 | 3/2003 | Gopalakrishnan |
| 2003/0109964 A1 | 6/2003 | Addink |
| 2003/0111178 A1 | 6/2003 | Morita |
| 2003/0179102 A1 | 9/2003 | Barnes |
| 2003/0182022 A1 | 9/2003 | Addink |
| 2003/0183018 A1 | 10/2003 | Addink |
| 2003/0197617 A1 | 10/2003 | Berger |
| 2004/0015270 A1 | 1/2004 | Addink |
| 2004/0073524 A1 | 4/2004 | Smith |
| 2004/0128034 A1 | 7/2004 | Lenker |
| 2004/0206405 A1 | 10/2004 | Smith |
| 2004/0217041 A1 | 11/2004 | Baarman |
| 2004/0217189 A1 | 11/2004 | Regli |
| 2005/0028609 A1 | 2/2005 | Langemann |
| 2005/0039546 A1 | 2/2005 | Payne |
| 2005/0067049 A1 | 3/2005 | Fima |
| 2005/0126635 A1 | 6/2005 | Addink |
| 2005/0166666 A1 | 8/2005 | Tsukagoshi |
| 2005/0195078 A1 | 9/2005 | Basinger |
| 2005/0199842 A1 | 9/2005 | Parsons |
| 2005/0224118 A1 | 10/2005 | Tornay |
| 2005/0229716 A1 | 10/2005 | Unsworth |
| 2005/0235306 A1 | 10/2005 | Fima |
| 2005/0279169 A1 | 12/2005 | Lander |
| 2006/0005620 A1 | 1/2006 | Koike |
| 2006/0027267 A1 | 2/2006 | Fritze |
| 2006/0030990 A1 | 2/2006 | Anderson |
| 2006/0102236 A1 | 5/2006 | Phillips |
| 2006/0137419 A1 | 6/2006 | Mizohata |
| 2006/0157580 A1 | 7/2006 | Regli |
| 2006/0168611 A1 | 7/2006 | Fima |
| 2006/0174707 A1 | 8/2006 | Zhang |
| 2006/0196212 A1 | 9/2006 | Jenkins |
| 2006/0202051 A1 | 9/2006 | Parsons |
| 2006/0248934 A9 | 11/2006 | Mizohata |
| 2006/0260691 A1 | 11/2006 | Davidoff |
| 2006/0267758 A1 | 11/2006 | Barth |
| 2006/0272704 A1 | 12/2006 | Fima |
| 2006/0272830 A1 | 12/2006 | Fima |
| 2007/0068225 A1 | 3/2007 | Brown |
| 2007/0095400 A1 | 5/2007 | Bergquist |
| 2007/0130317 A1 | 6/2007 | Lander |
| 2007/0193334 A1 | 8/2007 | Hays |
| 2007/0221223 A1 | 9/2007 | McDermott |
| 2007/0284550 A1 | 12/2007 | Smith |
| 2008/0142115 A1 | 6/2008 | Vogt |
| 2008/0143540 A1 | 6/2008 | Savla |
| 2008/0173084 A1 | 7/2008 | Wiesinger |
| 2008/0184775 A1 | 8/2008 | Yamagishi |
| 2008/0184781 A1 | 8/2008 | Mulligan |
| 2008/0185049 A1 | 8/2008 | Mulligan |
| 2008/0185050 A1 | 8/2008 | Mulligan |
| 2008/0188991 A1 | 8/2008 | Mulligan |
| 2008/0266125 A1 | 10/2008 | Windisch |
| 2008/0276722 A1 | 11/2008 | Wiedmann |
| 2008/0284175 A1 | 11/2008 | Nagler |
| 2008/0285049 A1 | 11/2008 | Rembe |
| 2008/0295895 A1 | 12/2008 | Vincent |
| 2009/0001193 A1 | 1/2009 | Parsons |
| 2009/0007968 A1 | 1/2009 | Knecht |
| 2009/0035121 A1 | 2/2009 | Watson |
| 2009/0085756 A1 | 4/2009 | Atassi |
| 2009/0091461 A1 | 4/2009 | Kim |
| 2009/0123340 A1 | 5/2009 | Knudsen |
| 2009/0179165 A1 | 7/2009 | Parsons |
| 2009/0194719 A1 | 8/2009 | Mulligan |
| 2009/0235992 A1 | 9/2009 | Armstrong |
| 2009/0283160 A1 | 11/2009 | Fishwick |
| 2009/0301173 A1 | 12/2009 | Lamberti |
| 2009/0321535 A1 | 12/2009 | Davis |
| 2010/0023170 A1 | 1/2010 | Sherwood |
| 2010/0023172 A1 | 1/2010 | Malinowski |
| 2010/0038440 A1 | 2/2010 | Ersavas |
| 2010/0045471 A1 | 2/2010 | Meyers |
| 2010/0071458 A1 | 3/2010 | Wiedenhoefer |
| 2010/0132803 A1 | 6/2010 | Fima |
| 2010/0145635 A1 | 6/2010 | Pauncz |
| 2010/0204839 A1 | 8/2010 | Behm |
| 2010/0212748 A1 | 8/2010 | Davidoff |
| 2010/0212752 A1 | 8/2010 | Fima |
| 2010/0258204 A1 | 10/2010 | Cipolla |
| 2010/0289652 A1 | 11/2010 | Javey |
| 2010/0294021 A1 | 11/2010 | Makino |
| 2010/0312438 A1 | 12/2010 | Cooley |
| 2010/0326372 A1 | 12/2010 | Kim |
| 2011/0035063 A1 | 2/2011 | Palayur |
| 2011/0050395 A1 | 3/2011 | Ervin |
| 2011/0054712 A1 | 3/2011 | Baraty |
| 2011/0073189 A1 | 3/2011 | Elbert |
| 2011/0155269 A1 | 6/2011 | Martin |
| 2011/0166714 A1 | 7/2011 | Stachnik |
| 2011/0174706 A1 | 7/2011 | Russell |
| 2011/0190947 A1 | 8/2011 | Savelle |
| 2011/0191267 A1 | 8/2011 | Savic |
| 2011/0232770 A1 | 9/2011 | Baggett |
| 2011/0302995 A1 | 12/2011 | Lebeau |
| 2011/0309274 A1 | 12/2011 | Parsons |
| 2012/0024080 A1 | 2/2012 | Carbone, II |
| 2012/0036091 A1 | 2/2012 | Cook |
| 2012/0056711 A1 | 3/2012 | Hanrahan |
| 2012/0084023 A1 | 4/2012 | Mavridoglou |
| 2012/0160034 A1 | 6/2012 | Bardon |
| 2012/0191260 A1 | 7/2012 | Addink |
| 2012/0191380 A1 | 7/2012 | Winter |
| 2012/0216895 A1 | 8/2012 | Fishwick |
| 2012/0223153 A1 | 9/2012 | Helmsderfer |
| 2012/0298220 A1 | 11/2012 | Hidaka |
| 2012/0324985 A1 | 12/2012 | Gu |
| 2013/0037624 A1 | 2/2013 | Helmsderfer |
| 2013/0085690 A1 | 4/2013 | Fei |
| 2013/0174649 A1 | 7/2013 | Hains |
| 2013/0248023 A1 | 9/2013 | Estrada |
| 2013/0255786 A1 | 10/2013 | Nakai |
| 2013/0291974 A1 | 11/2013 | Bourgeois |
| 2013/0310992 A1 | 11/2013 | Larsen |
| 2013/0325194 A1 | 12/2013 | Brine |
| 2013/0325371 A1 | 12/2013 | Brine |
| 2013/0332397 A1 | 12/2013 | Scolnicov |
| 2013/0335218 A1 | 12/2013 | Jones |
| 2013/0341420 A1 | 12/2013 | Lister |
| 2014/0069506 A1 | 3/2014 | Helmsderfer |
| 2014/0077108 A1 | 3/2014 | Ringer |
| 2014/0109644 A1 | 4/2014 | Carbone, II |
| 2014/0121999 A1 | 5/2014 | Bracken |
| 2014/0129039 A1 | 5/2014 | Olive-Chahinian |
| 2014/0196802 A1 | 7/2014 | Guy |
| 2014/0222223 A1 | 8/2014 | Horton |
| 2014/0230925 A1 | 8/2014 | Halimi |
| 2014/0236868 A1 | 8/2014 | Cook |
| 2014/0245208 A1 | 8/2014 | Javey |
| 2014/0251478 A1 | 9/2014 | Dolezilek |
| 2014/0257720 A1 | 9/2014 | Smirnov |
| 2014/0261714 A1 | 9/2014 | Burt |
| 2014/0288858 A1 | 9/2014 | Franklin |
| 2014/0306828 A1 | 10/2014 | Trescott |
| 2014/0316723 A1 | 10/2014 | Rogers |
| 2014/0331745 A1 | 11/2014 | Schaefer |
| 2014/0332088 A1 | 11/2014 | Senesh |
| 2014/0343736 A1 | 11/2014 | Meyer |
| 2014/0345516 A1 | 11/2014 | DeVerse |
| 2014/0348205 A1 | 11/2014 | Shaw |
| 2014/0366612 A1 | 12/2014 | Horne |
| 2015/0002300 A1 | 1/2015 | Cho |
| 2015/0007897 A1 | 1/2015 | Valentine |

(56) References Cited

U.S. PATENT DOCUMENTS

| | | |
|---|---|---|
| 2015/0045970 A1 | 2/2015 | Anderson |
| 2015/0051743 A1 | 2/2015 | Darnold |
| 2015/0069084 A1 | 3/2015 | Phallen |
| 2015/0097059 A1 | 4/2015 | Helmsderfer |
| 2015/0102136 A1 | 4/2015 | Malsam |
| 2015/0114490 A1 | 4/2015 | Carpenter |
| 2015/0122364 A1 | 5/2015 | Cheatham |
| 2015/0152861 A1 | 6/2015 | Stoner |
| 2015/0204701 A1 | 7/2015 | Klicpera |
| 2015/0206255 A1 | 7/2015 | Groeneveld |
| 2015/0211510 A1 | 7/2015 | Walsh |
| 2015/0211650 A1 | 7/2015 | Older |
| 2015/0247586 A1 | 9/2015 | Gomes, II |
| 2015/0253163 A1 | 9/2015 | Ruiz Cortez |
| 2015/0260310 A1 | 9/2015 | Bahalul |
| 2015/0286222 A1 | 10/2015 | Goldstein |
| 2015/0308084 A1 | 10/2015 | Thompson |
| 2015/0308089 A1 | 10/2015 | Thompson |
| 2015/0316936 A1 | 11/2015 | McCarrick |
| 2015/0323097 A1 | 11/2015 | Stoltz |
| 2015/0323412 A1 | 11/2015 | Stoltz |
| 2015/0348395 A1 | 12/2015 | Trout |
| 2015/0355045 A1 | 12/2015 | Solomon |
| 2015/0367357 A1 | 12/2015 | Humpal |
| 2015/0367358 A1 | 12/2015 | Funseth |
| 2015/0375247 A1 | 12/2015 | Funseth |
| 2015/0376874 A1 | 12/2015 | Breedlove |
| 2015/0376875 A1 | 12/2015 | Patel |
| 2016/0011072 A1 | 1/2016 | Hale |
| 2016/0018283 A1 | 1/2016 | Fleury |
| 2016/0037736 A1 | 2/2016 | Rainone |
| 2016/0041565 A1 | 2/2016 | Edwards |
| 2016/0048135 A1 | 2/2016 | Hill |
| 2016/0050859 A1 | 2/2016 | Larsen |
| 2016/0055649 A1 | 2/2016 | Peret |
| 2016/0069772 A1 | 3/2016 | Gnoss |
| 2016/0073063 A1 | 3/2016 | Peret |
| 2016/0076909 A1 | 3/2016 | Klicpera |
| 2016/0076965 A1 | 3/2016 | Edris |
| 2016/0083937 A1 | 3/2016 | Cavarec |
| 2016/0090717 A1 | 3/2016 | Trescott |
| 2016/0113220 A1 | 4/2016 | Walker |
| 2016/0163177 A1 | 6/2016 | Klicpera |
| 2016/0197467 A1 | 7/2016 | Stepp |
| 2016/0219805 A1 | 8/2016 | Romney |
| 2016/0288156 A1 | 10/2016 | Donner |
| 2016/0345515 A1 | 12/2016 | Helmsderfer |
| 2016/0377464 A1 | 12/2016 | Adlon |
| 2017/0061727 A1 | 3/2017 | Savaëe |
| 2017/0204820 A1 | 7/2017 | Dirnberger |
| 2017/0259226 A1 | 9/2017 | Bayer |
| 2017/0318761 A1 | 11/2017 | Rainone |
| 2017/0333919 A1 | 11/2017 | Helmsderfer |
| 2017/0345728 A1 | 11/2017 | Donner |
| 2017/0370754 A1 | 12/2017 | Croteau |
| 2018/0106655 A1 | 4/2018 | Kilcran |
| 2018/0136673 A1 | 5/2018 | Halimi |
| 2018/0172537 A1 | 6/2018 | Cimberio |
| 2018/0220600 A1 | 8/2018 | Russell |
| 2018/0259982 A1 | 9/2018 | Halimi |
| 2018/0338435 A1 | 11/2018 | Darnold |

OTHER PUBLICATIONS

Catron, Mark. Dial Artwork-International: Ted Concept #1a and #1b, Rain Bird®, Jun. 18, 2018, 2 pages.
Catron, Mark. Bezel Artwork Concepts, Rain Bird®, dated Dec. 10, 2017, 8 pages.
Catron, Mark. Bezel Artwork Concepts, Rain Bird®, dated Dec. 4, 2017, 6 pages.
Catron, Mark. Bezel Artwork Overview. Rain Bird®, dated May 25, 2018, 5 pages.
Catron, Mark. Concept 1 and Concept 2, Rain Bird®, Mar. 17, 2018, 2 pages.
Catron, Mark. Dial Artwork—Domestic: Ted Concept #1 a, #1 b, #2a, and #2b, Rain Bird®, Jun. 10, 2018, 4 pages.
Catron, Mark. Dial Artwork—Domestic: Ted Concept #1 a, #1 b, and #2, Rain Bird®, Jun. 8, 2018, 3 pages.
Catron, Mark. Dial Artwork—International and Domestic, Rain Bird®, dated Jun. 5, 2018, 2 pages.
FLOWVIS® Flow Meter, H2Flow Controls: Progress Through Innovation™, <www.h2flow.net>, 2018, 5 pages.
International Search Report and Written Opinion, International Application No. PCT/US2017/042004, dated Sep. 14, 2017, 6 pages.
Owfeel of 3 Dragonfly Toy Plastic Twisty Flying Saucers Spinning Shooter Flying Disc Toys, <https://www.amazon.com/Owfeel-Dragonfly-Spinning-Children-Randomly/dp/B00IDUPUY0>, at least prior to Jul. 13, 2017, 1 page.
Rain Bird® Catalog, Landscape Irrigation Products, 2008-2009, p. 40.
Rain Bird® Initial Concepts, Nov. 8, 2017, 1 page.
Rain Bird® Owner's Manual for Flow Sensors by Data Industrial, Mar. 23, 2015, 11 pages.
Rain Bird® PT3002 Flow Sensor Transmitter, Installation and Programming Instructions, 2012, 48 pages.
Rain Bird® Scale: 2-1 (200%), GPM Flow Full Indexes, at least prior to Jul. 13, 2017, p. 1.
Rain Bird® Scale: 2-1 (200%), GPM Flow, at least prior to Jul. 13, 2017, p. 1.
Rain Bird® Tech Spec, Flow Sensors—BSP: Flow Sensing for Maxicom2®, SiteControl™, IQ™ v2.0, LXD, LXME, LXMEF, <www.rainbird.com>, 2015, 5 pages.
Rain Bird® Tech Spec, Flow Sensors—NPT: Flow Sensing for Maxicom2®, SiteControl™, IQ2v2.0, ESP-LXD, ESP-LXMEF, <www.rainbird.com>, 2015, 5 pages.
Rain Bird® Troubleshooting Guide, FS Series Flow Sensors, 2016, 2 pages.
Rotameter, <https://en.wikipedia.org/wiki/Rotameter>, Wikipedia, at least prior to Jul. 13, 2017, 3 pages.
U.S. Appl. No. 15/792,273; Office Action dated Mar. 15, 2019; (pp. 1-14).
1998 Polaris RMK 700 Fuel Cap / Gas Gauge, <https://www.ebay.com/itm/1998-POLARIS-RMK-700-Fuel-Cap-Gas-Gauge/283761973379?>, 10 pages, publicly available before Jul. 13, 2015.

\* cited by examiner

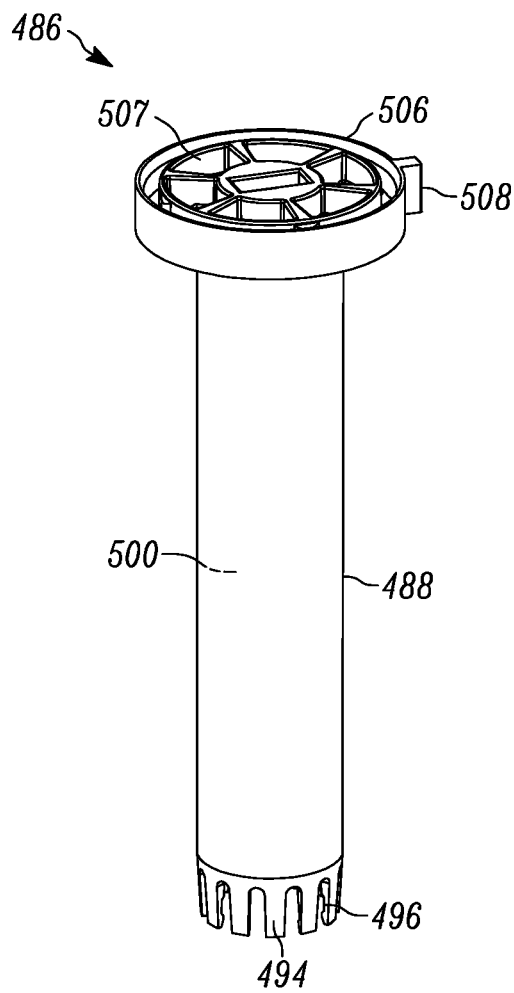
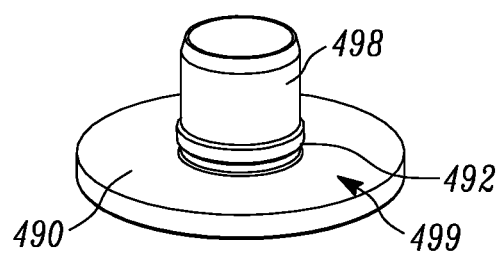
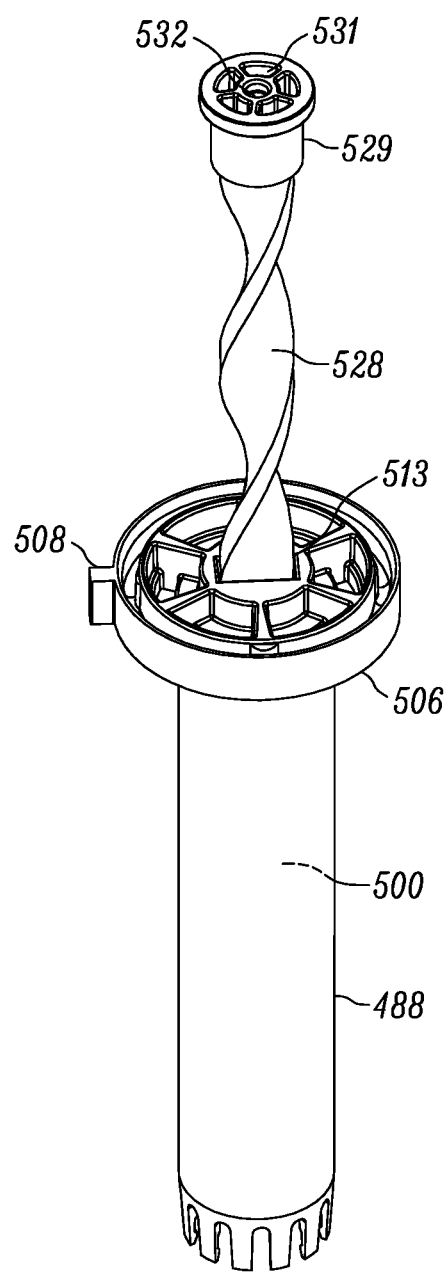
FIG. 26          FIG. 27

FLOW SENSOR

This application claims the benefit of U.S. Provisional Application No. 62/427,675, filed Nov. 29, 2016, and U.S. Provisional Application No. 62/361,873, filed Jul. 13, 2016, which both are herein incorporated by reference.

FIELD

The present invention relates to monitoring fluid flow and, more particularly, to flow devices and methods for monitoring fluid flow and leaks.

BACKGROUND

Fluid systems, such as irrigation systems, are controlled by components, such as valves, upstream in the system. These control components are known to leak from time-to-time. The leaks can be caused by debris being caught between the valve member and the valve seat or the results of normal wear and tear on the valve. Also, in many fluid systems, there are fluid distribution devices downstream from the control components. For example, irrigation systems include water emitting devices downstream of the control components. These water emitting devices also can become defective from normal wear and tear or can be damaged from normal lawn care or by vandalism. As a result, excessive water is distributed from the system. Also, the piping or conduit in such system can be damaged. For instance, one could unintentionally spike buried irrigation conduits with a shovel or other tool or machine during lawn care. Further, fluid systems can develop blockage in the lines and the components which will cause an undesired amount of fluid to be delivered through system. With an irrigation system, this could result in insufficient water being delivered to the vegetation. Overall, the damage or interference with proper flow in a fluid system can result in damage and additional cost.

It is desired to have a flow sensor and method that easily and cost effectively monitors for leaks and measures flow in the fluid system.

BRIEF DESCRIPTION OF THE DRAWINGS

FIG. 26 is a top perspective, exploded view of a piston of the flow sensor of FIG. 19;
FIG. 27 is a top perspective view of a twisted shaft of the flow sensor of FIG. 19 and the piston of FIG. 26.

DETAILED DESCRIPTION

Figure 1:
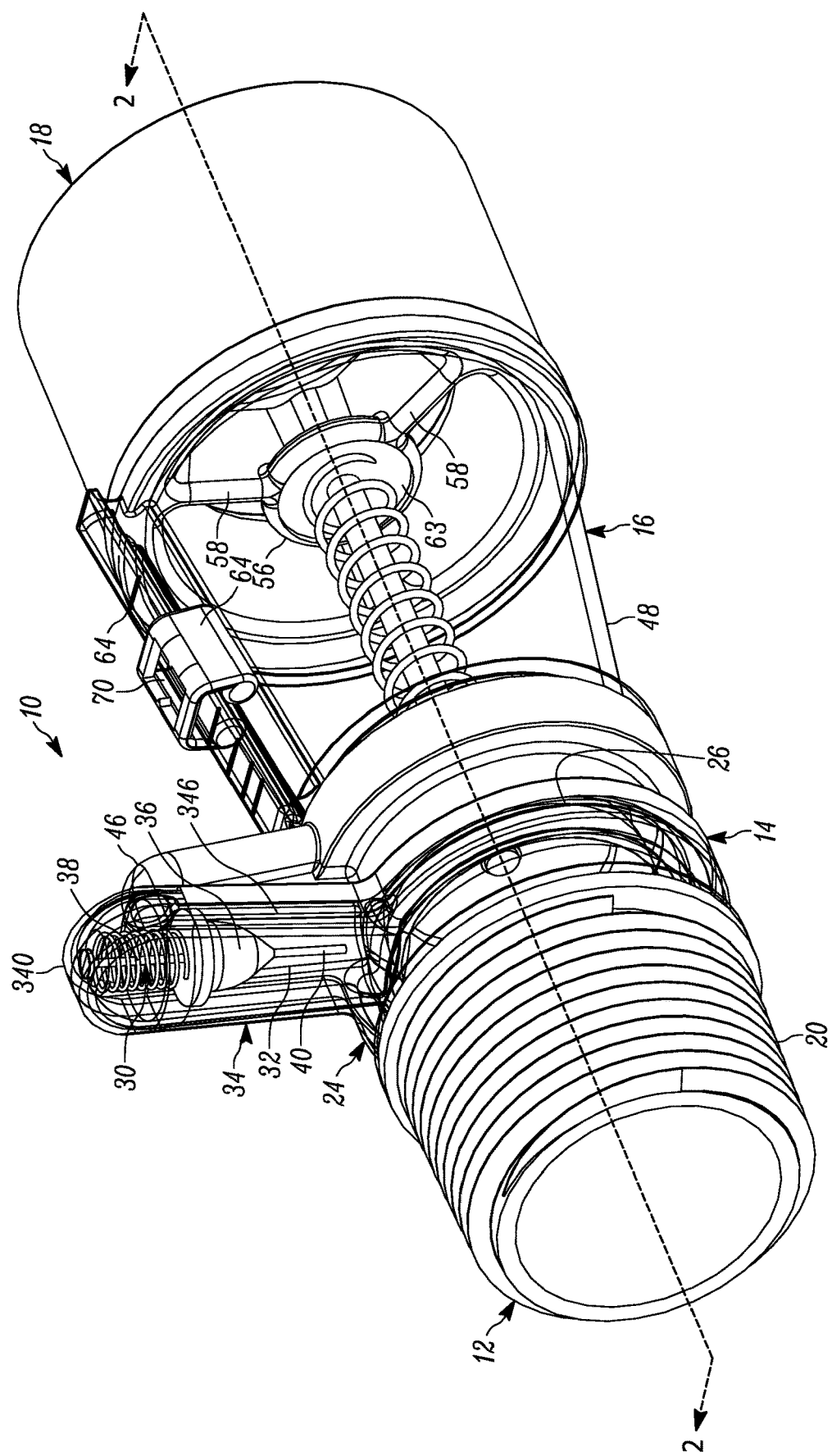
FIG. 1 is a perspective view of a flow sensor.
Figure 2:
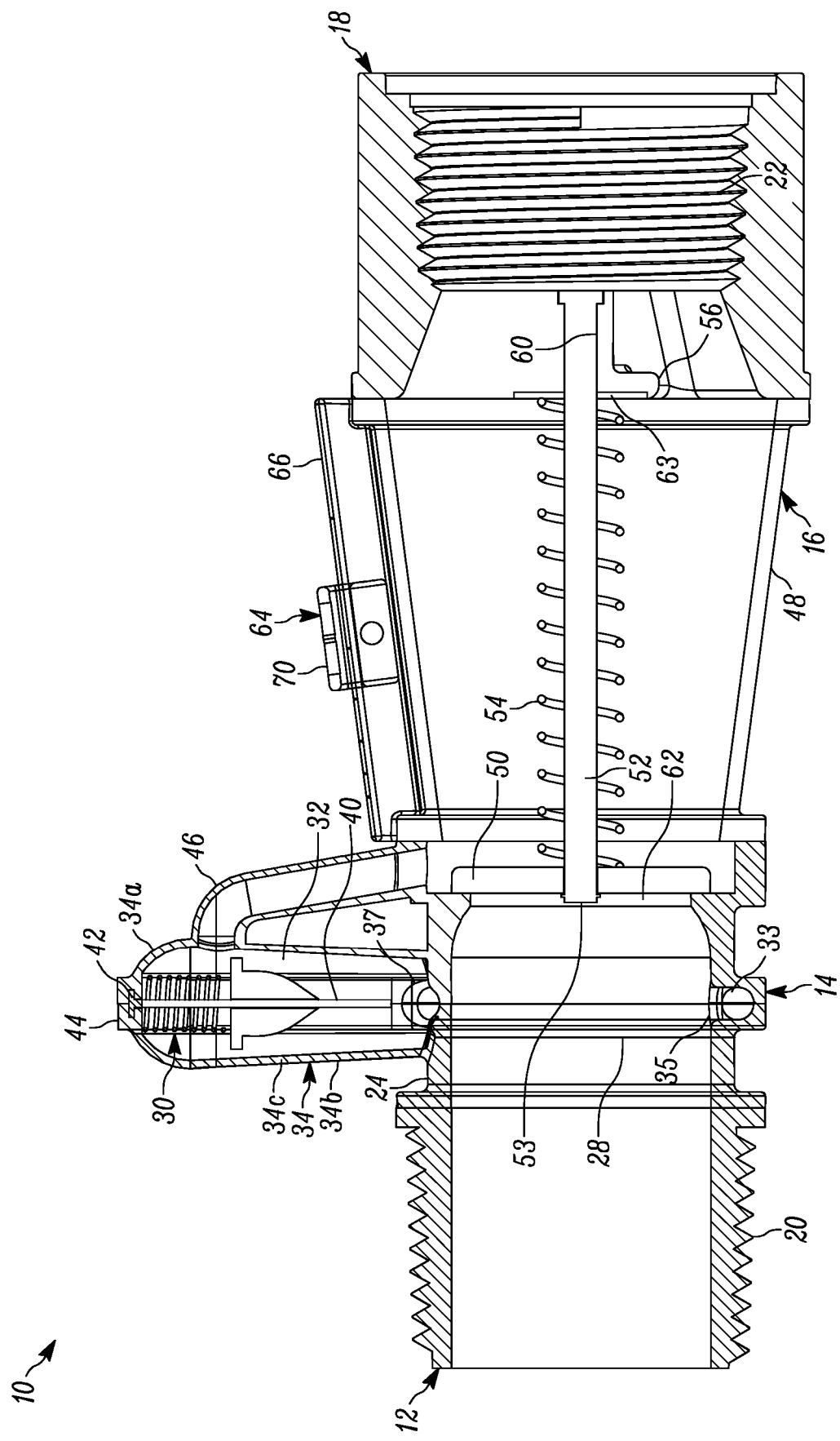
FIG. 2 is a central cross-sectional view of the flow sensor of FIG. 1.
Figure 3:
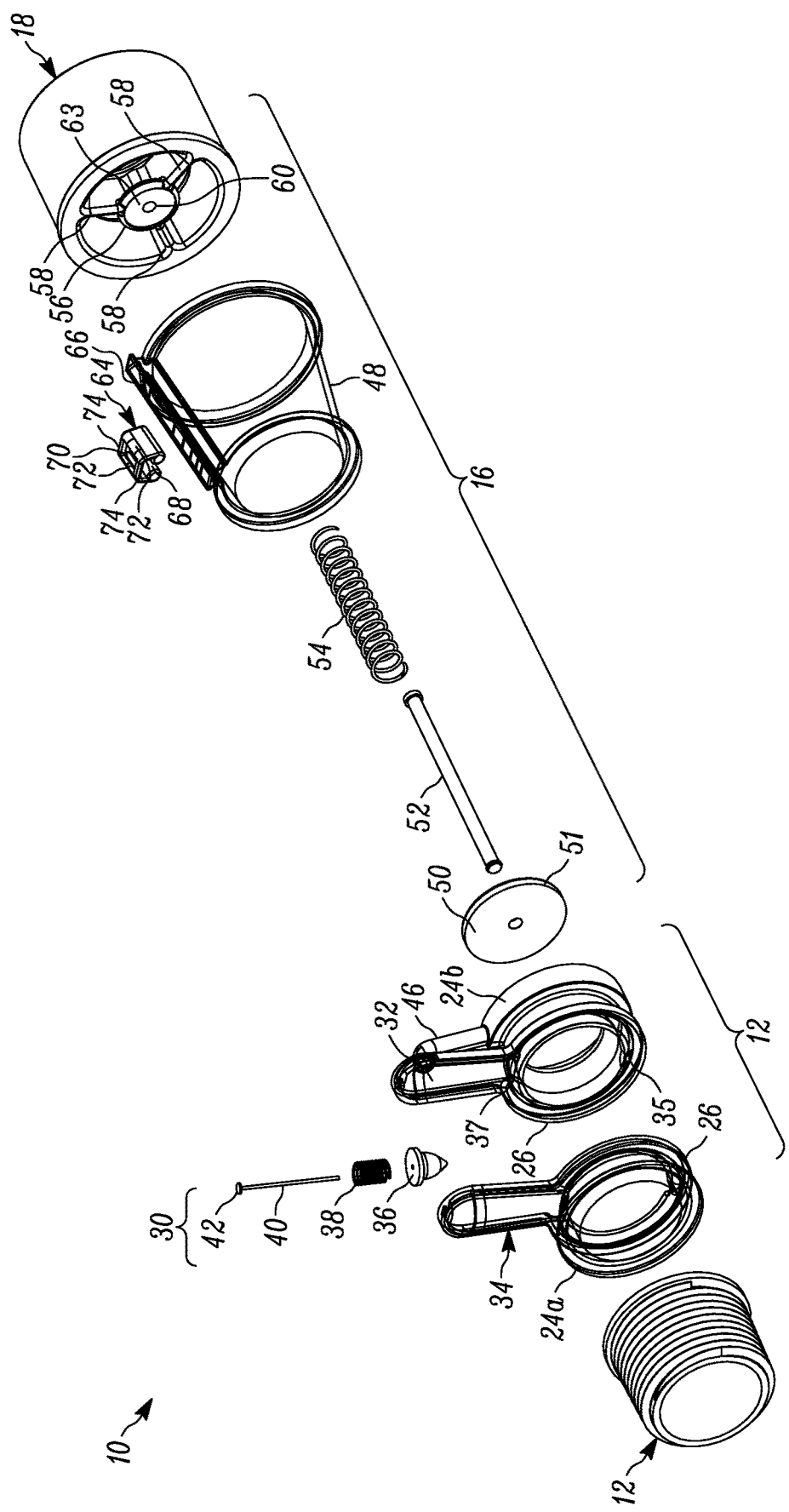
FIG. 3 is an exploded view of the flow sensor of FIG. 1.

Referring to FIGS. 1-3, there is shown a flow sensor 10. The flow sensor 10 can be embedded into a fluid system, such as an irrigation system. The flow sensor 10 includes an inlet 12 portion, a leak detector 14, a flow meter 16 and an outlet portion 18. The leak detector 14 monitors upstream components, such as a valve, for leaks. The flow meter 16 monitors flow to detect whether the flow is above or below a normal amount or range for the system. For example, in an irrigation system, if the flow is above a normal amount or range, this indicates that there is a leak downstream in the system, such as in the conduit and/or watering emission device(s). On the other hand, if the flow is below the predetermined amount, this indicates that there may be a clog in the system, such as in the flow conduit and/or watering emission device(s) or that the valve upstream is not operating properly.

The inlet portion 12 and the outlet portion 18 are configured for attachment of the flow sensor 10 to conduit in the system. As illustrated, the inlet portion 12 includes exterior threading 20, which can be male NPT thread, for being threaded into an interior threaded conduit end. The outlet portion 18 includes internal threading 22, which can be female NPT thread, for cooperating with external threading on a downstream conduit end. Alternatively, the inlet portion and outlet portion could both be male threaded or female threaded. Also, instead of threading, the inlet portion and the outlet portion could have smooth surfaces that are glued to the inner and outer surfaces of the upstream conduit and downstream conduit, respectively. The inlet portion 12 extends from the leak detector 14, and the outlet portion 18 extends from a portion of the flow meter 16.

The leak detector 14 includes a housing 24 disposed between the inlet portion 12 and the flow sensor 16. The housing 24 can be a two piece housing with an upstream portion 24a and a downstream portion 24b. Alternatively, the housing could be one piece. The housing 24 includes a lower portion 26 that provides a flow passage 28 to the flow meter 16 and an upper portion 34 that provides a leak indicator system 30.

The leak detector 14 includes a chamber 32 extending upward from the lower portion 26 of the housing 24. The chamber 32 is defined by the upper portion 34 of the housing 24 and includes a transparent upper portion 34a and an opaque or semi-transparent lower portion 34b. Alternatively, as explained further below, the upper portion 34a and the lower portion 34b both could be opaque or semi-transparent, and a third portion 34c in between the upper and lower portions 34a, 34b could be transparent. The leak detector 14 further includes a flow indicator 36 and a spring 38 disposed on a shaft 40. The shaft 40 includes a head 42 that is used to pin the shaft 40 to an upper end 44 of the upper portion 34 of the housing 24. The spring 38 is disposed between the upper end 44 of the chamber 32 and the flow indicator 36 to bias the flow indicator 36 down into the opaque portion 34b of the chamber 32.

The chamber 32 is able to receive fluid flow from the passage 28. More specifically, the housing 24 forms an annular chamber 33 and defines a first opening 35 to the annular chamber 33 from the flow passage 28. The first opening 35 is located diametrically opposite from the chamber 32. The annular chamber 33 has a second opening 37 at the annular chamber 33. Fluid flows from the passage 28 through the first opening 35, around the annular chamber 33 (through one or both sides) and, then, through the second opening 37 into the chamber 32 of the leak detector 14. A drain passage 46 is on the downstream side of the chamber 32. The drain passage 46 dumps fluid flowing through the leak detector 14 into the flow meter 16.

In operation, when pressurized flow of fluid to the flow sensor 10 is discontinued, the flow meter 16 closes so that fluid cannot flow further downstream, such as due to gravity. If flow continues on the upstream side, it will flow through the annular chamber 33 and cause the flow indicator 36 to rise upward in the chamber 32 against the bias of the spring 38. The spring force is selected so that the flow indicator 36 can detect very small amounts of flow, such as that from a leaking control valve of an irrigation system. When there is a leak, the flow indicator 36 will rise up on the shaft 40 in the chamber 32 into the transparent portion 34a of the upper portion 34 or in another form of the embodiment into the transparent portion 34c. The flow indicator 36 can be of a color, such as red, that is easily seen through the transparent portion 34a or 34c of the upper portion 34.

When the system is operating normally, the flow indicator 36 does not indicate a leak situation. In one embodiment, the chamber 32 can be bypassed by the flow through the sensor 10. To do so, the second inlet 32 to the chamber 32 can be oriented to face downstream or the housing 24 can be angled upstream, or both features can be used. This upstream orientation renders it difficult for the downstream moving flow to form an upstream flow to access the chamber 32. Also, the second opening 37 can be made relatively small. In another embodiment, the second inlet 37 could allow flow into the chamber 37, but the housing 24 would have three portions, as mentioned above. The lower and upper opaque or semi-transparent portions 34a, 34b and the transparent center portion 34c between portions 34a, 34b. When flow is flowing normally, the flow also would flow through the leak detector 14 moving the flow indicator 36 up to the upper opaque portion 34a. When the flow is off, the flow indicator 36 moves to the lower opaque portion 34b. If there is a leak detected, the flow indicator 36 would move to the transparent center portion 34c.

The flow meter 16 includes a conical housing 48 that enlarges in the downstream direction and can be transparent. The flow meter 16 further includes a piston 50 connected to one end of a shaft 52 and spring 54 disposed about the shaft 52. More specifically, the piston 50 is held at the end of shaft 52 by a shaft head 53 and the spring 54. The piston 50 is disc shaped but can be any other shape that restricts flow. The outlet portion 18 includes a center hub 56 that is supported by one or more radial spikes. In the illustrated embodiment, there are three radial spokes 58 interconnecting the hub 56 and the outlet portion 18. The hub 56 includes a central passage 60 through which the shaft 52 translates as the piston 50 moves back and forth. Alternatively, the shaft 52 could be fixed against movement relative to the passage 60, and the piston 50 could reciprocate along the shaft 52. In this alternate embodiment, the piston 50 would not be fixed to the end of the shaft 52. The spring 54 engages the piston 50 and an enlarged landing 63 on the central hub 56 to bias the piston 50 toward a seat 62 formed about the inner perimeter of the downstream side of the housing 24 of the leak detector 14.

The piston 50, the spring 54 and the conical housing 48 are coordinated to measure flow through the conical housing 48. Since the piston 50 has a constant diameter, the radial distance between a perimeter 51 of the piston 50 and the conical housing 48 increases as the piston 50 translates downstream. This enables the flow meter to have a reduced overall length when compared to a constant diameter housing. More specifically, in general, higher velocities mean a higher force on the piston 50. For an expanding area, such as that provided by the conical housing 48, the velocity will decrease over the length for a given flow rate. So, at higher flow rates, the piston 50 will be located in a section of the conical housing 48 with a larger cross-sectional area, and therefore, have a lower velocity. The advantage is that the flow meter can be shorter for the same flow rate range, and there will be a lower pressure drop.

The foregoing is illustrated by the following examples. In a first example, the conical housing has an inlet diameter of 1.0 in., an outlet diameter of 1.48 in., and an axial length of 1.8 in. The piston has a diameter of 0.97 in., and the spring rate is 0.50 lb/in. In operation, the following table shows the piston position from the inlet and the spring displacement for 5.0 gpm and 20.0 gpm flow rates.

| Flow Rate (gpm) | Piston Position From Inlet (in) | Spring Displacement (in) |
|---|---|---|
| 5.0 | 0.52 | 0.52 |
| 20.0 | 1.75 | 1.75 |

In a second example for comparison, a straight housing has a diameter of 1.0. The piston has a diameter of 0.97, and a spring rate of 0.50. In operation, the following table shows the spring displacement for 1.0 gpm and 20.0 gpm flow rates.

| Flow Rate (gpm) | Spring Displacement (in) |
|---|---|
| 5.0 | 0.52 |
| 20.0 | 8.33 |

The comparison of the spring displacements demonstrates that the conical housing can be much shorter than the straight housing. For a flow rate of 20.0 gpm, the conical housing has a spring displacement of 1.75 in. versus 8.33 in. for the straight housing.

When there is no pressurized flow in the system, the piston 50 rests on the seat 52 and prevents flow from draining downstream in the system. The seat 52 or the upstream surface of the piston 50 that engages the seat 52 could include an elastomeric material that enhances the seal between the two. In this position, the drain passage 46 of the flow detector dumps fluid flowing through the leak detector 14 into the flow meter 16 downstream of the piston 50.

When pressurized flow is on, the piston 50 moves downstream a distance dependent on the flow amount. The piston 50 movement can be visualized through the transparent conical housing 48. When the system is operating normally, the piston 50 moves downstream about same amount every time the system is pressurized. There may be slight variations in the distances due to supply pressure fluctuations. This distance or range can be saved using a sliding indicator 64 on the top of the conical housing 48.

More specifically, the top of the conical housing 48 includes a linear track 66 having a predetermined cross-section. The bottom of the sliding indicator 64 includes a complementary slot 68 to receive and translate along the track 66. As illustrated, the track 66 can have a T-shape cross-section, but other cross-sections can be used as well. There is sufficient friction between the linear track 66 and the slot 68 so that the sliding indicator 64 does not inadvertently translate. Also, a set screw (not shown) can be threaded through a hole in the sliding indicator 64 to engage the track 66 to further prevent unintentional movement of the sliding indicator 64 along the track 66. The set screw can include a head configured for use with only a tool, such as an Allen wrench or screwdriver. This will help prevent unintentional movement of the slider because the slider will require a tool to be loosened and normal vibrating will not cause the slider to move inadvertently. The sliding indicator 64 also defines a window 70 that one can use to center the sliding indicator 64 over the piston 50 to record the location of the piston 50 when the fluid system is operating normally. This positioning may be checked over a few iterations of turning on and off the system over a couple of days to account for fluctuations in supply pressure. Further, the track 66 can include a scale 65 indicating a particular number of gallons per minute or hour flowing through the flow sensor 10. Due to the conical design of the housing 48, the scale may not be linear in that the tick mark spacing may vary and become closer towards one end.

The sliding indicator 64 also may include coloring to aid in determining the operation of the fluid system. For example, sides 72 of the window 70 may be colored green to indicate proper operation, and ends 74 of the window 70 may be colored red to indicate improper operation. When the piston 50 is positioned in the window 70 along the green sides 70 of the window, the system is operating normally. On the other hand, when the piston 50 is downstream of the red on the downstream end 74 of the window 70, this would indicate that there is too much flow through the system. Accordingly, the system should be checked for leaks. In an irrigation system, for instance, the excess flow could be a nozzle missing from a sprinkler device or breaks in the conduit. Similarly, when the piston 50 is upstream of the red on the upstream end 74 of the window 70, this would indicate that there is insufficient flow through the system. The system should be checked to make sure that there are no clogs upstream and downstream in the system. In an irrigation system, one should check to make sure the upstream valve is operating properly to provide proper flow and that there are no downstream irrigation devices that are failing or working improperly, such as being clogged.

Figure 4:
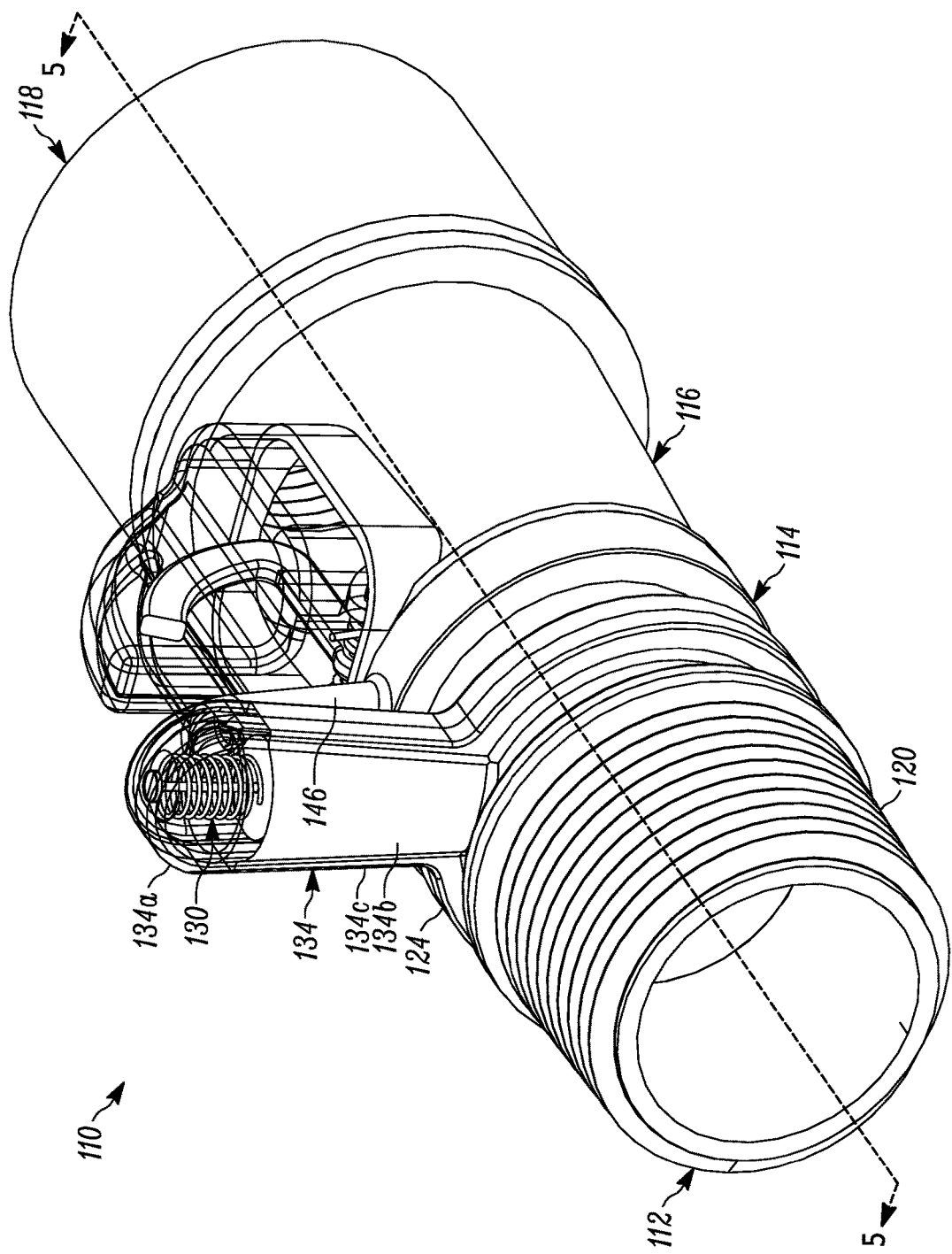
FIG. 4 is a perspective view of another flow sensor.
Figure 5:
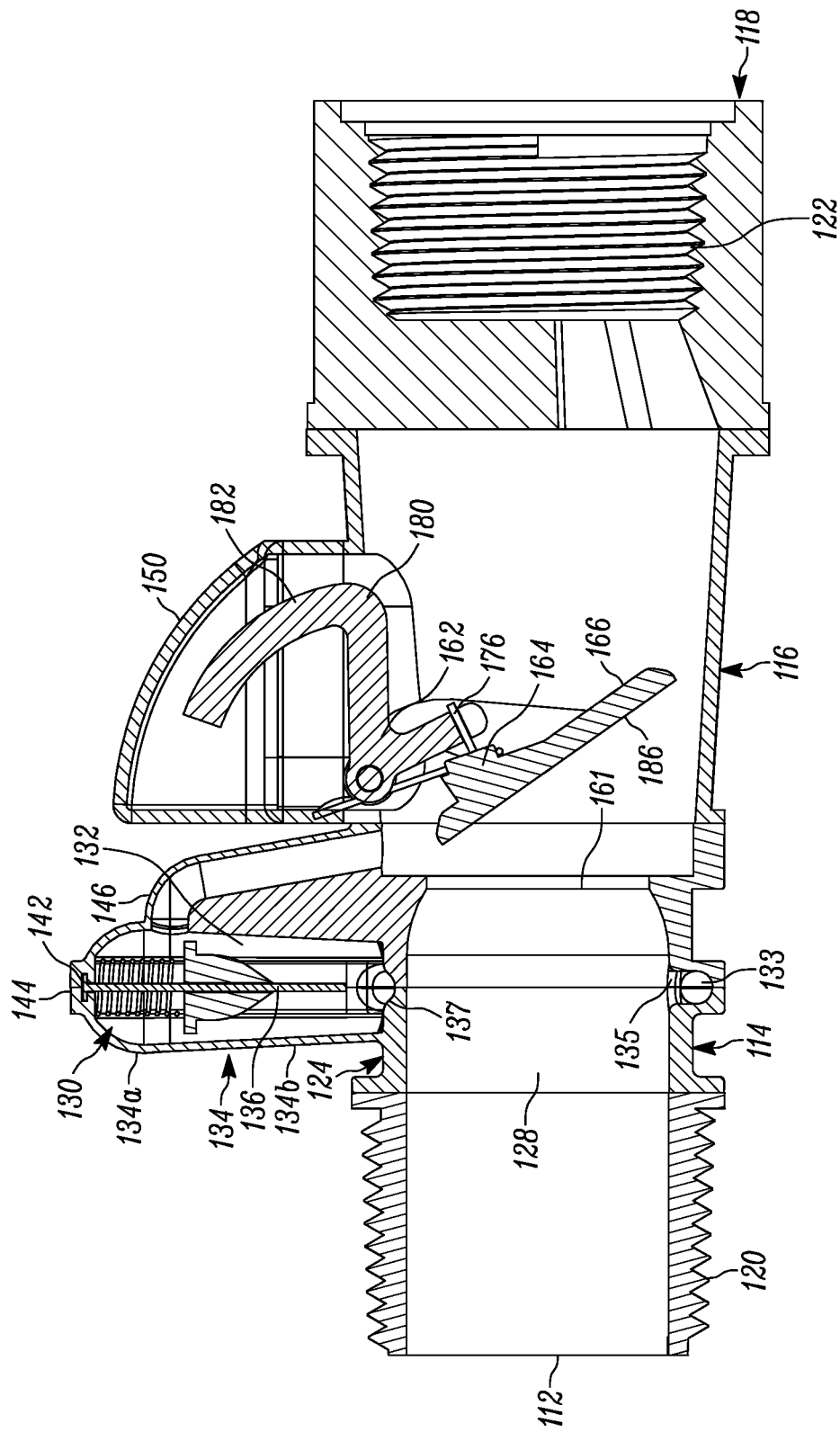
FIG. 5 is a central cross-section view of the flow sensor of FIG. 4.
Figure 6:
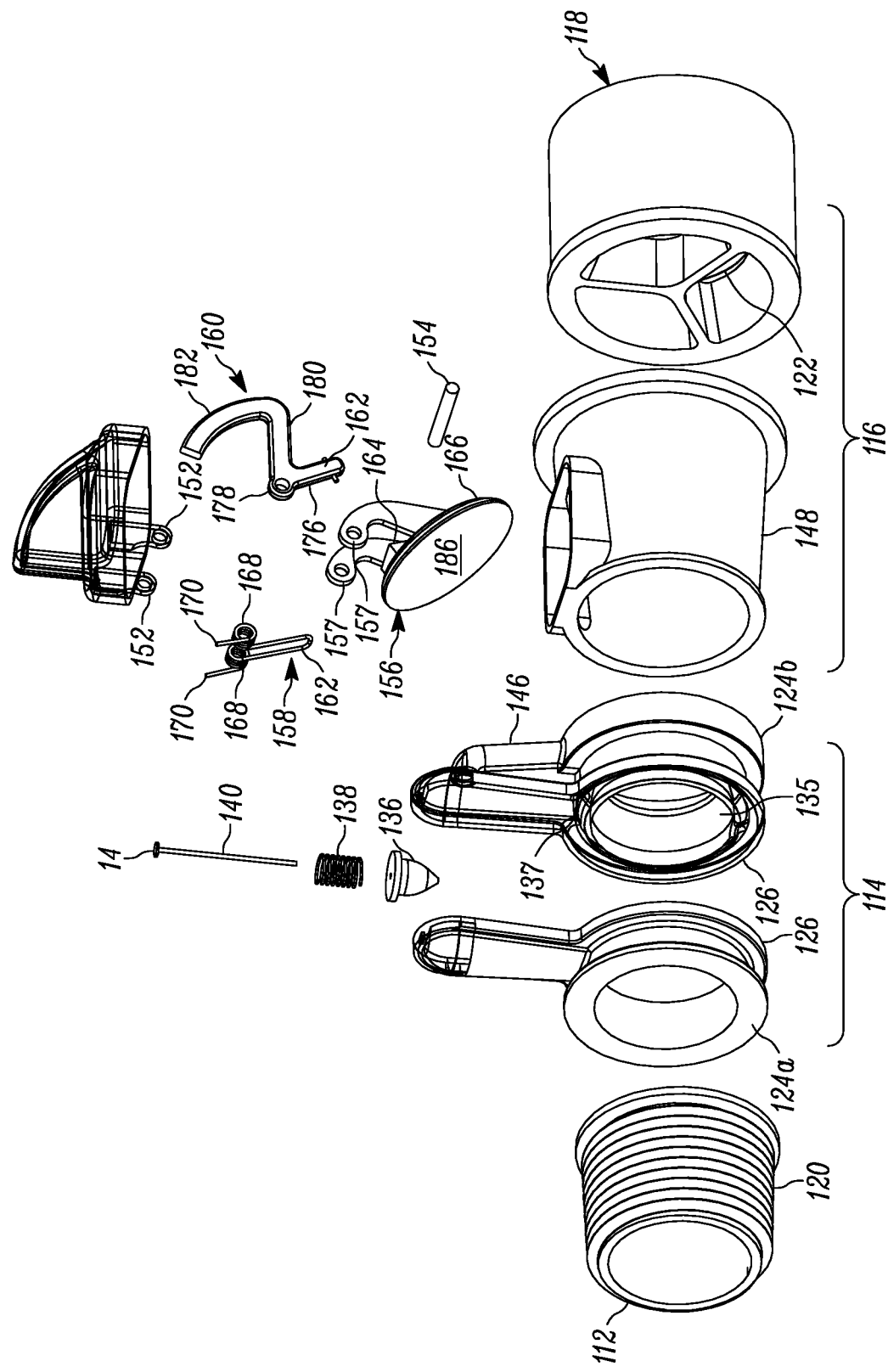
FIG. 6 is an exploded view of the flow sensor of FIG. 4.
Figure 7:
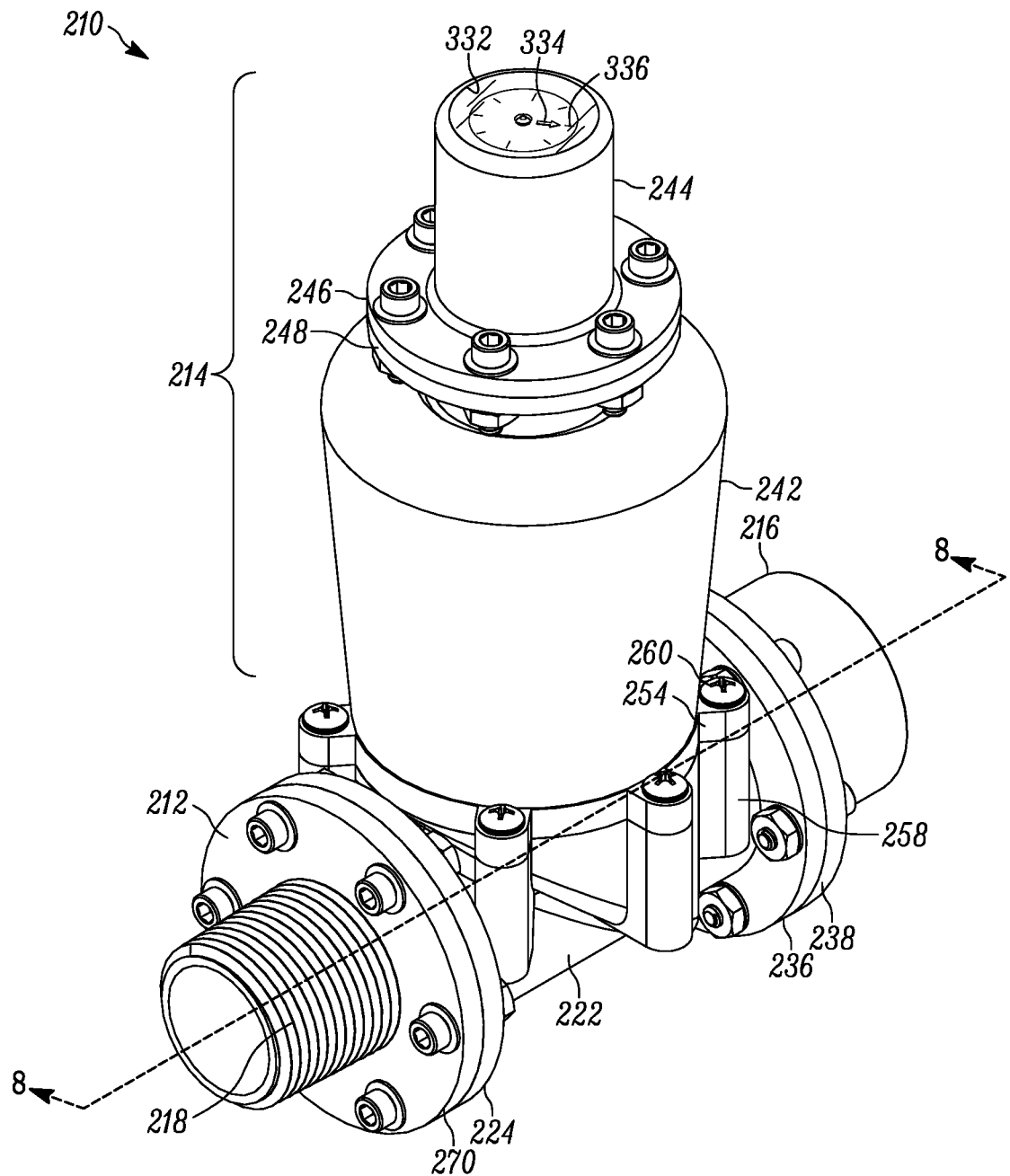
FIG. 7 is a perspective view of another flow sensor.
Figure 8:
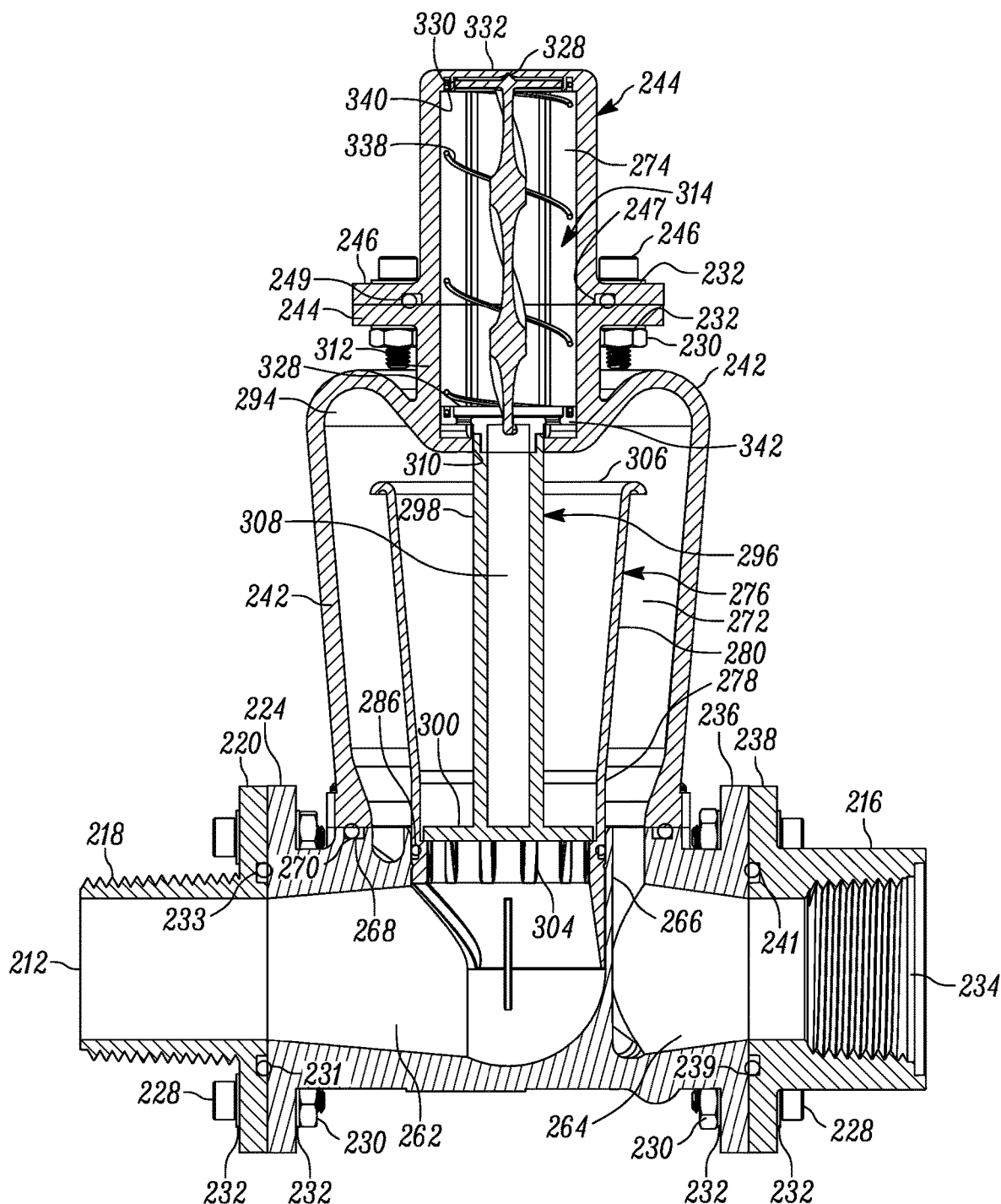
FIG. 8 is a central cross-section view of the flow sensor of FIG. 7.
Figure 9:
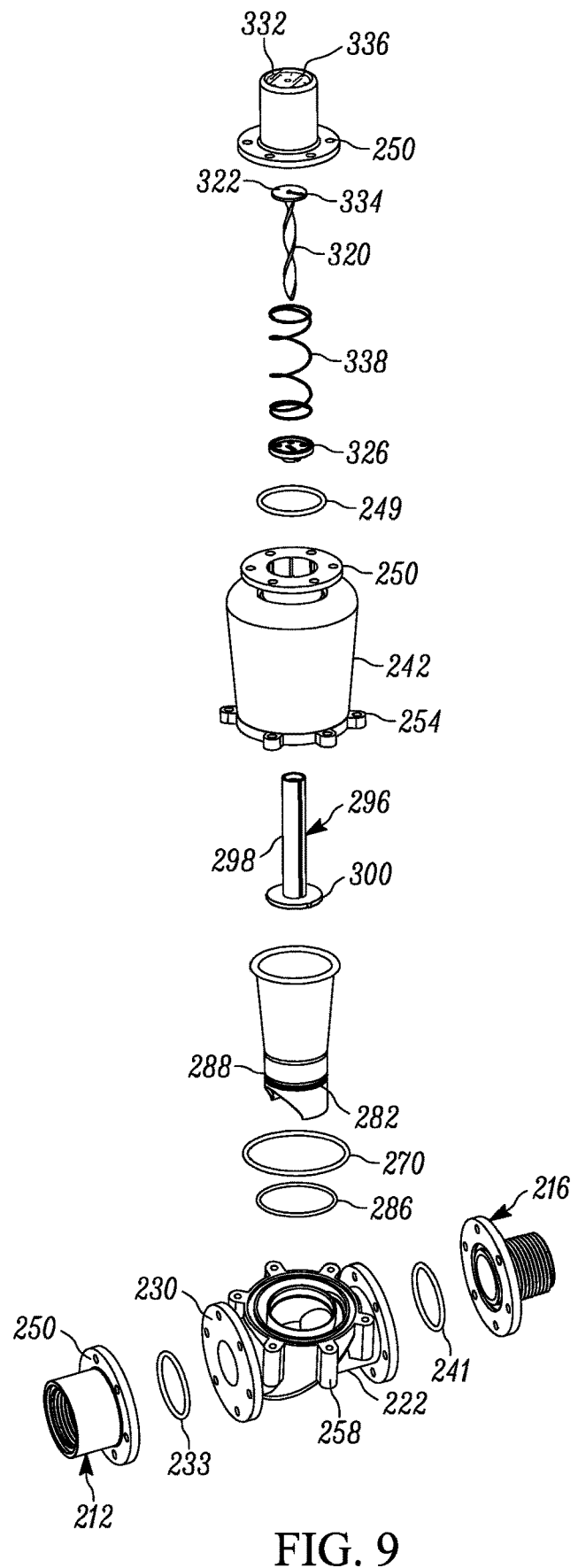
FIG. 9 is an exploded view of the flow sensor of FIG. 7.
Figure 10:
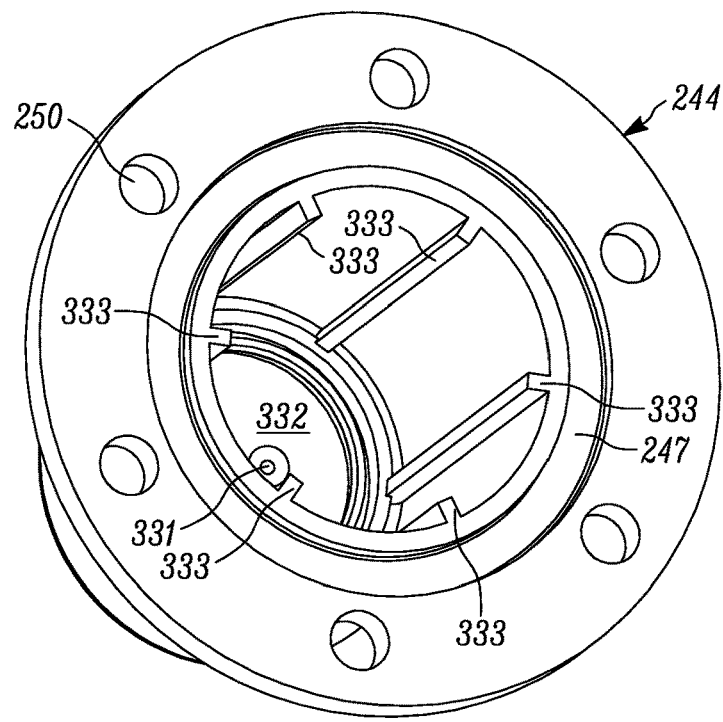
FIG. 10 is a bottom perspective view of a top cover of the flow sensor of FIG. 7.
Figure 11:
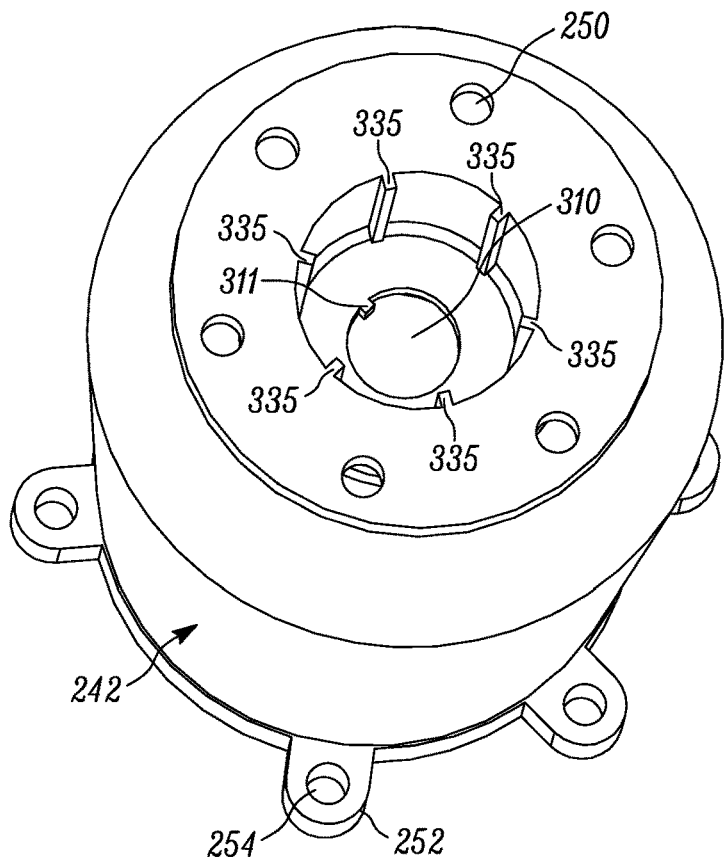
FIG. 11 is a top perspective view of an intermediate cover of the flow sensor of FIG. 7.
Figure 12:
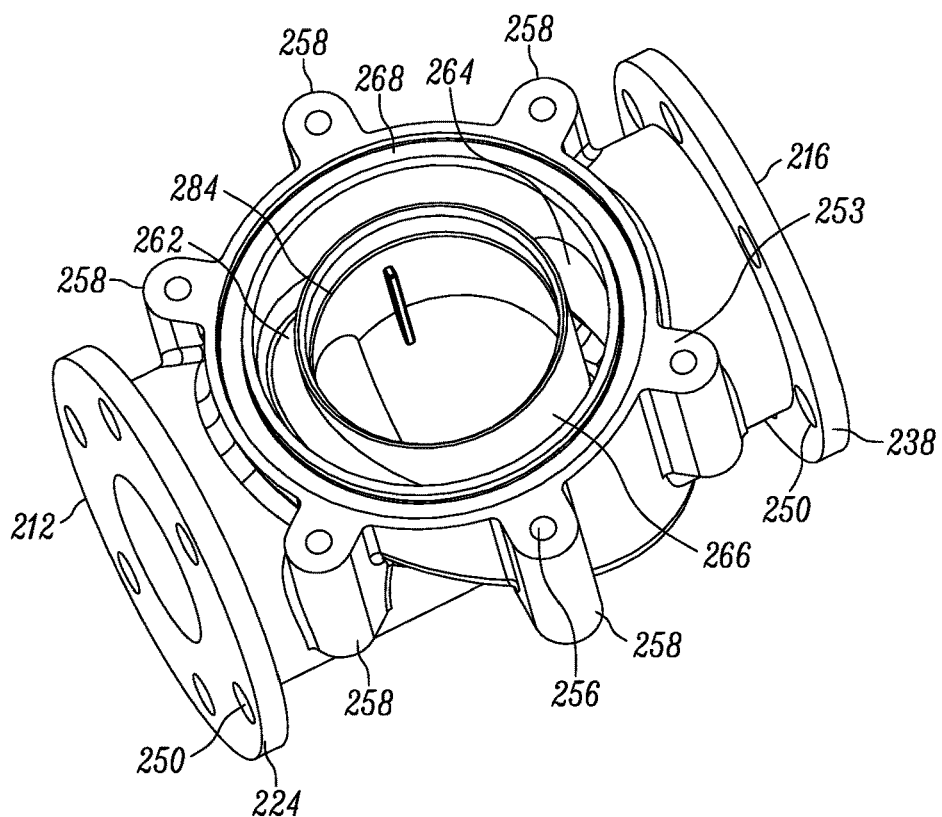
FIG. 12 is a top perspective view of a base of the flow sensor of FIG. 7.
Figure 13:
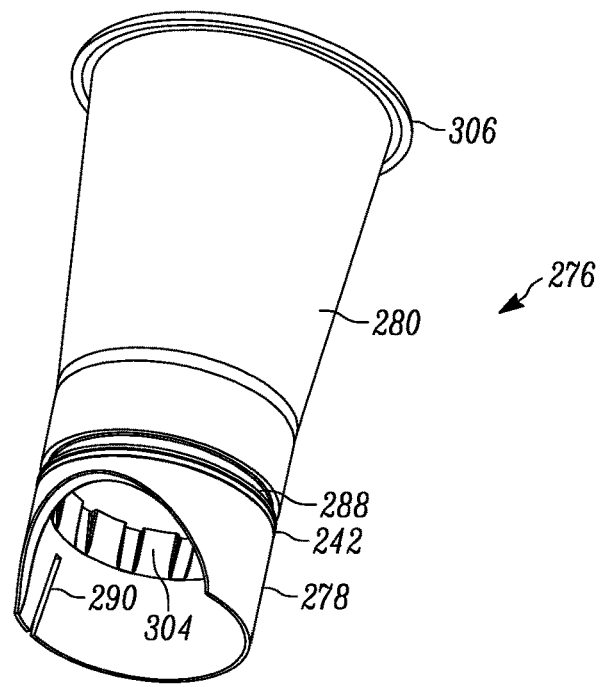
FIG. 13 is a bottom perspective view of a funnel of the flow sensor of FIG. 7.
Figure 14:
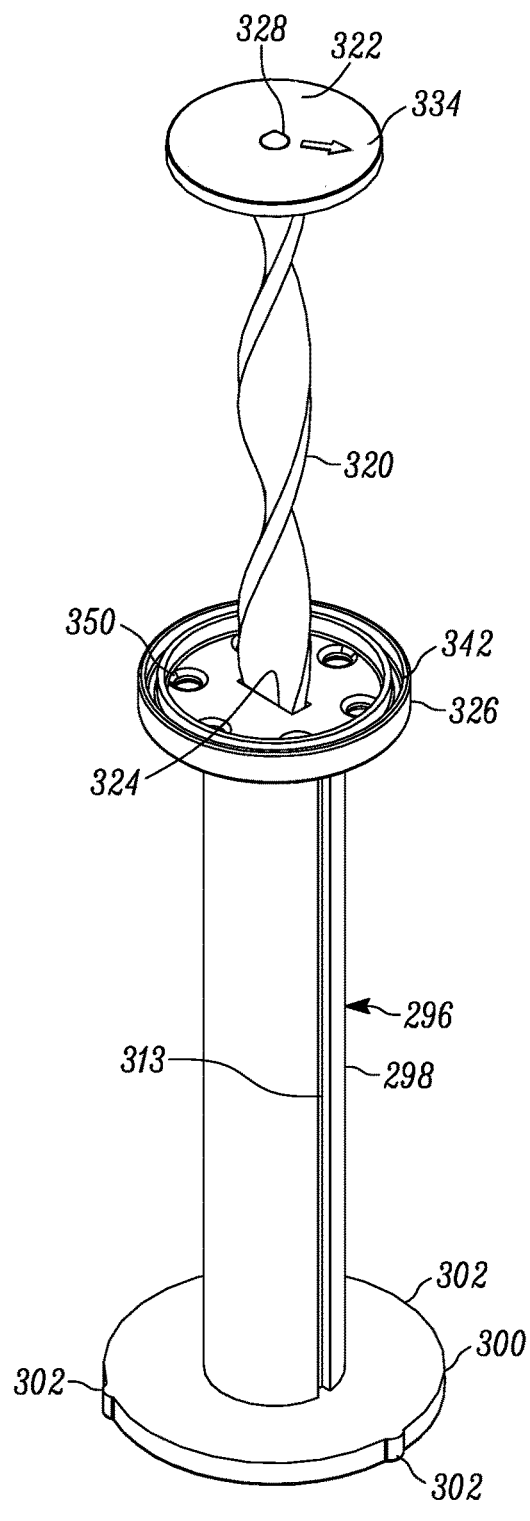
FIG. 14 is a top perspective view of a piston, top cap, and rotating strip of the flow sensor of FIG. 7.
Figure 15:
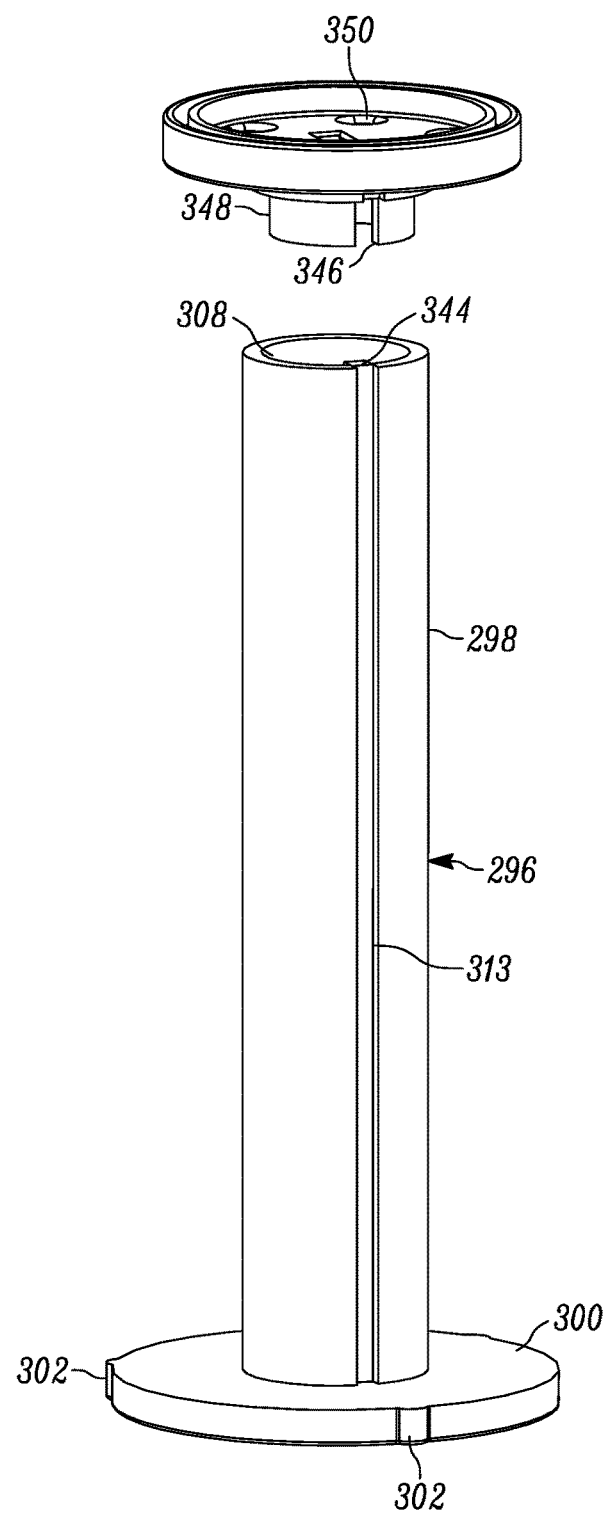
FIG. 15 is a perspective view of the top cap and piston of the flow sensor of FIG. 7.
Figure 16:
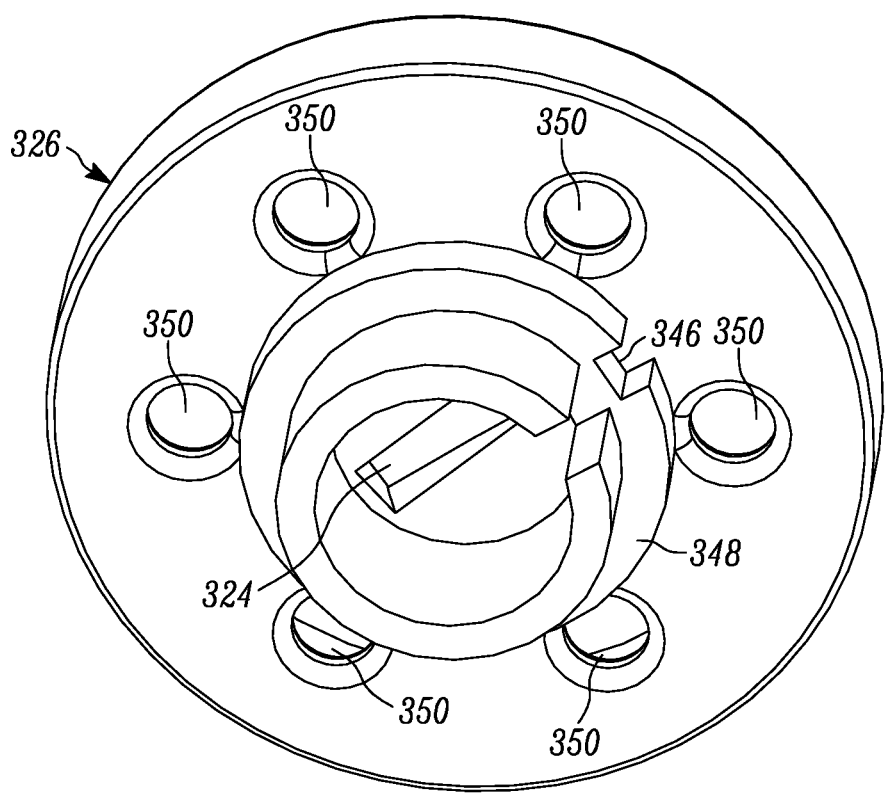
FIG. 16 is a bottom perspective view of a shaft cap of the flow sensor of FIG. 7.

Referring to FIGS. 4-6, there is shown another flow sensor 110. The flow sensor 110 also can be embedded into a fluid system, such as an irrigation system. The flow sensor 110 includes an inlet 112 portion, a leak detector 114, a flow meter 116 and an outlet portion 118. The leak detector 114 monitors upstream components, such as a valve, for leaks. The flow meter 116 monitors flow to detect whether the flow is above or below a normal amount or range for the system. For example, in an irrigation system, if the flow is above a normal amount or range, this indicates that there is a leak downstream in the system, such as in the conduit and/or watering emission device(s). On the other hand, if the flow is below the predetermined amount, this indicates that there may be a clog in the system, such as in the flow conduit and/or watering emission device(s) or that the valve upstream is not operating properly.

The inlet portion 112 and the outlet portion 118 are configured for attachment of the flow sensor 10 to conduit in the system. As illustrated, the inlet portion 112 includes exterior threading 120, which can be male NPT thread, for being threaded into an interior threaded conduit end. The outlet portion 118 includes internal threading 122, which can be female NPT thread, for cooperating with external threading on a downstream conduit end. Alternatively, the inlet portion and outlet portion could both be male threaded or female threaded. Also, instead of threading, the inlet portion and the outlet portion could have smooth surfaces that are glued to the inner and outer surfaces of the upstream conduit and downstream conduit, respectively. The inlet portion 112 extends from the leak detector 114, and the outlet portion 118 extends from a portion of the flow meter 116.

The leak detector 114 includes a housing 124 disposed between the inlet portion 112 and the flow meter 116. The housing 124 can be a two piece housing with an upstream portion 124a and a downstream portion 124b. The leak detector also can be a single piece. The housing 124 includes a lower portion 126 that provides a flow passage 128 to the flow meter 116 and an upper portion 134 that provides a leak indicator system 130.

The leak detector 114 includes a chamber 132 extending upward from the lower portion 126 of the housing 124. The chamber 132 is defined by the upper portion 134 of the housing 124 and includes a transparent upper portion 134a and an opaque or semi-transparent lower portion 134b. Alternatively, as with the previous embodiment, the upper portion 134a and the lower portion 134b both could be opaque or semi-transparent, and a third portion 134c in between the upper and lower portions 134a, 134b could be transparent. The leak detector 114 further includes a flow indicator 136 and a spring 138 disposed on a shaft 140. The shaft 140 includes a head 142 that is used to pin the shaft 140 to an upper end 144 of the upper portion 134 of the housing 124. The spring 138 is disposed between the upper end 144 of the chamber 132 and the flow indicator 136 to bias the flow indicator 136 down into the opaque portion 134b of the chamber 132.

The chamber 132 is able to receive fluid flow from the passage 128. More specifically, the housing 124 forms an annular chamber 133 and defines a first opening 135 to the annular chamber 133 from the flow passage 128. The first opening 135 is located diametrically opposite from the chamber 132. The annular chamber 133 has a second opening 137 at the annular chamber 133. Fluid flows from the passage 128 through the first opening 135, around the annular chamber 133 (through one or both sides) and, then, through the second opening 137 into the chamber 132 of the leak detector 114. A drain passage 146 is on the downstream side of the chamber 132. The drain passage 146 dumps fluid flowing through the leak detector 114 into the flow meter 116.

In operation, when pressurized flow of fluid to the flow sensor 110 is discontinued, the flow meter 116 closes so that fluid cannot flow further downstream, such as due to gravity. If flow continues on the upstream side, it will flow through the annular chamber 133 and cause the flow indicator 136 to rise upward in the chamber 132 against the bias of the spring 138. The spring force is selected so that the flow indicator 136 can detect very small amounts of flow, such as that from a leaking control valve of an irrigation system. When there is a leak, the flow indicator 136 will rise up on the shaft 140 in the chamber 132 into the transparent portion 134a of the upper portion 134 or in another form of the embodiment into the transparent portion 134c. The flow indicator 136 can be of a color, such as red, that is easily seen through the transparent portion 134a or 134c of the upper portion 134, depending on the design.

When the system is operating normally, the flow indicator 136 does not indicate a leak situation. In one embodiment, the chamber 132 can be bypassed by the flow through the sensor 110. To do so, the second inlet 132 to the chamber 132 can be oriented to face downstream or the housing 124 can be angled upstream, or both features can be used. This upstream orientation renders it difficult for the downstream moving flow to form an upstream flow to access the chamber 132. Also, the second opening 137 can be made relatively small. In another embodiment, the second inlet 137 could allow flow into the chamber 137, but the housing 124 would have three portions, as mentioned above. The lower and upper opaque or semi-transparent portions 134a, 134b and the transparent center portion 134c between portions 134a, 134b. When flow is flowing normally, the flow also would flow through the leak detector 114 moving the flow indicator 136 up to the upper opaque portion 134a. When the flow is off, the flow indicator 136 moves to the lower opaque portion 134b. If there is a leak detected, the flow indicator 136 would move to the transparent center portion 134c.

The flow meter 116 includes a conical housing 148 that enlarges in the downstream direction and can be transparent. An upper housing 150 extends from the conical housing 148 and is transparent. The upper housing 150 includes a pair of depending hinge points 152 used with a hinge pin 154 to attach a valve door 156, a torsional spring 158 and a flow indicator 160 to the upper housing 150. The valve door 156 pivots includes a pair of arms 157 that define hinge holes at their ends, and the valve door 156 pivots about the hinge pin 154 depending on the amount of flow through the conical housing 148. The valve door 156 is generally disc shaped. The spring 158 includes a center portion that forms a loop 162 that wraps around a post 164 projecting from a downstream side 166 of the valve door 156. The spring 158 has a coil 168 on each side of the loop 162 that each terminates with a tail portion 170 that engages an upstream inner surface 172 of the upper housing 150. The hinge pin 154 extends through the coils 168. The spring 158 biases the valve door 156 in the upstream direction toward a seat 161 formed about the inner perimeter of the downstream side of the housing 24 of the leak detector 14. The valve door 156 moves the flow indicator 160 depending on the flow through conical housing 148.

More specifically, the flow indicator 160 has a first linear leg 162 with one end caring an adjustment pin 176 that engages the downstream side 166 of the valve door 156 below the post 164 and the other end forming a pivot hole 178 for the hinge pin 154. The pivot hole 178 receives the hinge pin 154 between the coils 168 of the spring 158. The adjustment pin 176 could be adjustable (e.g., a set screw) in the first linear leg 162 to calibrate the flow indicator 160. The flow indicator 160 has a second linear leg 180 that extends downstream from the pivot hole 178 to an arcuate leg 182 that curves upstream. The arcuate leg 182 moves in the upper housing 150 to provide a visual indication of the flow.

The valve door 156, the spring 158 and the conical housing 148 are coordinated to measure flow through the conical housing 148. Since the valve door 156 is circular with a constant diameter, the radial distance between a perimeter 184 of the piston valve door 156 and the conical housing 148 increases as the valve door 156 pivots downstream. Similar to the piston embodiment above, as the door 156 pivots downstream, the area increases, and the velocity decreases. Also, as the door 156 pivots downstream, there will be less drag on the door so its movement increments will become smaller as the flow increases. This enables the flow meter to have a reduced overall length when compared to a constant diameter housing. When there is no pressurized flow in the system, the valve door 156 rests on the seat 161 and prevents flow from draining downstream in the system. The seat 161 or an upstream surface 186 of the valve door 156 that engages the seat 161 could include an elastomeric material that enhances the seal between the two. In this position, the drain passage 146 of the leak detector dumps fluid flowing through the leak detector into the flow meter 116 downstream of the valve door 156.

When pressurized flow is on, the valve door 156 pivots downstream an amount dependent on the flow amount. The valve door 156 movement can be visualized by reference to the corresponding movement of the arcuate leg 182 of the flow indicator 160 through the transparent upper housing 150. When the system is operating normally, the valve door 156 pivots downstream about same amount every time the system is pressurized. There may be slight variations in the amount due to supply pressure fluctuations. This pivot amount can be saved using a sliding indicator on the top of the upper housing 150. While this sliding indicator is not shown, it can be the same design as that for the flow sensor 10. In sum, the top of the upper housing can include a track with a particular cross-section, such as a T shape cross-section. The track would trace the arc across the top of the upper housing 150. Other cross-sections can be used as well. The bottom of the sliding indicator includes a complementary slot to the track so that it can receive and translate along the track. A set screw with a tool configured head can be used to lock the sliding indicator in place. The sliding indicator also defines a window that one can use to center the sliding indicator over a terminal end 188 of the arcuate leg 182 of the flow indicator 136 when the fluid system is operating normally. Further, the track can include a scale indicating a particular number of gallons per minute or hour flowing through the flow sensor 110. Due to the conical design of the housing 148, the scale may not be linear in that the tick mark spacing may vary and become closer towards one end. Other designs could be employed as well. For example, the pivoting of the door could be translated into a linear movement or movement of a dial indicator.

As with flow sensor 10, the sliding indicator also may include coloring to aid in determining the operation of the fluid system. For example, sides of the window may be colored green to indicate proper operation, and ends of the window may be colored red to indicate improper operation. When the terminal end 188 of the flow indicator 160 is positioned in the window along the green sides of the window, the system is operating normally. On the other hand, when the terminal end 188 of the flow indicator 160 is downstream of the red on the downstream end of the window, this would indicate that there is too much flow through the system. Accordingly, the system should be checked for leaks. In an irrigation system, for instance, the excess flow could be a nozzle missing from a sprinkler device or breaks in the conduit. Similarly, when the terminal end 188 of the flow indicator 160 is upstream of the red on the upstream end of the window, this would indicate that there is insufficient flow through the system. The system should be checked to make sure that there are no clogs upstream and downstream in the system. In an irrigation system, one should check to make sure the upstream valve is operating properly to provide proper flow and that there are no downstream irrigation devices that are failing or working improperly, such as being clogged.

With reference to FIGS. 7-18, there is shown a flow sensor 210. The flow sensor 210 can be embedded into a fluid system, such as an irrigation system. The flow sensor 210 includes an inlet 212, a flow meter 214 and an outlet 216. The flow meter 214 monitors flow to detect whether the flow is above or below a normal amount or range for a current state of the system. For example, in an irrigation system, if the flow is above a normal amount or range, this indicates that there is a leak downstream in the system, such as in the conduit and/or watering emission device(s). On the other hand, if the flow is below the predetermined amount, this indicates that there may be a clog in the system, such as in the flow conduit and/or watering emission device(s) or that the valve upstream is not operating properly.

The inlet 212 and the outlet 216 are configured for attachment of the flow sensor 210 to conduit in the system. As illustrated, the inlet 212 includes exterior threading 218, which can be male NPT threading, for being threaded into an interior threaded conduit end. The inlet 212 also includes a flange 220 for attachment to a base 222 of the flow meter 214. The base 222 includes a corresponding flange 224. The flanges 222, 224 include holes 226 that align and are used to secure the flanges 222, 224 using bolts 228, nuts 230 and washers 232. The washers could be lock washers. The flange 220 includes a recess 231 for holding an o-ring 233 to further seal the interface between the flanges 220, 224.

The outlet 216 includes internal threading 234, which can be female NPT threading, for cooperating with external threading on a downstream conduit end. The outlet 216 also includes a flange 236 for attachment to the base 222 of the flow meter 214. The base 222 includes a corresponding flange 238. The flanges 234, 236 include holes 240 that align and are used to secure the flanges 234, 236 using bolts 228, nuts 230 and washers 232. The flange 238 includes a recess 239 for holding an o-ring 241 to further seal the interface between the flanges 236, 238.

The inlet 212 and the outlet 216 each include an annular flange 251, 253 that draws the inlet 212 and the outlet 216 into a sealing engagement with an o-ring 255 disposed in an annular recess 257 and each end of the body 222 facing the inlet 212 and the outlet 216. This quick connect alternative enables the inlet and outlet to be interchangeable to accommodate different connections and pipe sizes. For example, the inlet and outlet could both be male threaded or female threaded. Also, instead of threading, the inlet and the outlet could have smooth surfaces that are glued to the inner and outer surfaces of the upstream conduit and downstream conduit, respectively.

Alternatively, in place of flanges 222, 224, the base 222 could include threaded inlets and outlets for receiving threaded collars as described later in connection with the embodiment of FIGS. 19-36.

The flow meter 214 includes the base 222, an intermediate cover 242 and a top cover 244. The top cover 244 includes a flange 246 for attachment to a flange 248 of the intermediate cover 242. The flanges 246, 248 include holes 250 that align and are used to secure the flanges 246, 248 using bolts 228, nuts 230 and washers 232. The flange 246 includes a recess 247 for holding an o-ring 249 to further seal the interface between the flanges 246, 248.

The intermediate cover 242 attaches to the base 222. The intermediate cover 242 includes radial tabs 252 that each define a hole 254 that aligns with a corresponding hole 256 defined by each bore portion 258 of the base 222. A threaded screw 260 extends through each of the holes 254 of the radial tabs 252 and threads into the hole 256 of each of the bore portions 258 of the base 222. Alternatively, the base 222 and the intermediate cover 242 could be a single piece.

The base 222 defines an inlet passage 262 and an outlet passage 264. The inlet passage 262 is defined in part by an upward directed tubular portion 266 at the center of the base 222. The outlet passage 262 extends around the tubular portion 266 and over a portion of the inlet passage 262 upstream of the tubular portion 266. The base 222 also defines an annular recess 268 adjacent and radially inside of the bore portions 258. The annular recess 268 holds an o-ring 270 that seals against the intermediate cover 242.

The intermediate cover 242 has an inward tapering configuration towards the base 222. The intermediate cover forms a lower chamber 272 and in combination with the top cover 244 defines an upper chamber 274. The lower chamber 272 houses a flow guide 276. The flow guide 276 includes a tubular portion 278 and a frusto-conical portion 280. The flow guide tubular portion 278 extends into the tubular portion 266 of the inlet passage 262. The flow guide tubular portion 278 includes an annular recess 282 about its exterior surface that receives an annular rib 284 projecting from an interior surface of the inlet passage tubular portion 266. This secures flow guide 276 at the base 222. An o-ring 286 is disposed between the exterior surface of the flow guide tubular portion 278 and the interior surface of the inlet passage tubular portion 266 to provide a seal between the two components. The o-ring 286 is held in an annular recess 288 formed in the outer surface of the flow guide 276. The flow guide 276 defines an axially extending slot 290 at its tubular portion 278. The slot 290 receives an axially extending rib 292 projecting from the inlet passage tubular portion 266 of the base 222. The slot 290 and rib 292 align the flow guide 276 for proper orientation during assembly of the flow guide 276 to the base 222.

The frusto-conical portion 280 of the flow guide 276 allows fluid to flow outward as it moves to the top of the upper chamber 274. The frusto-conical portion 280 may terminate with an upper edge 306 that is curled outward and downward to assist with a smooth transition for the flow from the flow guide 276 down toward the outlet passage. For further assistance in redirecting the flow fluid, the upper chamber 274 includes an arcuate, annular portion 294. The spacing between the outward flare and curled upper edge of the frusto-conical portion 280, on the one hand, and the smooth curvature of the arcuate, annular portion 294 of the upper chamber 274, on the other hand, can be optimized so that pressure drop is reduced. For example, it has been found that reducing the spacing can minimize the pressure drop.

A piston 296 operates in the both the lower and upper chambers 272, 274 of the intermediate cover 242. The piston 296 includes a shaft 298 and an enlarged head 300. The enlarged head 300 operates in the flow guide 276 and fits into the flow guide tubular portion 278 with sufficient clearance so that fluid can flow around the enlarged head 300 to be more sensitive to low flow rates so that they can be measured when the enlarged head 300 is in the flow guide tubular portion 278. The enlarged head 300 includes small radial projections 302 that engage the inner surface of the flow guide tubular portion 278 to center the enlarged head 300 in the flow guide tubular portion 278 and to reduce friction between the enlarged head 300 and the inner surface of the flow guide tubular portion 278 when the piston 296 moves. Also, when the enlarged head 300 is located in the flow guide tubular portion 278, it can rest on a series of tapered ribs 304 extending from the inner surface of the flow guide tubular portion 278 when there is no flow. Alternatively, the tapered ribs 304 could be replaced with a continuous, annular projecting sealing seat for the enlarged head to rest on when there is no flow.

The shaft 298 has a hollow interior 308 and extends through an opening 310 at the top of the intermediate cover 242. The intermediate cover 242 includes a tubular portion 312 that extends about the opening 310 and from the opening 310 to the flange 246. The opening 310 is sized to provide enough clearance so the shaft 298 can reciprocate easily through the opening 310. The opening 310 includes a rib 311 extending inward to be received in longitudinal extending slot 313 in an outer surface of the shaft 298 of the piston 296. The rib 311 and the slot 313 prevent the piston 296 from rotating.

While fluid can fill the upper chamber 274, the upper chamber 274 is not in the path of the primary flow through the flow meter 214. This reduces the potential for debris to be carried into the upper chamber 274 and affect the operation of an instrument 314 housed in the upper chamber 214 that indicates the amount of flow passing through the flow meter 214.

Figure 17:
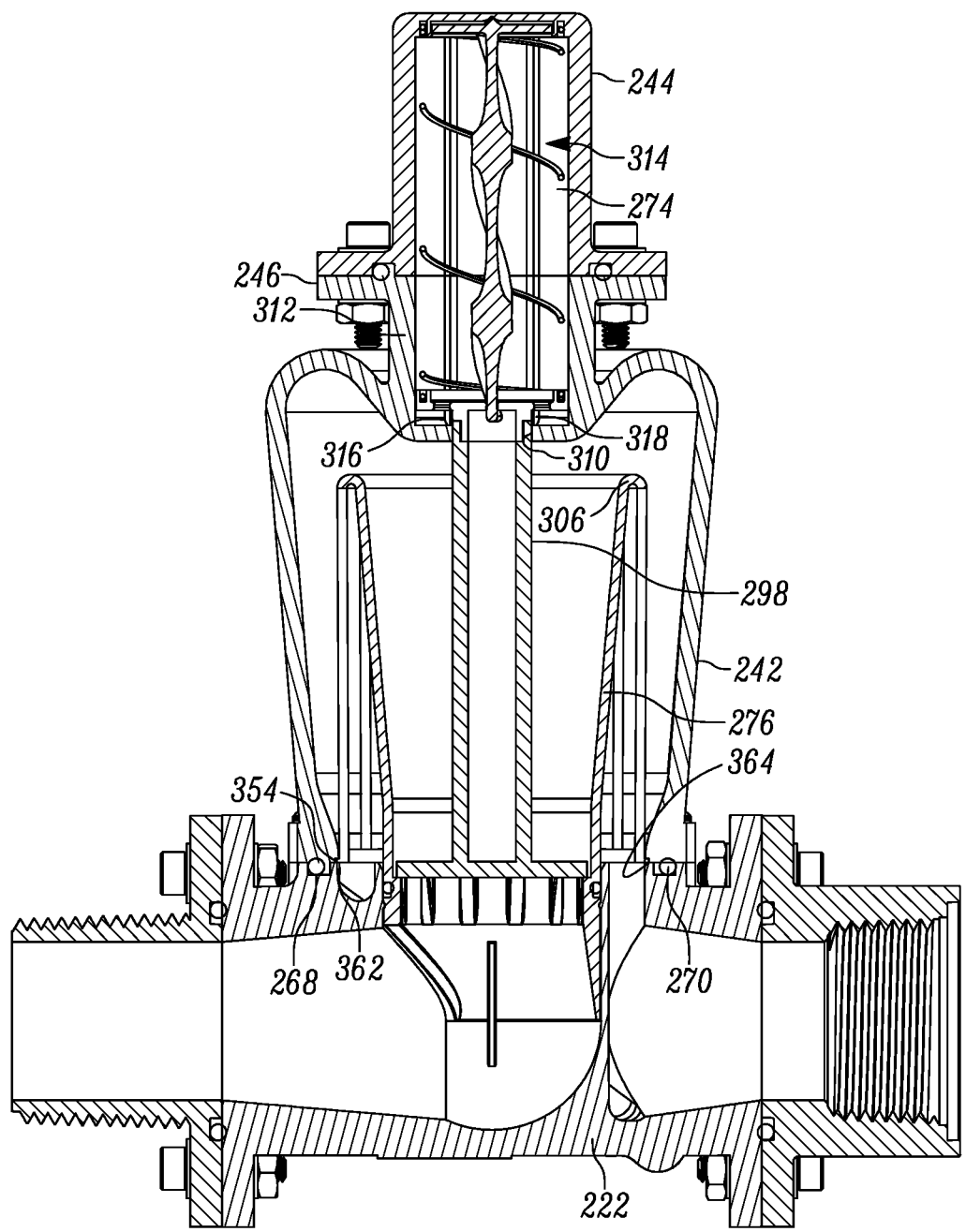
FIG. 17 is a central cross-section view of another flow sensor.

Alternatively, as shown in FIG. 17, an o-ring 316 may be incorporated into an interface between the opening 310 and the shaft 298 to seal against fluid entering the upper chamber 274. The intermediate cover 242 may define an annular recess 318 about the opening 310 to hold the o-ring 316. The o-ring could be the Turcon® Double Delta® and/or made of the material Zrucon® 280. Both are provided by Trelleborg Sealing Solutions of Helsingor, Denmark. The other o-rings discussed herein could be of the same material.

The instrument 314 includes a twisted shaft 320. One end fitted of the twisted shaft 320 has a dial 322, and the other end fits through a slot 324 defined by a cap 326. The cap 326 is attached to the end of the shaft 298 opposite the enlarged head 300. As the shaft 298 moves upward in the upper chamber 274 as flow increases, the twisted shaft 320 moves further into the hollow interior 308 of the shaft 298. The twist in the twisted shaft 320 turns the twisted shaft 320 and dial 322 as the twisted shaft 320 moves into the hollow interior 308 as flow through the flow meter 214 increases. A conical tip 328 extends from a center position of the dial 322 and pivots in a conical dimple 331 on an inside surface 330 of a top wall 332 of the top cover 244 as the dial 322 rotates. The interior of the top cover 244 and the tubular portion 312 of the intermediate cover 242 include a number of longitudinal ribs 333, 335, respectively, extending into the upper chamber 274. The dial 322 translates along the ribs 333, 335. The conical tip 328 and the ribs 333, 335 reduce friction for the operation of the instrument 314 and guide the piston 296 to reduce side loading on the piston 296 when flow through the flow meter 214 is non-symmetrical.

The top wall 332 of the top cover 244 can be transparent to allow visual inspection of the dial 322. The dial 322 and the top wall 332 can include markings that indicate the flow. For example, the dial 322 may include a marking, such as an arrow 334, and the wall 332 may include a scale 336 showing different pressures. A spring 338 in the upper chamber 274 biases the piston 296 downward toward the inlet passage 262. The spring 338 seats in an annular recess 340 at the top of the upper chamber 274 and an annular recess 342 in the shaft cap 326 at the bottom of the upper chamber 274.

The shaft 298 and the shaft cap 326 are splined together such that they do not rotate relative to one another. The shaft 298 includes a longitudinal rib 344 extending into the hollow interior 308. The rib 344 is received in a slot 346 defined by a tubular extension 348 extending from a bottom of the shaft cap 326 that is received in the hollow interior 308 of the shaft 298. The rib 344 and slot 346 spline the shaft 298 and the shaft cap 326 together. The tubular extension 348 can have a stepped configuration where the portion adjacent the bottom of the shaft cap 326 is larger in diameter and forms a friction fit with an inner surface of the shaft 298. In addition to a friction fit between the tubular extension 348 of the shaft cap 326 and the shaft 298, the shaft cap 326 and the shaft 298 also could be glued or welded together. The shaft cap 326 defines a number of holes 350 to allow water and air to pass through the shaft cap 326 as it reciprocates in the upper chamber 274. The holes 350 prevent pressure buildup on the shaft cap 326 that would otherwise affect movement of the piston 296 and the corresponding fluid measurement.

Figure 18:
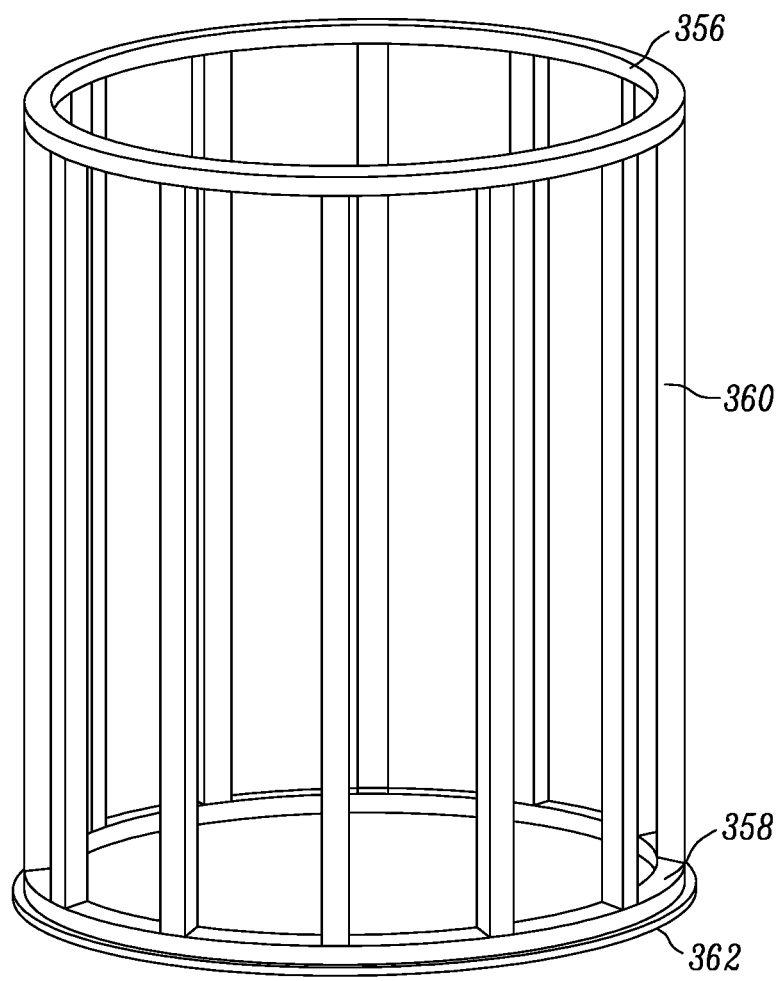
FIG. 18 is a perspective view of a filter of the flow sensor of FIG. 17.

As shown in FIGS. 17 and 18, a filter 352 also may be included to remove debris from fluid before it passes to the outlet passage 264. The filter 352 can be secured in the lower chamber 272 between an annular landing 354 inward of the recess 268 for the o-ring 270 of the base 222 and the curled upper edge 306 of the flow guide 276. The filter 352 can include a top ring 356, a bottom ring 358 and a series of filter support elements 360 extending between the top ring 356 and the bottom ring 358. A mesh or screen 361 could be fixed to the top ring 356, the bottom ring 358 and the filter support elements 360. For example, the mesh or screen could be over-molded onto the top ring 356, the bottom ring 358 and the filter support elements 360. The bottom ring 358 can include a radial flange 362 that can be received in a recess 364 defined by the intermediate cover 242 at the interface with the base 222 to further secure the filter 352.

In operation, fluid flows into the flow sensor 210 through the inlet passage 262. As the flow increases, the fluid moves the piston upwards in the lower and upper chambers 272, 274. The piston causes the instrument 314 to determine the flow rate through the flow sensor 210. That is, the upward movement of the piston 296 against the spring 338 causes the twisted shaft 320 to turn and twist into the hollow interior 308 of the shaft 298. The twisting of the twisted shaft 320 rotates the dial 322 causing the arrow 334 to rotate about the scale 336 indicating the flow through the flow meter 214 of the flow sensor 210. As the flow meter 214 is measuring the flow, the fluid flows around the enlarged head 300 of the piston 296 and through the flow guide 276. Then, the flow is guided by the accurate, annular portion 294 of the intermediate cover 242 and the curled edge 306 of the flow guide 276 to turn direction back towards the outlet passage 264.

The piston 296, the spring 338 and the frusto-conical portion 280 of the flow guide 276 are coordinated to measure flow through flow meter 214. Since the enlarged head 300 of the piston 296 has a constant diameter, the radial distance between a perimeter of the enlarged head 300 and the frusto-conical portion 280 of the flow guide 276 increases as the piston 296 translates downstream. This enables the flow meter 214 to have a reduced overall length (or height) when compared to a constant diameter flow guide. More specifically, in general, higher velocities mean a higher force on the enlarged head 300 of the piston 296. For an expanding area, such as that provided by the frusto-conical portion 280 of the flow guide 276, the velocity will decrease over the length for a given flow rate. So, at higher flow rates, the enlarged head 300 will be located in a section of the frusto-conical portion 280 with a larger cross-sectional area, and therefore, have a lower velocity. The advantage is that the flow meter can be shorter for the same flow rate range, and there will be a lower pressure drop. When there is no pressurized flow in the system, the enlarged head 300 of the piston 296 rests on the tapered ribs of the flow guide 276.

The foregoing is illustrated by the following examples. In a first example, the frusto-conical portion of the flow guide has an inlet diameter of 1.25 in, an outlet diameter of 1.60 in, and an axial length of 2.45 in. The enlarged head of the piston has a diameter of 1.20 in, and the spring rate is 0.80 lb/in. In operation, the following table shows the enlarged head position from start of the frusto-conical portion and the spring displacement for 5.0 gpm and 25.0 gpm flow rates.

| Flow Rate (gpm) | Enlarged Head Position From Start (in) | Spring Displacement (in) |
| --- | --- | --- |
| 5.0 | 0.19 | 0.19 |
| 25.0 | 2.05 | 2.05 |

For a second example for comparison, a straight flow guide has a diameter of 1.25 in. The piston has a diameter of 1.20 in, and a spring rate of 0.80 lbs/in. In operation, the following table shows the spring displacement for 5.0 gpm and 25.0 gpm flow rates.

| Flow Rate (gpm) | Spring Displacement (in) |
| --- | --- |
| 5.0 | 0.19 |
| 25.0 | 4.78 |

The comparison of the spring displacements demonstrates that the frusto-conical portion can be much shorter than a straight flow guide. For a flow rate of 25.0 gpm, the conical housing has a spring displacement of 2.05 in. versus 4.78 in. for the straight housing.

The springs and shafts of the flow sensors can be made of metal, such as stainless steel. The other components of the flow sensors can be made of plastic, such as acrylonitrile butadiene styrene (ABS), polymethyl methacrylate (PMMA), polypropylene (PP), and polyamides (PA). In addition to bolts and nuts, the housing components and the inlet and outlet components can be glued or welded together.

Figure 19:
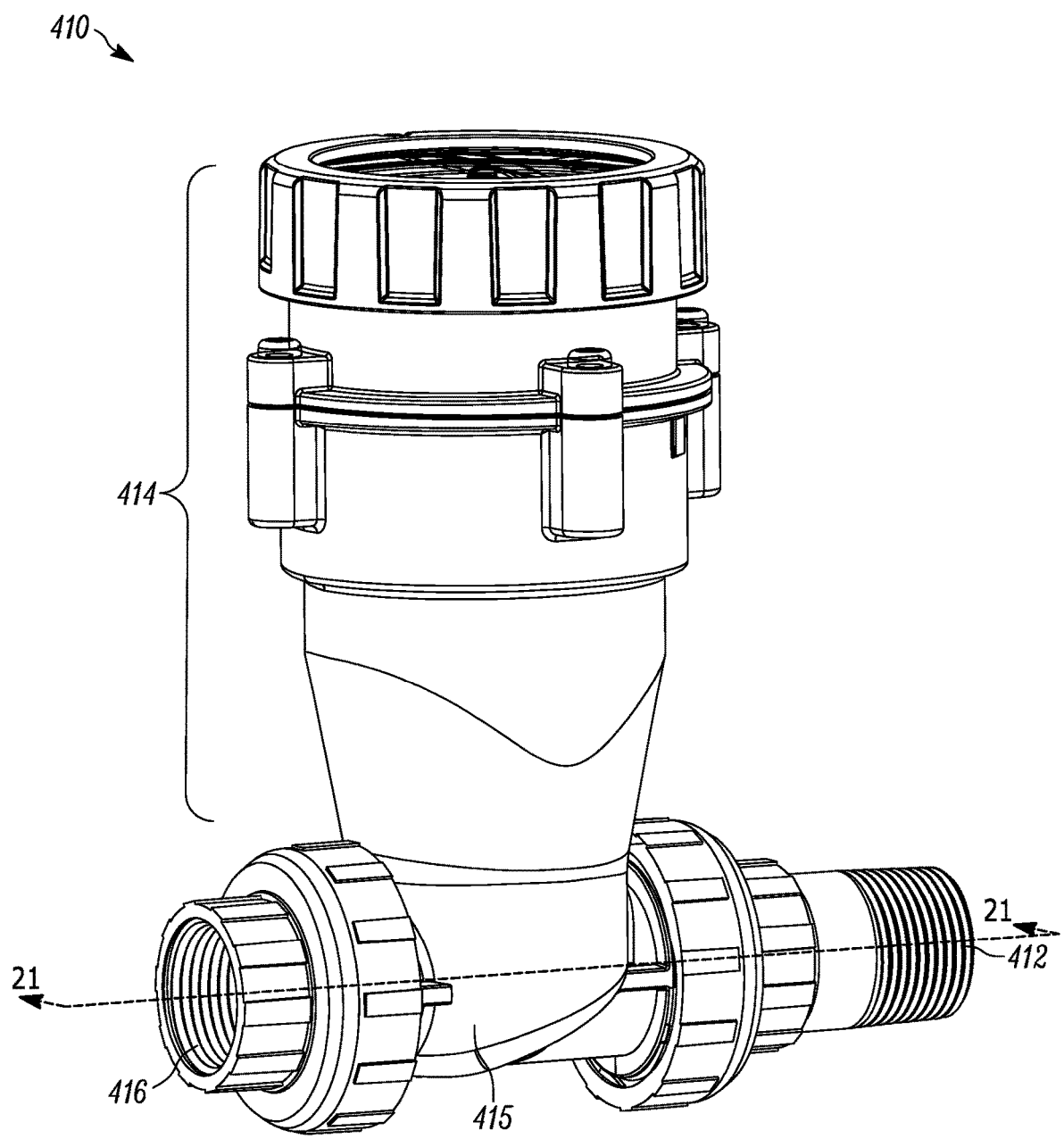
FIG. 19 is a perspective view of an alternate flow sensor.

With reference to FIG. 19, there is shown another flow sensor 410. The flow sensor 410 can be embedded into a fluid system, such as an irrigation system. The flow sensor 410 includes an inlet 412, an outlet 416, a body 415, and a flow meter 414.

Figure 20:
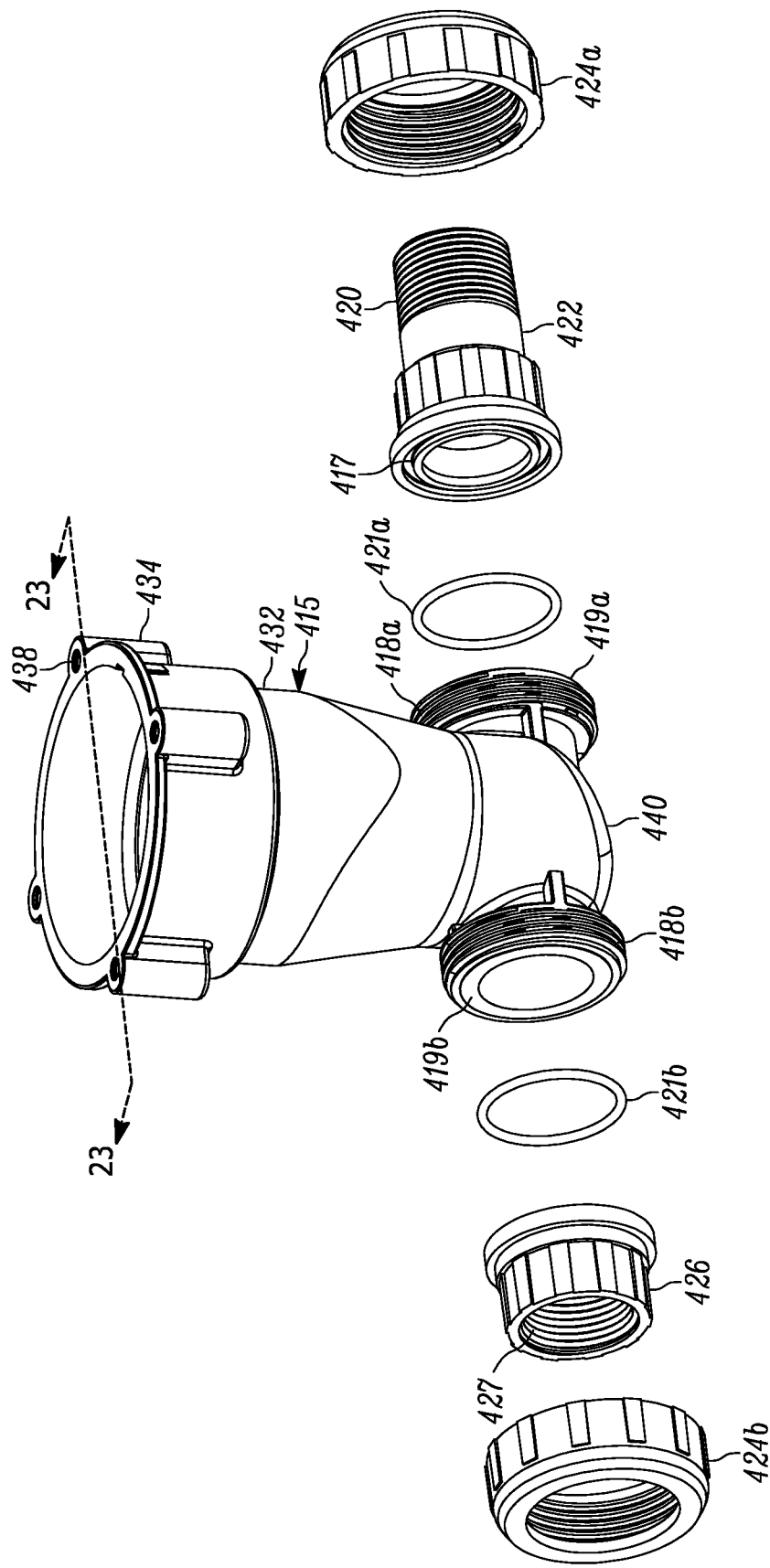
FIG. 20 is an exploded view of an inlet, an outlet, and a flow sensor body of the flow sensor of FIG. 19.

As shown in FIG. 20, the inlet 412 and the outlet 416 are configured for attachment of the flow sensor 410 to conduits in an irrigation system. As illustrated, an inlet threaded collar 424a connects an inlet fitting 422 to the body 415 by threading onto exterior threading 418a of the body 415. An o-ring 421a seats in an annular recess 417 in the inlet fitting 422 and engages an inlet face 419a to further seal the inlet fitting 422 to the inlet face 419a, and prevent water leakage at the inlet 412. The inlet fitting 422 has exterior threading 420 for being threaded into an interior threaded conduit end.

An outlet threaded collar 424b connects an outlet fitting 426 to the flow sensor 410 by threading onto exterior threading 418b of the body 415. An o-ring 421b seats in an annular recess (not shown) in the outlet fitting 426 and further seals the outlet fitting 426 to an outlet face 419b of the outlet 416. The outlet fitting 426 has internal threading 427 for cooperating with external threading on a downstream conduit end. This configuration enables quick connection to conduits and may accommodate different connections and conduit sizes.

Figure 21:
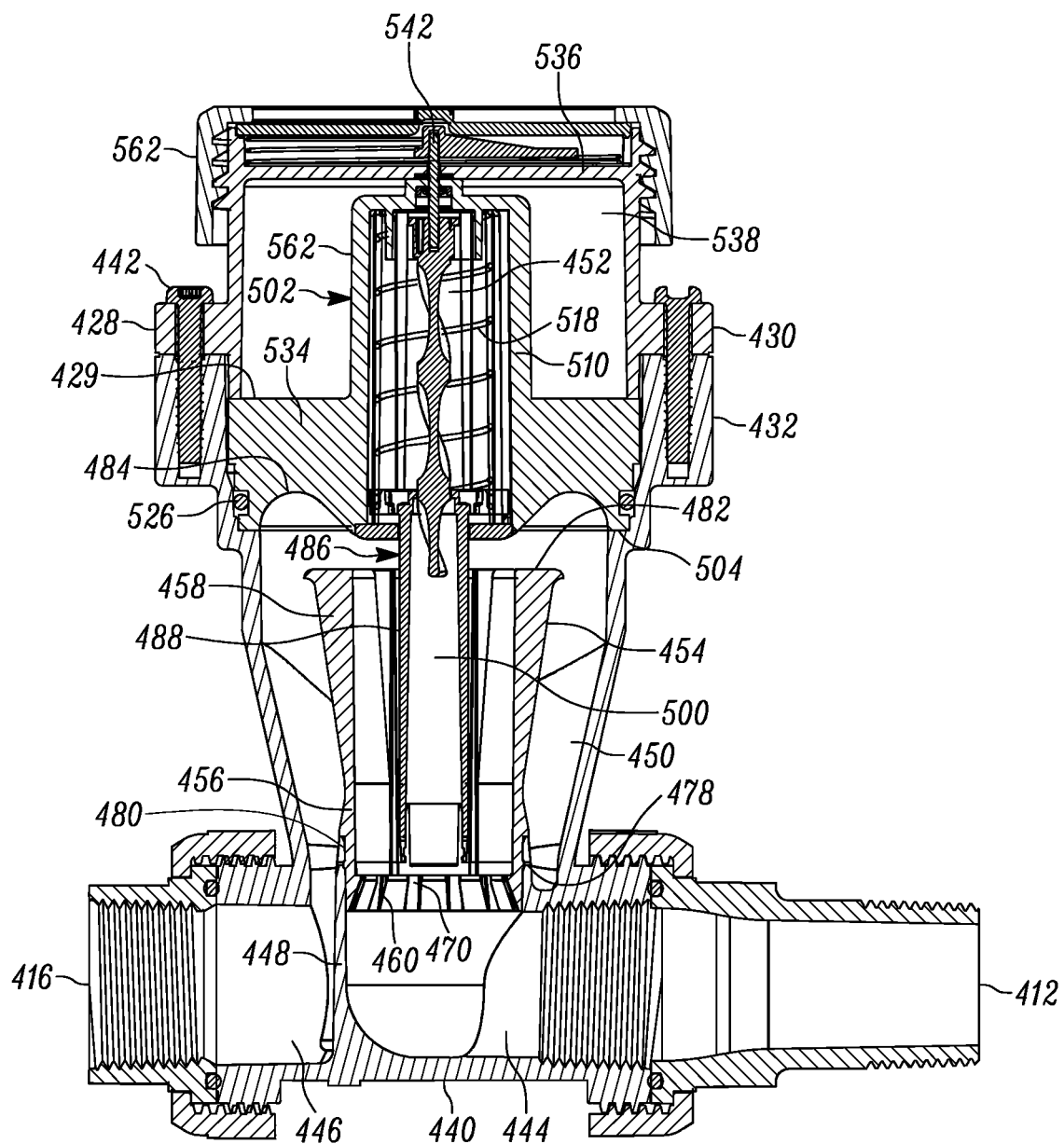
FIG. 21 is a central cross-sectional view of the flow sensor of FIG. 19.
Figure 22:
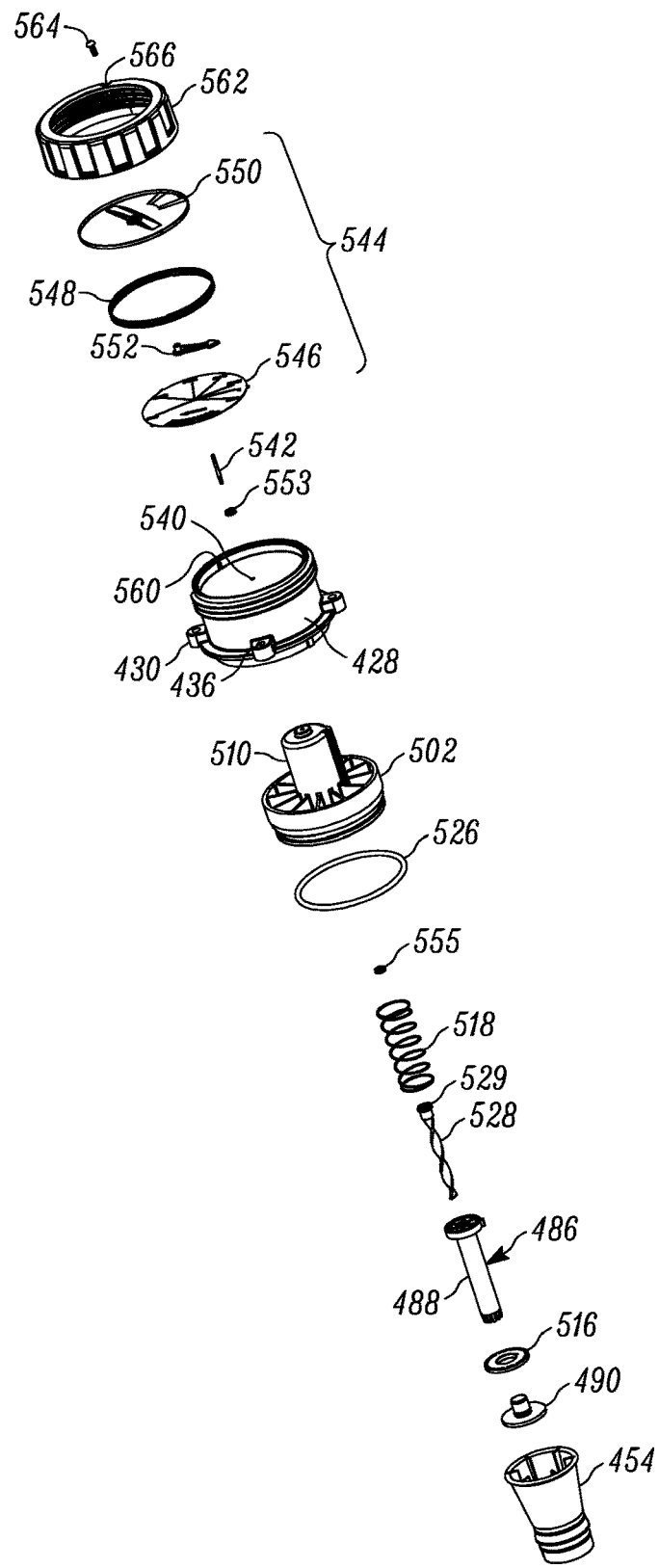
FIG. 22 is an exploded view of a portion of the flow sensor of FIG. 19.

As shown in FIGS. 20-22, the flow meter 414 includes an upper portion 432 and a base portion 440. The upper portion 432 and the base portion 440 form the body 415. The body 415 may be a single continuous piece, with the inlet 412 and the outlet 416 at opposite sides of the base portion 440. The single piece body 415 requires fewer mechanical parts and is both easier to repair and to manufacture and assemble into the flow sensor 410. A top cover 428 includes radial tabs 430 that each define a hole 436, which aligns with a corresponding hole 438 defined by a bore portion 434 of the upper portion 432. A threaded screw 442 extends through each of the holes 436 of the radial tabs 430 and threads into the hole 438 of each of the bore portions 434 of the upper portion 432.

The base portion 440 defines an inlet passage 444 and an outlet passage 446. The inlet passage 444 is defined in part by an upward directed tubular portion 448 at the center of the base 440. The outlet passage 446 extends around the tubular portion 448 and over a portion of the inlet passage 444 upstream of the tubular portion 448.

The upper portion 432 has an inward tapering configuration towards the base 440. The upper portion 432 forms a lower chamber 450 and, in combination with the top cover 428, defines an upper chamber 452. The lower chamber 450 houses a flow guide 454. The flow guide 454 includes a tubular portion 456 followed by a frusto-conical portion 458.

Figure 23:
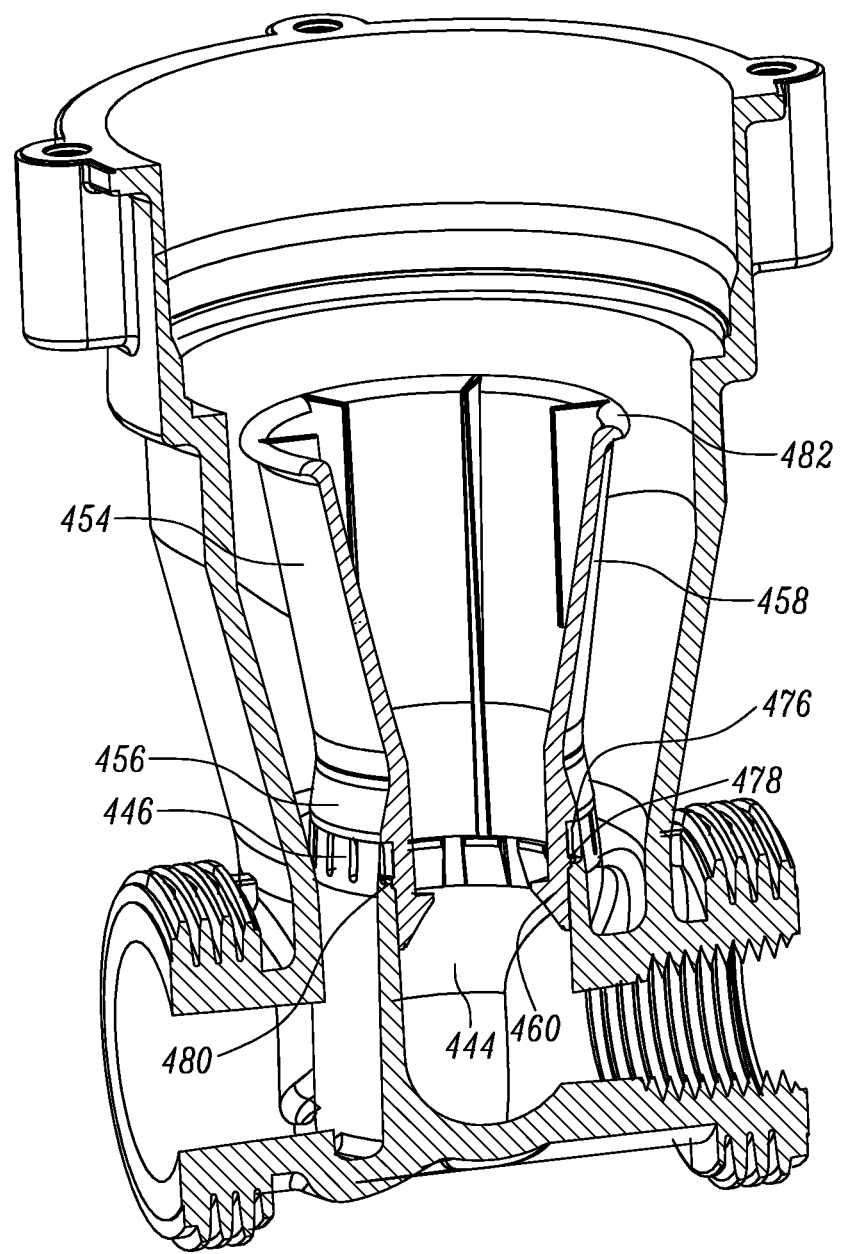
FIG. 23 is a partial cross-sectional view of the body and a flow guide of the flow sensor of FIG. 19.
Figure 24:
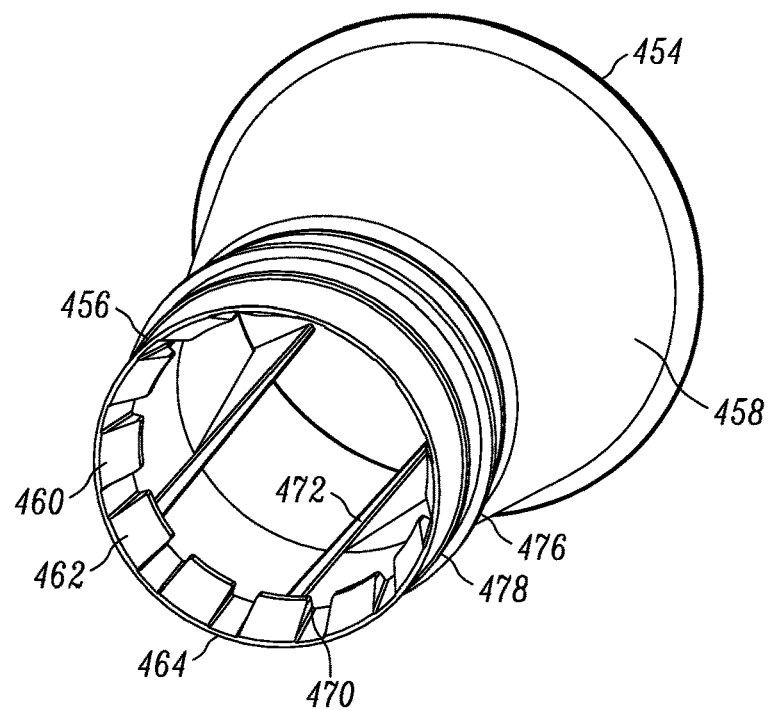
FIG. 24 is a bottom perspective view of the flow guide of the flow sensor of FIG. 19.
Figure 25:
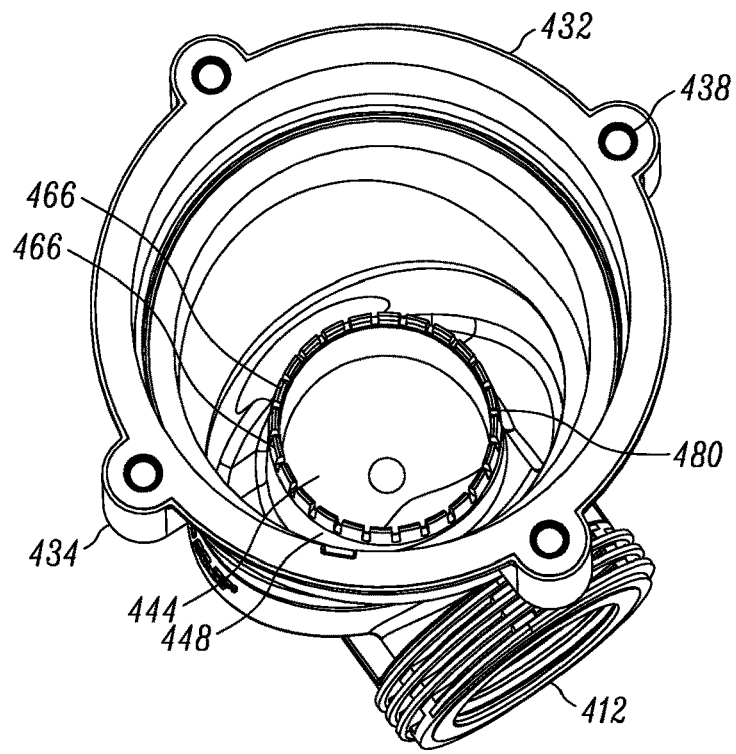
FIG. 25 is a top perspective view of the body of the flow sensor of FIG. 19.

As shown in FIGS. 23-25, the flow guide tubular portion 456 extends into the inlet passage 444. The flow guide tubular portion 456 includes tapered ridges 460. The tapered ridges 460 have a radially inward angled surface 462 and a ledge 470. The tubular portion 456 has a slightly smaller outer diameter than the inner diameter of the inlet passage 444 so that the tubular portion 456 can slide inside the inlet passage 444, wherein a ledge recess 476 of the tubular portion 456 seats on teeth 466 of the inlet passage 444. An annular bead 478 slides past the teeth 466 and extends into an annular groove 480 at a base of the teeth 446, securing the flow guide 454 to the inlet passage 444.

The frusto-conical portion 458 of the flow guide 454 allows water to flow outward as it moves to the top of the upper chamber 452. The frusto-conical portion 458 may terminate with an upper edge 482 that is curled outward and includes an outer surface that also turns downward to assist with a smooth transition for the flow from the flow guide 454 down toward the outlet passage 446. For further assistance in redirecting the flow, the upper chamber 452 includes an arcuate, annular portion 484 (FIG. 21). The spacing between the outward flare and curled upper edge of the frusto-conical portion 458, on the one hand, and the smooth curvature of the arcuate, annular portion 484 (FIG. 21) of the upper chamber 452, on the other hand, can be optimized so that pressure drop is reduced through the flow sensor 410. For example, it has been found that reducing the spacing can minimize the pressure drop.

With reference to FIGS. 21 and 26, a piston 486 operates in the both the lower and upper chambers 450, 452 of the upper portion 432. The piston 486 includes a shaft 488 with a hollow interior 500, a shaft head 506, and a plunger 499. The plunger 499 includes an enlarged head 490 with a tubular portion 498 molded thereto. The enlarged head 490 operates in the flow guide 454 and fits into the flow guide tubular portion 456 with sufficient clearance so that fluid can flow around the enlarged head 490 to be more sensitive to low flow rates so that they can be measured when the enlarged head 490 is in the flow guide tubular portion 456. The tubular portion 498 has an annular bead 492 that engages fingers 494 of the shaft 488. More specifically, the fingers 494 each have a groove 496 that receives the annular bead 492 of the tubular portion 498 allowing the shaft 488 to securely connect to the tubular portion 498 of the plunger 499.

When there is no flow, the enlarged head 490 seats on the ridge ledges 470 of the tapered ridges 460 within the tubular portion 458 of the flow guide 454. The enlarged head 490 is centered in the flow guide 454 by tapered ribs 472 (FIG. 24). When water is flowing through the flow guide 454, the tapered ribs 472 permit the piston 486 to move up and down linearly with minimal friction between the enlarged head 490 and the tapered ridges 460.

Figure 37:
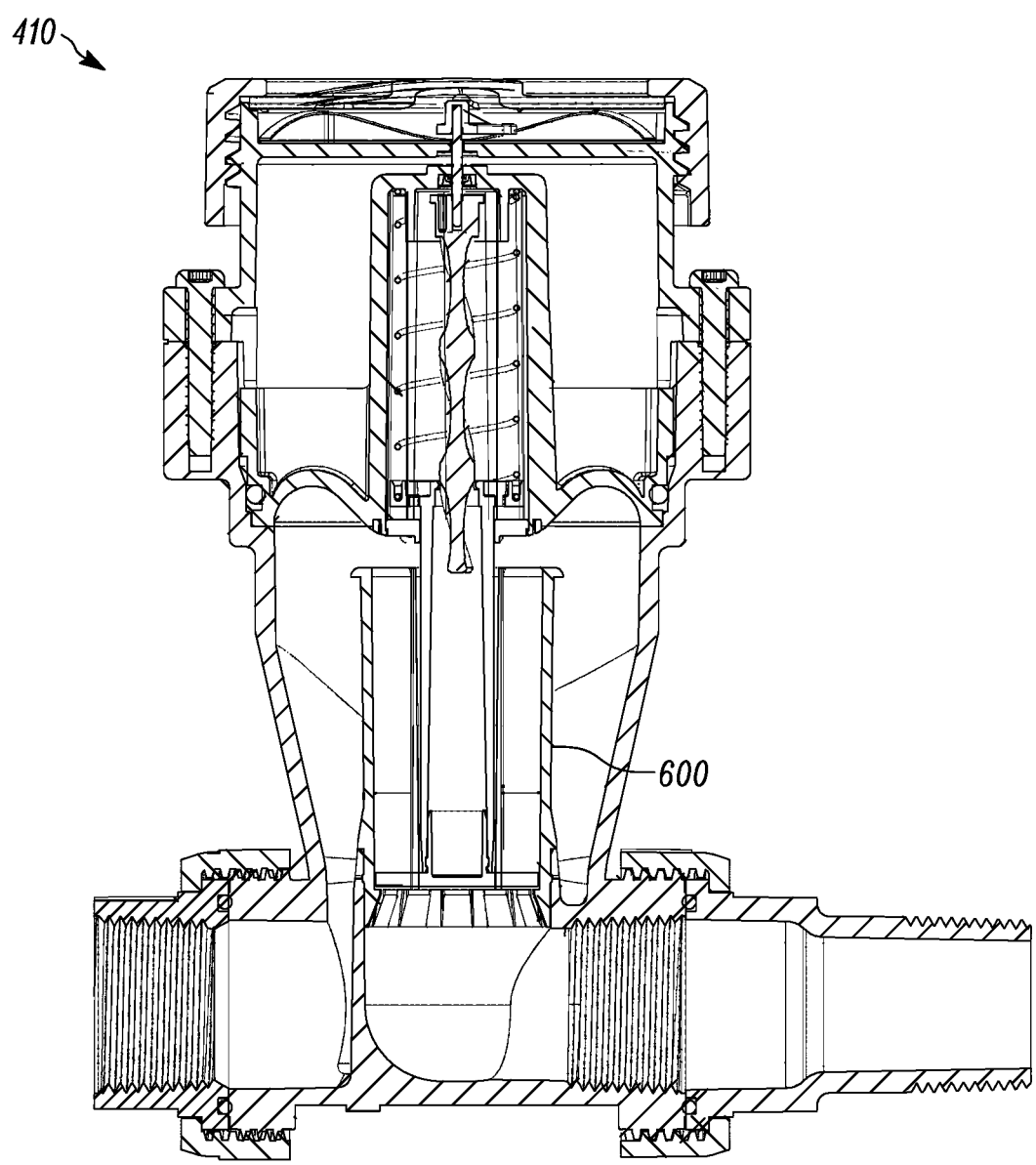
FIG. 37 is a central cross-sectional view of the flow sensor of FIG. 19 with a cylindrical flow guide.
Figure 38:
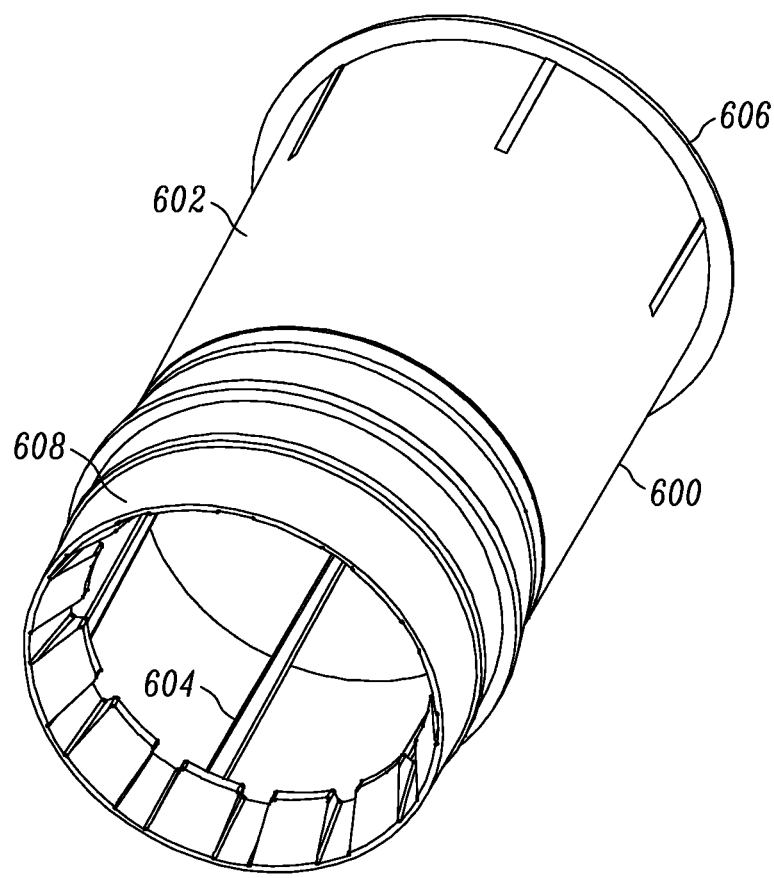
FIG. 38 is a bottom perspective view of the cylindrical flow guide of FIG. 37.

In an alternative example shown in FIGS. 37-38, the flow sensor 410 may be include a cylindrical flow guide 600. In this example, the flow guide 600 has a cylindrical portion 602 that extends from a tubular portion 608 and terminates with an upper edge 606. The tubular portion 608 retains all of the same structure and functionality of the tubular portion 456 of the flow guide 410 as described above. The flow guide 600 has straight (i.e., non-tapered) ribs 604 that center the enlarged head 490 in the flow guide 600 and extend longitudinally along an inside wall of the flow guide 600. The ribs guide the piston 486 while moving up and down linearly with minimum friction between the enlarged head 490 and the tapered ridges 460.

The straight, cylindrical flow guide configuration is commonly more sensitive to flow rates than the frusto-conical flow guide. Thus, in order to cover a range of flow rates as large as the flow guide 454, the flow guide 600 would need to be longer as discussed below. The straight guide can be substituted in each of the designs discussed herein for the frusto-conical flow guide.

As the piston 486 moves upwards, the shaft 488 extends into a tubular portion 510 of an enclosure 502. More specifically, and as shown in FIGS. 26 and 27, the shaft head 506 has a rectangular hole 513 at the center of the shaft head 506. The rectangular hole 513 is of a slightly larger size than the width of the twisted shaft 528. As the rate of water flow increases in the flow meter 414 forcing the piston 486 upwards, the piston 486 will move up the twisted shaft 528, and the twisted shaft 528 will move into the hollow interior 500 of the shaft 488. As a result of this interaction, the twisted shaft 528 will convert the linear motion of the shaft 458 into rotational motion of the twisted shaft 528.

Figure 32:
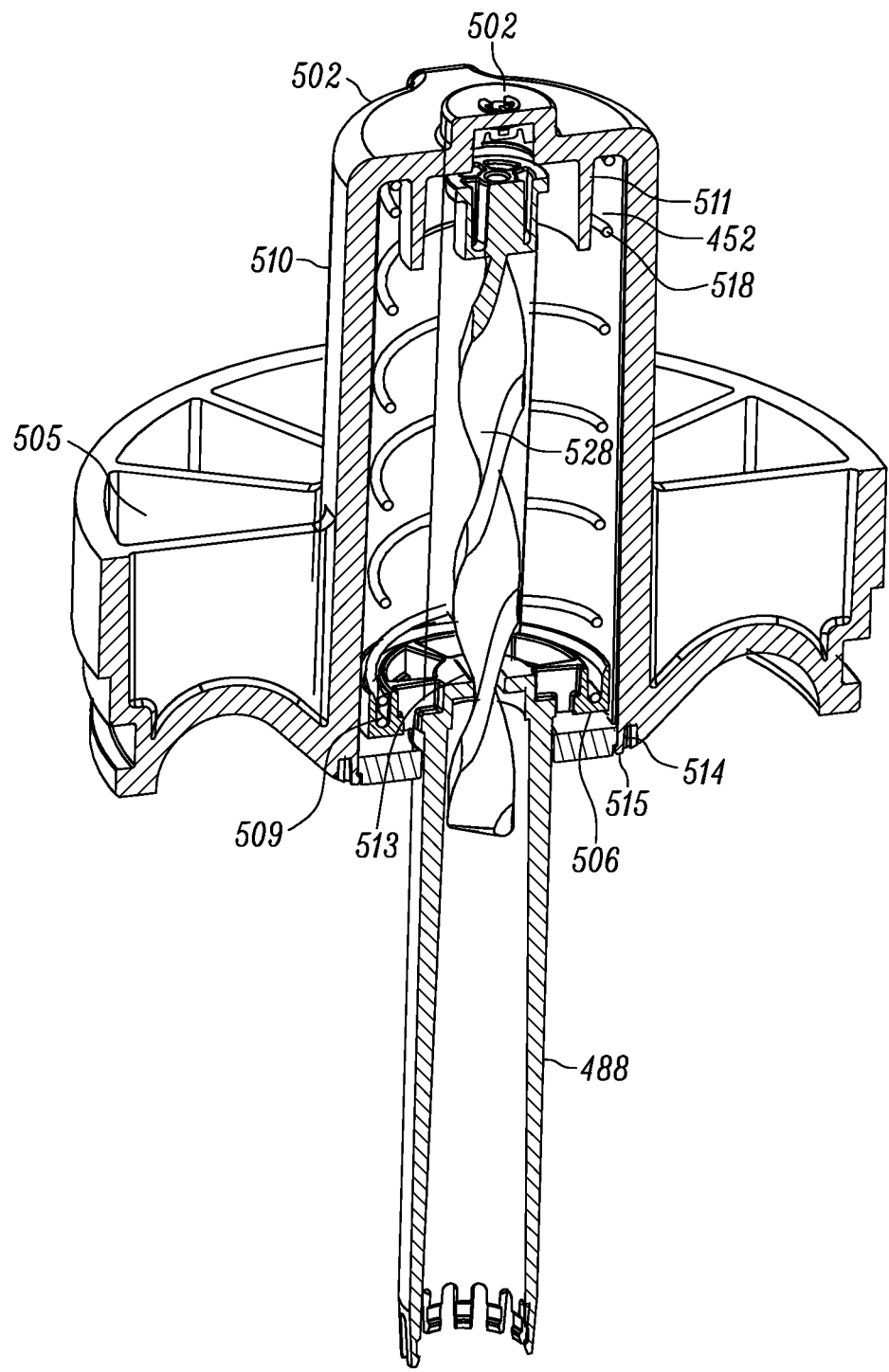
FIG. 32 is a forward of center cross-sectional, perspective view of the enclosure, the twisted shaft, a helical spring, and the piston of the flow sensor of FIG. 19.

With reference to FIGS. 21 and 32, a base portion 534 of the enclosure 502 seats on a ledge 504 at the top of the upper portion 432. The base portion 534 of the enclosure 502 has a series of recesses 505 to reduce the amount of plastic used in manufacturing. The enclosure 502 is housed in a cavity 538 of the top cover 428. The top cover 428 includes an annular bottom portion 429 that engages a top of the base portion 534 to maintain the base portion 534 in place seated on the ledge 504. A seal 526 provides a sealed engagement between the enclosure 502 and the upper portion 432 of the body 415. The seal 526 seats in an annular recess about the base portion 534.

Figure 28:
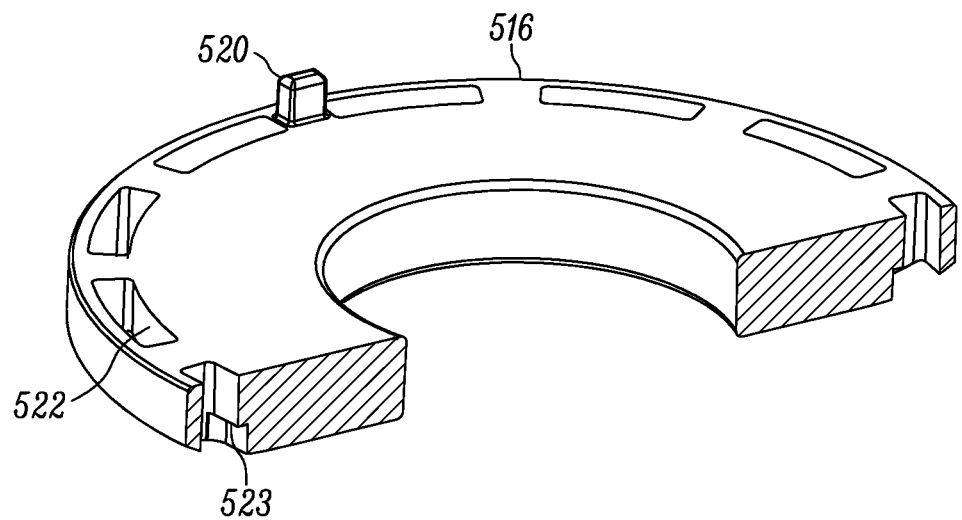
FIG. 28 is a top perspective, cross-sectional view of a washer of the flow sensor of FIG. 19.
Figure 29:
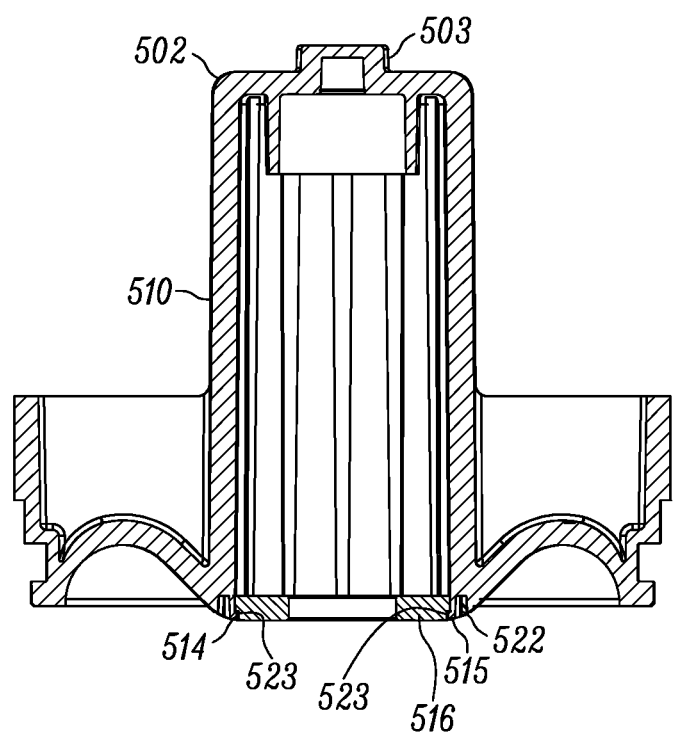
FIG. 29 is a central cross-sectional view of an enclosure of the flow sensor of FIG. 19 and the washer of FIG. 28.
Figure 30:
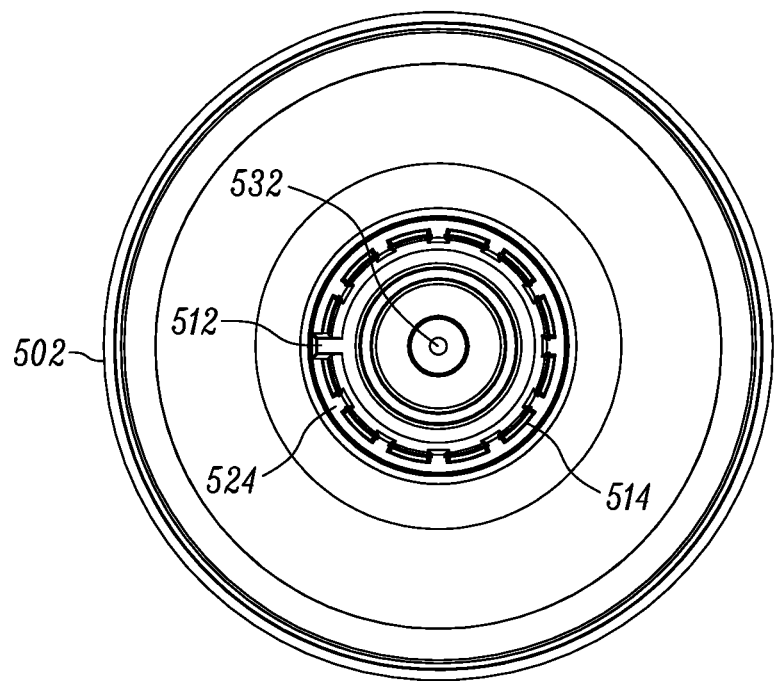
FIG. 30 is a bottom plan view of the enclosure of FIG. 29.
Figure 31:
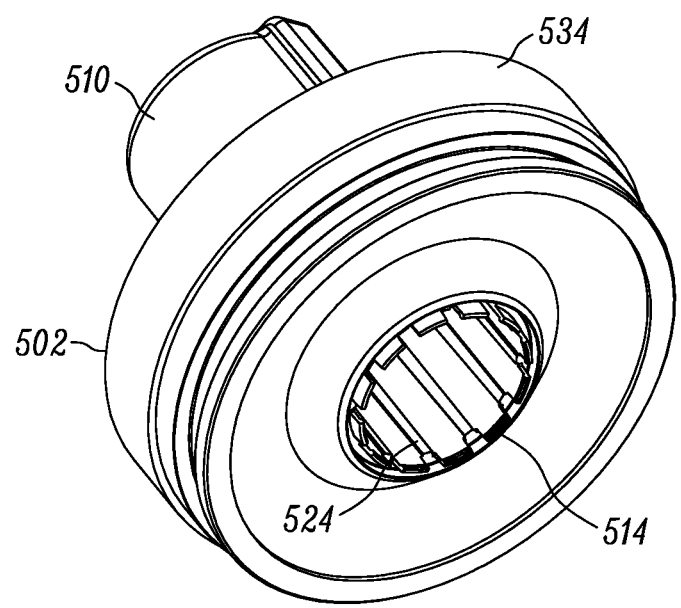
FIG. 31 is a bottom perspective view of the enclosure of FIG. 29.

With reference to FIGS. 21 and 28, the enclosure 502 attaches to a washer 516. The washer 516 is disposed below the shaft head 506 about the shaft 488. The washer 516 has a protrusion 520 that provides slight clearance between the washer 516 and the shaft head 506 for water to flow through holes 507 in the shaft head 506 and into the chamber 452. As shown in FIGS. 29-31, the tubular portion 510 of the enclosure 502 has flexible fingers 514. Each flexible finger 514 can bend radially inward and outward. The flexible fingers 514 slide into holes 522 of the washer 516, and each finger 514 has a lip 515 that clips to the underside of a ledge 523 formed in the each of the holes 522 of the washer 516 and snaps the enclosure 502 securely to the washer 516.

With reference to FIG. 32, the tubular portion 510 houses a helical spring 518 and the twisted shaft 528 in the chamber 452. The shaft head 506 has an annular pocket 509 for the helical spring 518 to seat in. The tubular portion 510 also has ribs 530 (FIG. 31) that run longitudinally therein. The ribs 530 provide enough clearance for the helical spring 518, the shaft 488 and the washer 516 to move up and down linearly. As water flows up the inlet passage 444 and pushes on the piston 486, the piston 486 is biased downward from the helical spring 518. The upward displacement of the piston 486 depends on the rate of flow of the water into the inlet passage 444. A higher flow rate will push the shaft 488 higher into the tubular portion 510 of the enclosure 502 than a lower flow rate. If there is no water flow, the shaft 488 will not extend into the tubular portion 510.

The top of the tubular portion 510 has an annular wall 511. The piston 486 cannot rise vertically beyond the annular wall 511 in the chamber 452. The outer diameter of the annular wall 511 is smaller than the inner diameter of the helical spring 518, and the inner diameter of the tubular portion 510 is larger than the outer diameter of the helical spring 518. Therefore, as the piston 486 drives upward into the chamber 452, the helical spring can coil up and collect around the annular wall 511 and inside the tubular portion 510.

To prevent the piston 486 from rotating within the tubular portion 510 of the enclosure 502, the shaft head 506 has a rib 508 (FIGS. 26 and 27) that slides vertically within a longitudinally running groove 512 (FIG. 30) of the tubular portion 510.

Figure 33:
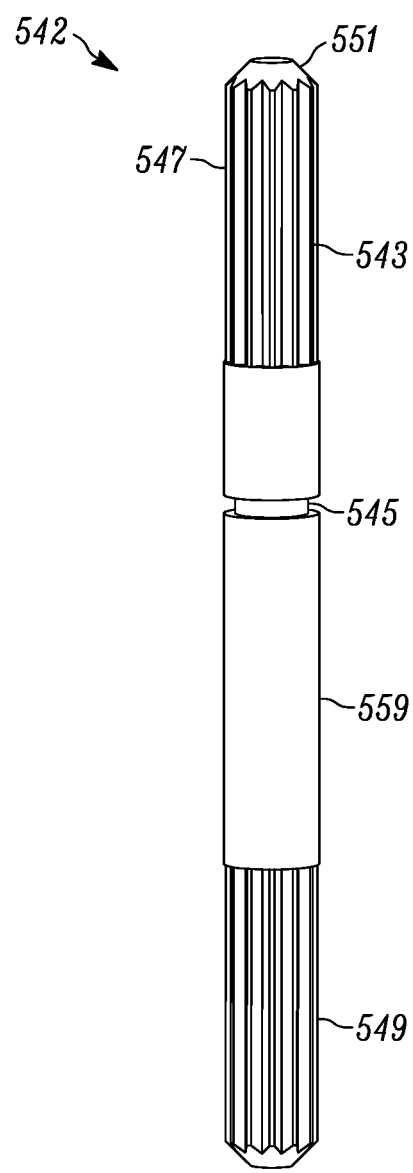
FIG. 33 is a side perspective view of a spindle of the flow sensor of FIG. 19.
Figure 34:
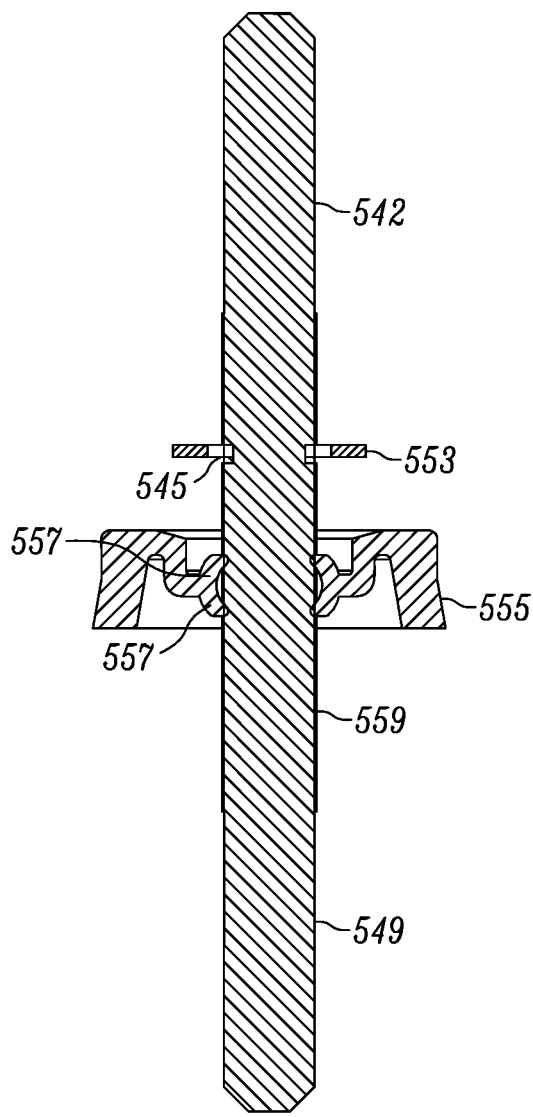
FIG. 34 is a central cross-sectional view of the spindle of FIG. 33 and a lock clip and a seal of the flow sensor of FIG. 19 associated with the spindle.
Figure 35:
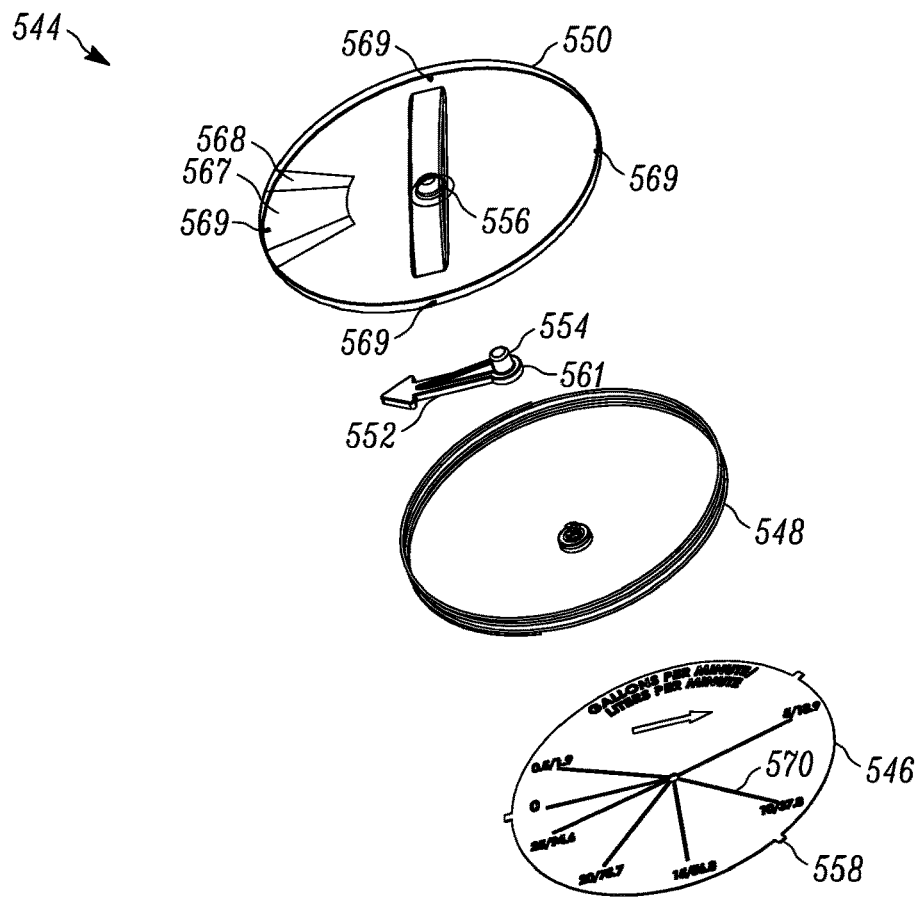
FIG. 35 is a perspective view of a dial assembly of the flow sensor of FIG. 19.
Figure 36:
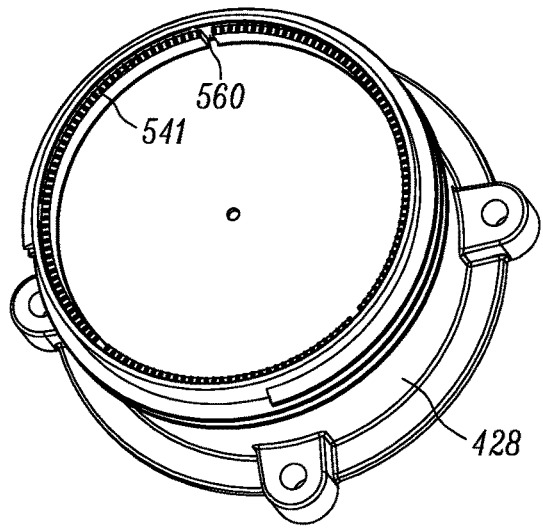
FIG. 36 is a top perspective view of a top cover of the flow sensor of FIG. 19.

The tubular portion 510 terminates at a top portion 536 (FIG. 21) of the top cover 428. Both the tubular portion 510 and the top portion 536 have a hole (532 of FIG. 30 and 540 of FIG. 22, respectively), that align with one another. With reference to FIGS. 33-35, the holes 532, 540 permit a spindle 542 to connect the twisted shaft 528 to a dial arrow 552 of a dial assembly 544. The spindle 542 has ridges 543 running longitudinally along an upper portion 547 and a lower portion 549. The end of the lower portion 549 fits in the hole 532 of a boss 529 (FIG. 27) of the twisted shaft 528, and the ridges 543 penetrate the surface of the boss 522 forming the hole 532 to prevent rotation of the spindle 542 within the hole 532. The boss 529 also has a series of recesses 531 to reduce the amount of plastic used in manufacturing. A tubular tip 554 extending from a base position 561 of the dial arrow 552 pivots in a dome-shaped recess 556 of the dial cover 550. The end of the upper portion 549 of the spindle 542 has a conical tip 551 that is accommodated by the tubular tip 554. The ridges 543 penetrate into the inner surface of the tubular tip 551 to secure the dial arrow 552 to the spindle 542 and prevent rotation of the spindle 542 within the tubular tip 554 of the dial arrow 552. Therefore, as the spindle 542 rotates due to the rotation of the twisted shaft 528, the dial arrow 552 rotates at the same rate as the spindle 542.

With reference to FIG. 34, a retention clip 553 seats in-between a dome-shaped portion 503 (FIG. 29) of the enclosure 502 and the top portion 536 of the top cover 428. The retention clip 553 is fastened around a groove 545 of an intermediate portion 559 of the spindle 542 to prevent axial movement of the spindle 542. The retention clip 553 has a C-shaped split ring configuration. The dome-shaped portion 503 houses a annular seal 555. The seal 555 has redundant wipers 557 that wrap around and engage the spindle 542 to prevent water from exiting the enclosure 502 through the hole 532 of the tubular portion 510.

Referring to FIG. 35, the dial assembly 544 also includes a dial 546, a helical spring 548, and a transparent dial cover 550. The twisted shaft 528, the spindle 542 and the dial arrow 552 are splined together such that they rotate together. The twist in the twisted shaft 528 turns the twisted shaft 528, the spindle 542 and the dial arrow 552 as the shaft 487 extends higher into the tubular portion 510 of the enclosure 502 as water flow increases through the flow meter 414.

The dial 546 has tabs 558 that seat in complimenting grooves 560 (FIG. 22) of the top cover 428 to prevent the dial 546 from rotating. The helical spring 548 separates the dial 546 and the dial cover 550 to permit the dial arrow 552 to rotate. The dial 546 may be marked with indicia or indicators for the amount of water flow through the flow meter 414. For instance, the dial 546 may have indicia indicating a scale for water flow in gallons per minute and/or liters per minute. As the flow rate increases, the dial arrow 552 will rotate in a clockwise fashion as viewed from above the flow sensor 410.

The dial cover 550 can have color coded sections that designate flow rate ranges. For example, if the flow through a particular system is 10 gpm, a user will use the dial cover 550 to indicate this flow rate of 10 gpm. To do so, a user may remove the screw 564 of the threaded collar 562, and unthread the threaded collar 562 a few turns. This clearance will allow the helical spring 548 to lift the dial cover 550 off of the top cover 428, allowing a user to rotate the dial cover 550. The dial cover 550 has detents 569 at the perimeter that extend from its inward face that seat in incremental pockets 541 (FIG. 36) of the top cover 428. Thus, the user can rotate the dial cover 550 to center a first flow rate indicator section 567 over a marking 570 on the dial 546 indicating 10 gpm. The first flow rate indicator section 567 represents an acceptable range of rate of flow. The first flow rate indicator section 567 may have a semitransparent color (such as semitransparent green). The semitransparent color permits the user to still be able to visually observe the dial arrow 552 and the markings 570 on the dial 546 beneath the dial cover 550. The user may then align the detents 569 with the appropriate pockets 541, thread the threaded collar 562 back on to the top cover 428 to lock the detents 569 in the underlying pockets 541, and further secure the threaded collar 562 with the screw 564.

The dial cover 550 may also have a second, outer flow rate indicator section 568 that is a different semitransparent color (such as semitransparent yellow) and straddles the first, inner flow rate indicator section 567. The outer flow rate indicator section 568 indicates that the flow rate through the flow sensor 410 has either increased or decreased by some percentage beyond the normal gpm range as indicated by the first, inner flow rate indicator section 567.

Finally, as shown in FIG. 22, a threaded collar 562 threads on to the top cover 428 to secure the dial assembly 544 in place. The threaded collar 562 has a hole 566 to accommodate a set screw 564 to pass through and bite into the top cover 428 to prevent unintentional removal of the threaded collar 562 and further secure the threaded collar 562 to the top cover 428. The set screw 564 has a non-traditional tool socket (e.g., a hex tool socket) to aid in prevention of vandalism or unintentional removal. Additionally, the threaded collar 562 could have the transparent dial cover 550 affixed to it.

In operation, fluid flows into the flow sensor 410 through the inlet passage 444. As the flow increases, the fluid moves the piston 486 upwards in the lower and upper chambers 450, 452. The piston 486 causes the dial assembly 544 to determine the flow rate through the flow sensor 410. That is, the upward movement of the piston 486 against the helical spring 518 causes the twisted shaft 528 to turn and twist in the chamber 452. The twisting of the twisted shaft 528 converts linear motion of the piston 486 to rotational motion, and rotates the dial arrow 552 about the dial 546 indicating the flow through the flow meter 414 of the flow sensor 410. As the flow meter 414 is measuring the flow, the fluid flows around the enlarged head 490 of the piston 486 and through the flow guide 454. Then, the flow is guided by the accurate, annular portion 484 of the upper portion 432 and the curled edge 482 of the flow guide 454 to turn the direction of flow back towards the outlet passage 446.

The piston 486, the spring 528 and the frusto-conical portion 458 of the flow guide 454 are coordinated to measure flow through flow meter 414. The tubular portion 456 may also be part of this coordination. Since the enlarged head 490 of the piston 486 has a constant diameter, the radial distance between a perimeter of the enlarged head 486 and the frusto-conical portion 458 of the flow guide 454 increases as the piston 486 rises. This enables the flow meter 414 to have a reduced overall length (or height) when compared to a constant diameter flow guide. More specifically, in general, higher velocities mean a higher force on the enlarged head 490 of the piston 486. For an expanding area, such as that provided by the frusto-conical portion 458 of the flow guide 454, the velocity will decrease over the length for a given flow rate. So, at higher flow rates, the enlarged head 490 will be located in a section of the frusto-conical portion 458 with a larger cross-sectional area and, therefore, have a lower velocity. The advantage is that the flow meter can be shorter for the same flow rate range, and there will be a lower pressure drop. When there is no pressurized flow in the system, the enlarged head 490 of the piston 486 rests on the tapered ribs 472 of the flow guide 454. The flow sensor 410 can measure small amounts of flow downstream of a valve, which may indicate a leak in the valve. The flow sensor 410 also can measure above normal flows, which may indicate damaged connections, conduit or water emission devices downstream. It also could measure below normal flow amounts which may indicate clogged conduit or water emission devices.

The foregoing is illustrated by the following examples. In a first example, the flow sensor has an inlet of 1 in. and a flow guide with an inlet diameter of 1.25 in., an outlet diameter of 1.75 in., and an axial length of 2.396 in., as measured from the top of the ledges of the tubular portion to the upper edge of the frusto-conical portion. The straight/tubular portion of the flow guide has an axial length of 0.718 in., and the frusto-conical portion of the flow guide has an axial length of 1.678 in. and proceeds outward at an angle of 8.62°. The enlarged head of the piston has a diameter of 1.21 in., and there is a gap of 0.04 in. between the enlarged head and the tapered ribs, which run along the wall of the flow guide. The tapered ribs are designed to create a linear path for the piston to travel. Furthermore, the gap between the wall of the flow guide and the enlarged head increases as the piston travels away from the straight portion of the flow guide and through the frusto-conical portion of the flow guide.

The twisted shaft is 2.5 in. in length, and the pitch is 1.84 revolutions per inch ("rev/in"). The spring rate is 0.66 lb/in. In a preferred embodiment, with the foregoing dimensions and conditions, the angle in degrees for the markings on the dial indicate a given flow rate are shown in the table below.

| Flow Rate (gpm) | Angle (degrees) |
|---|---|
| 0.0 | 0 |
| 0.5 | 23 |
| 5.0 | 160 |
| 10.0 | 215 |
| 15.0 | 260 |
| 20.0 | 304 |
| 25.0 | 342 |

In operation, the following table shows the enlarged head position from start of the ledges of the straight portion of the flow guide and the spring displacement for 5.0 gpm and 25.0 gpm flow rates.

| Flow Rate (gpm) | Enlarged Head Position From Start (in) | Spring Displacement (in) |
|---|---|---|
| 5.0 | .7522 | .7522 |
| 25.0 | 1.760 | 1.760 |

In a second example, the flow sensor has an inlet of 1.5 in., and the flow guide has an inlet diameter of 1.75 in., an outlet diameter of 2.3 in., and an axial length of 2.937 in., as measured from the top of the ledges of the tubular portion to the upper edge of the frusto-conical portion. The straight portion of the flow guide has an axial length of 0.960 in., and the frusto-conical portion has an axial height of 1.977 in. and proceeds outward at an angle of 8.14°. The enlarged head of the piston has a diameter of 1.600 in., and there is a gap of 0.05 in. between the enlarged head and the tapered ribs. The tapered ribs are designed to create a linear path for the piston to travel. Furthermore, the gap between the wall of the flow guide and the enlarged head increases as the piston travels away from the straight portion of the flow guide through the frusto-conical portion of the flow guide.

The twisted shaft is 3.15 in. in length, and the pitch of the twisted shaft is 2.60 rev/in. The spring rate is 2.5 lb/in. In a preferred embodiment, with the foregoing dimensions and conditions, the angle in degrees for the markings on the dial indicating a given flow rate are shown in the table below.

| Flow Rate (gpm) | Angle (degrees) |
|---|---|
| 0.0 | 0 |
| 15 | 140 |
| 30 | 215 |
| 45 | 266 |
| 60 | 315 |
| 70 | 350 |

In operation, the following table shows the enlarged head position from the ledges of the straight portion and the spring displacement for 15.0 gpm and 70.0 gpm flow rates.

| Flow Rate (gpm) | Enlarged Head Position From Start (in) | Spring Displacement (in) |
|---|---|---|
| 15.0 | 1.01 | 1.01 |
| 70.0 | 2.52 | 2.52 |

As discussed in a previous example, a straight housing flow guide with a 1.25 in. inlet diameter and a spring rate of 0.80 lbs/in had spring displacements of 0.19 in. and 4.78 in. for flow rates of 5.0 gpm and 25.0 gpm, respectively. The straight housing flow guide has a significantly larger displacement than the frusto-conical flow guide examples, as described above.

The foregoing dimensions and conditions are exemplary only. The dimensions and conditions and be changed to accommodate measuring larger or smaller flows.

As with previous embodiments, the helical springs and shafts of the flow sensors can be made of metal, such as stainless steel. The other components of the flow sensors can be made of plastic, such as acrylonitrile butadiene styrene (ABS), polymethyl methacrylate (PMMA), polypropylene (PP), and polyamides (PA).

The matter set forth in the foregoing description and accompanying drawings is offered by way of illustration only and not as a limitation. While particular embodiments have been shown and described, it will be apparent to those skilled in the art that changes and modifications may be made without departing from the broader aspects of the technological contribution. The actual scope of the protection sought is intended to be defined in the following claims.

What is claimed is:

1. A flow sensor comprising:
    an inlet;
    an outlet;
    a frusto-conical flow guide between the inlet and the outlet;
    a straight flow guide upstream of the frusto-conical flow guide; and
    a piston having a plunger, the plunger capable of operating in the straight flow guide and the frusto-conical flow guide based on an amount of fluid flowing through the flow sensor.

2. The flow sensor of claim 1 further comprising a flow amount indicating device.

3. The flow sensor of claim 2 wherein the flow amount indicating device includes a shaft converting linear motion of a piston into rotational motion.

4. The flow sensor of claim 3 wherein the flow amount indicating device includes a rotating indicator indicating an amount of flow through the flow sensor based on rotational movement of the shaft.

5. The flow sensor of claim 4 wherein the flow amount indicating device includes an indicia indicating proper flow.

6. The flow sensor of claim 1 further comprising a spring biasing the piston upstream in the straight flow guide.

7. The flow sensor of claim 6 wherein the spring is disposed in a chamber.

8. The flow sensor of claim 1 wherein the straight flow guide and the frusto-conical flow guide are contiguous.

9. The flow sensor of claim 1 wherein frusto-conical flow guide includes a longitudinal axis and includes at least one rib extending parallel to the longitudinal axis to guide linear displacement of the piston when moving in the frusto-conical flow guide.

10. The flow sensor of claim 9 wherein the at least one rib includes a plurality of tapered ribs to guide linear displacement of the piston when moving in the frusto-conical flow guide.

11. A flow sensor comprising:
a body;
a flow guide associated with the body;
a piston operating in the flow guide based on an amount of fluid flowing through the flow sensor;
a shaft converting linear motion of the piston to rotational motion of the shaft, the shaft having a longitudinal length with a plurality of exterior sides forming a twisted configuration along at least a portion of the longitudinal length; and
a flow indicator assembly cooperating with the shaft to indicate the flow through the flow sensor.

12. The flow sensor of claim 11 wherein the flow guide includes at least a frusto-conical portion.

13. The flow sensor of claim 12 further comprising a cover portion attached to the body.

14. The flow sensor of claim 12 further comprising a straight flow guide portion upstream of the frusto-conical portion of the flow guide.

15. The flow sensor of claim 14 wherein the straight flow guide portion and the frusto-conical flow guide are contiguous.

16. The flow sensor of claim 11 further comprising a first chamber housing the shaft.

17. The flow sensor of claim 16 further comprising a spring biasing the piston upstream in the flow guide.

18. The flow sensor of claim 11 wherein a top cover houses the flow indicator assembly.

19. The flow sensor of claim 18 wherein the flow indicator assembly includes an indicator that points to indicia indicating the current amount of flow through the flow sensor based on rotational movement of the shaft.

20. The flow sensor of claim 19 wherein the indicator assembly is secured to the top cover by a threaded collar.

21. The flow sensor of claim 11 further comprising a top cover screwed to the body.

22. The flow sensor of claim 11 wherein the piston is coupled to the shaft.

23. The flow sensor of claim 22 wherein the piston receives at least a portion of the shaft.

24. A flow sensor comprising:
a body;
a flow guide associated with the body;
a piston operating in the flow guide based on an amount of fluid flowing through the flow sensor;
a shaft converting linear motion of the piston to rotational motion of the shaft, the shaft having a longitudinal length and a central axis and a helical twist about the central axis and along at least a portion of the longitudinal length;
a flow indicator assembly cooperating with the shaft to indicate the flow through the flow sensor;
the flow guide includes at least a frusto-conical portion; and
wherein the frusto-conical portion includes a longitudinal axis and includes at least one rib extending parallel to the longitudinal axis to guide linear displacement of the piston when moving in the frusto-conical portion.

25. The flow sensor of claim 24 wherein the at least one rib includes a plurality of tapered ribs to guide linear displacement of the piston when moving in the frusto-conical portion.

* * * * *